US012739026B2

(12) United States Patent
Rune et al.

(10) Patent No.: US 12,739,026 B2
(45) Date of Patent: Sep. 15, 2026

(54) UE TIMING ADVANCE REPORTING IN NTN

(71) Applicant: Telefonaktiebolaget LM Ericsson (PUBL), Stockholm (SE)

(72) Inventors: Johan Rune, Lidingö (SE); Robert Karlsson, Sundbyberg (SE); Xingqin Lin, San Josè, CA (US)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 308 days.

(21) Appl. No.: 18/561,004

(22) PCT Filed: May 18, 2022

(86) PCT No.: PCT/IB2022/054644

§ 371 (c)(1),
(2) Date: Nov. 15, 2023

(87) PCT Pub. No.: WO2022/243910

PCT Pub. Date: Nov. 24, 2022

(65) Prior Publication Data

US 2024/0259088 A1 Aug. 1, 2024

Related U.S. Application Data

(60) Provisional application No. 63/190,225, filed on May 18, 2021.

(51) Int. Cl.
*H04B 7/185* (2006.01)
*H04W 56/00* (2009.01)

(52) U.S. Cl.
CPC ..... *H04B 7/18532* (2013.01); *H04B 7/18513* (2013.01); *H04W 56/0045* (2013.01)

(58) Field of Classification Search
CPC .............. H04B 7/1851; H04B 7/18532; H04B 7/18513; H04B 7/1853; H04W 56/0045
See application file for complete search history.

(56) References Cited

U.S. PATENT DOCUMENTS 10,652,894 B2 * 5/2020 Hosseini ........... H04W 56/0045
12,231,221 B1 * 2/2025 Huang .............. H04B 7/18541

(Continued)

FOREIGN PATENT DOCUMENTS

WO WO2022052917 A1 3/2022

OTHER PUBLICATIONS

3GPP TSG RAN WG1 #98bis; Chongqing, China, Oct. 14-20, 2019; Agenda Item: 7.2.5.3; Source: Sony; Title: Discussion on Timing adjustment in NTN (R1-1910747).

(Continued)

*Primary Examiner* — Bailor C Hsu
(74) *Attorney, Agent, or Firm* — Baker Botts L.L.P.

(57) ABSTRACT

According to some embodiments, a method performed by a wireless device operating in a non-terrestrial network (NTN) comprises obtaining a first timing advance (TA) value for uplink transmission in the NTN. The first TA value comprises a reference TA value. The method further comprises obtaining a trigger condition for reporting a TA used by the wireless device for uplink transmission in the NTN and autonomously obtaining an adjusted TA value for uplink transmission. The adjusted TA is obtained via autonomous adjustment to the reference TA value based on a propagation delay between the wireless device and a serving satellite of the NTN. The method further comprises, upon determining the trigger condition for reporting the TA is satisfied, reporting the adjusted TA to a network node.

11 Claims, 19 Drawing Sheets

1200

1212 – obtain a first TA value for uplink transmission in the NTN, the first TA value comprising a reference TA value 1214 – obtain a trigger condition for reporting a TA used by the wireless device for uplink transmission in the NTN 1216 – autonomously obtain an adjusted TA value for uplink transmission, the adjusted TA obtained via autonomous adjustment to the reference TA value based on a propagation delay between the wireless device and a serving satellite of the NTN 1218 – upon determining the trigger condition for reporting the TA is satisfied, report the adjusted TA to a network node 1220 – reset the trigger condition for reporting TA 1222 – refrain from adjusting autonomously the TA value for uplink transmission.

(56) References Cited

U.S. PATENT DOCUMENTS

| | | | | |
|---|---|---|---|---|
| 2021/0105761 | A1 | 4/2021 | Cheng et al. | |
| 2021/0289460 | A1* | 9/2021 | Medles | H04W 72/1268 |
| 2022/0070811 | A1* | 3/2022 | Tripathi | H04B 7/1851 |
| 2022/0086780 | A1* | 3/2022 | Tsai | H04W 56/006 |
| 2022/0095258 | A1* | 3/2022 | Yeo | H04W 56/0045 |
| 2022/0217669 | A1* | 7/2022 | Bai | H04W 8/24 |
| 2022/0330187 | A1* | 10/2022 | Cheng | H04W 56/004 |
| 2023/0116853 | A1* | 4/2023 | Ji | H04W 76/11 370/336 |
| 2023/0131305 | A1* | 4/2023 | Cozzo | H04W 72/0473 370/329 |
| 2023/0388952 | A1* | 11/2023 | Khoshkholgh Dashtaki | H04B 7/18513 |

OTHER PUBLICATIONS

3GPP TSG RAN WG1 Meeting #102e, Aug. 24-28, 2020; Agenda Item: 8.4.2; Source: MediaTek, Eutelsat; Title: UL Time and Frequency Synchronisation for NR-NTN (R1-2005496).

3GPP TSG RAN WG1 #105-e; e-Meeting, May 10-27, 2021; Agenda item: 8.4.2; Source: Samsung; Title: Enhancements on UL time and frequency synchronization for NTN (R1-2105307).

3GPP TSG-RAN WG2 #113b-e, Electronic Meeting, Apr. 12-Apr. 20, 2021; Agenda Item: 8.10.2.1; Source: Huawei, HiSilicon; Title: Report of [POST113-e] [106] [NTN] MAC aspects (Huawei) (R2-2103630).

3GPP TSG-RAN WG2 #113bis_e, E-Meeting, Apr. 12, 2021-Apr. 20, 2021; Agenda Item: 8.10.2.1; Source: Ericsson; Title: On Random Access in NTNs (R2-2103951 (Revision of R2-2101494)).

3GPP TSG-RAN WG2 Meeting #113bis-e; Electronic meeting, Apr. 12-20, 2021; Agenda Item: 8.10.2.1; Source: OPPO; Title: Summary of offline 103—[NTN] RACH aspects—2nd round (R2-2104370).

3GPP TSG RAN meeting #86; Sitges, Spain, Dec. 9-13, 2019; Source: Thales; Title: Solutions for NR to support non-terrestrial networks (NTN); Agenda Item: 9.1.2—Proposals led by RAN2; Release: Rel-17 (RP-193234 (Revision from RP-192502, 3144)).

3GPP TSG RAN Meeting #86; Sitges, Spain, Dec. 9-31, 2019; Source: MediaTek Inc.; Title: New Study WID on NB-IoT/eTMC support for NTN (RP-193235).

3GPP TS 38.211 v15.6.0 (Jun. 2019) 3rd Generation Partnership Project; Technical Specification Group Radio Access Network; NR; Physical channels and modulation (Release 15).

3GPP TR 38.811 V15.4.0 (Sep. 2020); 3rd Generation Partnership Project; Technical Specification Group Radio Access Network; Study on New Radio (NR) to support non-terrestrial networks (Release 15).

3GPP TR 38.821 V16.0.0 (Dec. 2019); 3rd Generation Partnership Project; Technical Specification Group Radio Access Network; Solutions for NR to support non-terrestrial networks (NTN) (Release 16).

3GPP TS 38.331 V16.1.0 (Jul. 2020); 3rd Generation Partnership Project; Technical Specification Group Radio Access Network; NR; Radio Resource Control (RRC) protocol specification (Release 16).

PCT International Search Report issued for International application No. PCT/IB2022/054644—Aug. 23, 2022.

PCT Written Opinion of the International Searching Authority issued for International application No. PCT/IB2022/054644—Aug. 23, 2022.

* cited by examiner 4-step 1 ms

PRACH time between PRACH and RAR

Figure 4:
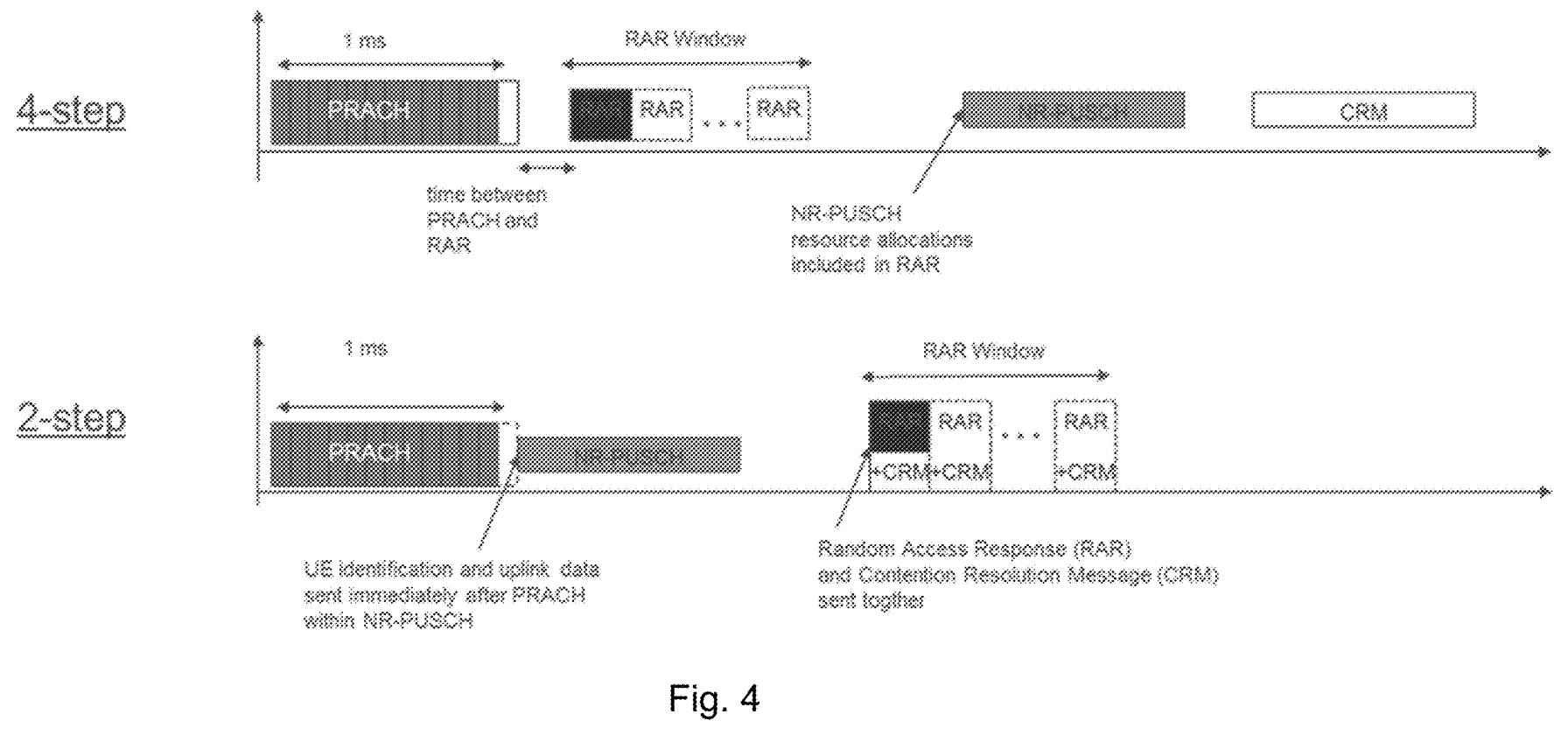

RAR Window

RAR

RAR

NR-PUSCH resource allocations included in RAR

CRM 2-step 1 ms

PRACH

UE identification and uplink data sent immediately after PRACH within NR-PUSCH

RAR Window

RAR +CRM

RAR +CRM

RAR +CRM

Random Access Response (RAR) and Contention Resolution Message (CRM) sent together

243a Network
243b Network
200
201 Processor
205 Input/Output Interface
209 RF Interface
211 Network Connection Interface
213 Power Source
202 Bus
215 Memory
217 RAM
219 ROM
221 Storage Medium
223 Operating System
225 Application Programs
227 Data
231 Communication Subsystem
233 Transmitter
235 Receiver

Fig. 12A

UE TIMING ADVANCE REPORTING IN NTN

PRIORITY

This nonprovisional application is a U.S. National Stage Filing under 35 U.S.C. § 371 of International Patent Application Serial No. PCT/IB2022/054644 filed May 18, 2022 and entitled "UE TIMING ADVANCE REPORTING IN NTN" which claims priority to U.S. Provisional Patent Application No. 63/190,225 filed May 18, 2021, both of which are hereby incorporated by reference in their entirety.

TECHNICAL FIELD

Particular embodiments relate to wireless communication, and more specifically to user equipment (UE) timing advance (TA) reporting in a non-terrestrial network (NTN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) specifies the evolved packet system (EPS). EPS is based on the long-term evolution (LTE) radio network and the evolved packet core (EPC). EPS was originally intended to provide voice and mobile broadband (MBB) services but has continuously evolved to broaden its functionality. 3GPP also specifies narrowband Internet of Things (NB-IoT) and LTE for machines (LTE-M) as part of the LTE specifications and provide connectivity to massive machine type communications (mMTC) services.

3GPP also specifies the 5G system (5GS). This is a new generation radio access technology intended to serve use cases such as enhanced mobile broadband (eMBB), ultra-reliable and low latency communication (URLLC) and mMTC. 5G includes the new radio (NR) access stratum interface and the 5G Core Network (5GC). The NR physical and higher layers reuse parts of the LTE specification and then add needed components when motivated by new use cases. One such component is a sophisticated framework for beam forming and beam management to extend the support of the 3GPP technologies to a frequency range going beyond 6 GHz.

5G new radio (NR) uses a random access procedure for a user equipment (UE) to connect with the network. In NR, the random access (RA) procedure is described in the NR medium access control (MAC) specifications and parameters are configured by radio resource control (RRC), e.g., in system information or handover (RRCReconfiguration with reconfigurationWithSync). Random access is triggered in many different scenarios, for example, when the UE is in RRC_IDLE or RRC_INACTIVE and wants to access a cell on which the UE is camping (i.e., transition to RRC_CONNECTED).

In NR, random access (RACH) configuration is broadcast in SIB1, as part of the servingCellConfigCommon IE. In addition, RACH configuration may be conveyed to the UE in dedicated RRC signaling, e.g., when contention-free random access is configured in conjunction with handover.

Inherited from LTE, a 4-step RA procedure was specified for NR in 3GPP release 15. Release 16 specifies an alternative RA procedure, denoted 2-step RA, which may be used in parallel with the 4-step RA procedure.

The following RRC information elements (extracted from 3GPP TS 38.331 version 16.1.0) are relevant for 4-step and 2-step random access configuration.

RACH-ConfigGeneric information element

```
-- ASN1START
-- TAG-RACH-CONFIGGENERIC-START
RACH-ConfigGeneric ::=                    SEQUENCE {
   prach-ConfigurationIndex                  INTEGER (0..255),
   msg1-FDM                                  ENUMERATED {one, two, four, eight},
   msg1-FrequencyStart                       INTEGER (0..maxNrofPhysicalResourceBlocks-1),
   zeroCorrelationZoneConfig                 INTEGER (0..15),
   preambleReceivedTargetPower               INTEGER (−202..−60),
   preambleTransMax                          ENUMERATED {n3, n4, n5, n6, n7, n8, n10, n20, n50,
n100, n200},
   powerRampingStep                          ENUMERATED {dB0, dB2, dB4, dB6},
   ra-ResponseWindow                         ENUMERATED {sl1, sl2, sl4, sl8, sl10, sl20, sl40,
sl80},
   ...,
   [[
   prach-ConfigurationPeriodScaling-IAB-r16     ENUMERATED
{scf1,scf2,scf4,scf8,scf16,scf32,scf64}            OPTIONAL,   -- Need R
   prach-ConfigurationFrameOffset-IAB-r16       INTEGER (0..63)
OPTIONAL,   -- Need R
   prach-ConfigurationSOffset-IAB-r16           INTEGER (0..39)
OPTIONAL,   -- Need R
   ra-ResponseWindow-v1610                      ENUMERATED { sl60, sl160}
OPTIONAL, -- Need R
```

-continued

| RACH-ConfigGeneric information element |
|---|

```
   prach-ConfigurationIndex-v1610                INTEGER (256..262)
OPTIONAL  -- Need R
      ] ]
}
-- TAG-RACH-CONFIGGENERIC-STOP
-- ASN1STOP
```

| RACH-ConfigGeneric field descriptions |
|---|
| msg1-FDM<br>The number of PRACH transmission occasions FDMed in one time instance. (see TS 38.211, clause 6.3.3.2).<br>msg1-FrequencyStart<br>Offset of lowest PRACH transmission occasion in frequency domain with respective to PRB 0. The value is configured so that the corresponding RACH resource is entirely within the bandwidth of the UL BWP. (see TS 38.211, clause 6.3.3.2).<br>powerRampingStep<br>Power ramping steps for PRACH (see TS 38.321 5.1.3).<br>prach-ConfigurationFrameOffset-IAB<br>Scaling factor for ROs defined in the baseline configuration indicated by prach-ConfigurationIndex and is used only by the IAB-MT. (see TS 38.211, clause 6.3.3.2).<br>prach-ConfigurationIndex<br>PRACH configuration index. For prach-ConfigurationIndex configured under beamFailureRecovery-Config, the prach-ConfigurationIndex can only correspond to the short preamble format, (see TS 38.211, clause 6.3.3.2). If the field prach-ConfigurationIndex-v1610 is present, the UE shall ignore the value provided in prach-ConfigurationIndex (without suffix).<br>prach-ConfigurationPeriodScaling-IAB<br>Scaling factor to extend the periodicity of the baseline configuration indicated by prach-ConfigurationIndex and is used only by the IAB-MT. Value scf1 corresponds to scaling factor of 1 and so on. (see TS 38.211, clause 6.3.3.2).<br>prach-ConfigurationSOffset-IAB<br>Subframe/Slot offset for ROs defined in the baseline configuration indicated by prach-ConfigurationIndex and is used only by the IAB-MT. (see TS 38.211, clause 6.3.3.2).<br>preambleReceivedTargetPower<br>The target power level at the network receiver side (see TS 38.213, clause 7.4, TS 38.321, clauses 5.1.2, 5.1.3). Only multiples of 2 dBm may be chosen (e.g., −202, −200, −198, . . .).<br>preambleTransMax<br>Max number of RA preamble transmission performed before declaring a failure (see TS 38.321, clauses 5.1.4, 5.1.5).<br>ra-ResponseWindow<br>Msg2 (RAR) window length in number of slots. The network configures a value lower than or equal to 10 ms when Msg2 is transmitted in licensed spectrum and 40 ms when Msg2 is transmitted with shared spectrum channel access (see TS 38.321 [3], clause 5.1.4). UE ignores the field if included in SCellConfig. If ra-ResponseWindow-v1610 is signalled, UE shall ignore the ra-ResponseWindow (without suffix). For operation with shared spectrum channel access and when ra-ResponseWindow value is more than 10 ms, the network always includes the two LSB bits of the SFN corresponding to the PRACH occasion where the preamble is received in the DCI scheduling Msg2 (see TS 38.213).<br>zeroCorrelationZoneConfig<br>N-CS configuration, see Table 6.3.3.1-5 in TS 38.211. |

| RACH-ConfigGenericTwoStepRA information element |
|---|

```
-- ASN1START
-- TAG-RACH-CONFIGGENERICTWOSTEPRA-START
RACH-ConfigGenericTwoStepRA-r16 ::=       SEQUENCE {
   msgA-PRACH-ConfigurationIndex-r16          INTEGER (0..262)
OPTIONAL, -- Cond 2StepOnly
   msgA-RO-FDM-r16                            ENUMERATED {one, two, four, eight}
OPTIONAL, -- Cond 2StepOnly
   msgA-RO-FrequencyStart-r16                 INTEGER (0..maxNrofPhysicalResourceBlocks-1)
OPTIONAL, -- Cond 2StepOnly
   msgA-ZeroCorrelationZoneConfig-r16         INTEGER (0..15)
OPTIONAL, --Cond 2StepOnly
   msgA-PreamblePowerRampingStep-r16          ENUMERATED {dB0, dB2, dB4, dB6}
OPTIONAL, -- Cond 2StepOnlyNoCFRA
```

-continued

RACH-ConfigGenericTwoStepRA information element

```
  msgA-PreambleReceivedTargetPower-r16       INTEGER (−202..−60)
OPTIONAL, -- Cond 2StepOnlyNoCFRA
  msgB-ResponseWindow-r16                    ENUMERATED {sl1, sl2, sl4, sl8, sl10, sl20, sl40,
sl80, sl160, sl320}
OPTIONAL, -- Cond NoCFRA
  preambleTransMax-r16                       ENUMERATED {n3, n4, n5, n6, n7, n8, n10, n20, n50,
n100, n200}   OPTIONAL, -- Cond 2StepOnlyNoCFRA
  ...
}
-- TAG-RACH-CONFIGGENERICTWOSTEPRA-STOP
-- ASN1STOP
```

| RACH-ConfigGenericTwoStepRA field descriptions |
|---|
| msgA-PreamblePowerRampingStep<br>Power ramping steps for msgA PRACH. If the field is absent, UE shall use the value of powerRampingStep in RACH-ConfigGeneric in the configured BWP (see TS 38.321, 5.1.3). This field may only be present if no 4-step type RA is configured in the BWP or in the case of separate ROs with 4-step type RA. The field is absent if RACH-ConfigGenericTwoStepRA is included in CFRA-TwoStep in RACH-ConfigDedicated and then the UE uses the value of msgA-PreamblePowerRampingStep in RACH-ConfigGenericTwoStepRA configured for CBRA. |
| msgA-PreambleReceivedTargetPower<br>The target power level at the network receiver side (see TS 38.213, clause 7.1.1 and TS 38.321, clause 5.1.1). Only multiples of 2 dBm may be chosen (e.g., −202, −200, −198, . . .). If the field is absent, UE shall use the value of preambleReceivedTargetPower in RACH-ConfigGeneric in the configured BWP. This field may only be present if no 4-step type RA is configured in the BWP. The field is absent if RACH-ConfigGenericTwoStepRA is included in CFRA-TwoStep in RACH-ConfigDedicated and then the UE uses the value of msgA-PreambleReceivedTargetPower in RACH-ConfigGenericTwoStepRA configured for CBRA. |
| msgA-PRACH-ConfigurationIndex<br>Cell-specific PRACH configuration index for 2-step RA type. If the field is absent the UE shall use the value of corresponding 4-step random access parameter in the configured BWP. If the value is in the range of 256 to 262, the field prach-ConfigurationIndex-v1610 should be considered configured (see TS 38.211, clause 6.3.3.2). This field may only be present if no 4-step type RA is configured in the BWP or in the case of separate ROs with 4-step type RA. |
| msgA-RO-FDM<br>The number of msgA PRACH transmission occasions Frequency-Division Multiplexed in one time instance. If the field is absent, UE shall use value of msg1-FDM in RACH-ConfigGeneric in the configured BWP (see TS 38.211, clause 6.3.3.2). This field may only be present if no 4-step type RA is configured in the BWP or in the case of separate ROs with 4-step type RA. |
| msgA-RO-FrequencyStart<br>Offset of lowest PRACH transmissions occasion in frequency domain with respect to PRB 0. If the field is absent, UE shall use value of msg1-FrequencyStart in RACH-ConfigGeneric in the configured BWP (see TS 38.211, clauses 5.3.2 and 6.3.3.2). This field may only be present if no 4-step type RA is configured in the BWP or in the case of separate ROs with 4-step type RA. |
| msgA-ZeroCorrelationZoneConfig<br>N-CS configuration for msgA preamble, see Table 6.3.3.1-5 in TS 38.211. If the field is absent, UE shall use value zeroCorrelationZoneConfig in RACH-ConfigGeneric in the configured BWP. This field may only be present if no 4-step type RA is configured in the BWP or in the case of separate ROs with 4-step type RA. |
| msgB-ResponseWindow<br>MsgB monitoring window length in number of slots. The network configures a value lower than or equal to 40 ms (see TS 38.321, clause 5.1.1). If the field is absent, the UE use the value of msgB-ResponseWindow in RACH-ConfigGenericTwoStepRA configured for CBRA. |
| preambleTransMax<br>Max number of RA preamble transmission performed before declaring a failure (see TS 38.321, clauses 5.1.4, 5.1.5). If the field is absent, UE shall use the value of preambleTransMax in RACH-ConfigGeneric in the configured BWP. The field is absent if RACH-ConfigGenericTwoStepRA is included in CFRA-TwoStep in RACH-ConfigDedicated and then the UE uses the value of preambleTransMax in RACH-ConfigGenericTwoStepRA configured for CBRA. |

| Conditional Presence | Explanation |
|---|---|
| 2StepOnly | The field is mandatory present if there are no 4-step random access configurations configured in the BWP, i.e., only 2-step random access type configured in the BWP, otherwise the field is Need S |
| 2StepOnlyNoCFRA | The field is mandatory present if RACH-ConfigGenericTwoStepRA is included in the RACH-ConfigCommonTwoStepRA and there are no 4-step random access configurations configured in the BWP (i.e., only 2-step random access type configured in the BWP), otherwise (i.e., 4-step random access configuration also exists in the BWP) the field is optional, Need S. When RACH-ConfigGenericTwoStepRA is included in the RACH-ConfigDedicated, this field is absent. |
| NoCFRA | The field is mandatory present if RACH-ConfigGenericTwoStepRA is not included in CFRA-TwoStep in RACH-ConfigDedicated, otherwise the field is absent, Need S. |

RA-Prioritization information element

```
-- ASN1START
-- TAG-RA-PRIORITIZATION-START
RA-Prioritization ::=                SEQUENCE {
   powerRampingStepHighPriority        ENUMERATED {dB0, dB2, dB4, dB6},
   scalingFactorBI                     ENUMERATED {zero, dot25, dot5, dot75}
OPTIONAL,   -- Need R
   ...
}
-- TAG-RA-PRIORITIZATION-STOP
-- ASN1STOP
```

| RA-Prioritization field descriptions |
|---|
| powerRampingStepHighPrioritiy<br>Power ramping step applied for prioritized random access procedure.<br>scalingFactorBI<br>Scaling factor for the backoff indicator (BI) for the prioritized random access procedure. (see TS 38.321, clause 5.1.4). Value zero corresponds to 0, value dot25 corresponds to 0.25 and so on. |

RACH-ConfigCommon information element

```
-- ASN1START
-- TAG-RACH-CONFIGCOMMON-START
RACH-ConfigCommon ::=                         SEQUENCE {
   rach-ConfigGeneric                           RACH-ConfigGeneric,
   totalNumberOfRA-Preambles                    INTEGER (1..63)
OPTIONAL,   -- Need S
   ssb-perRACH-OccasionAndCB-PreamblesPerSSB       CHOICE {
      oneEighth                                      ENUMERATED
{n4,n8,n12,n16,n20,n24,n28,n32,n36,n40,n44,n48,n52,n56,n60,n64},
      oneFourth                                      ENUMERATED
{n4,n8,n12,n16,n20,n24,n28,n32,n36,n40,n44,n48,n52,n56,n60,n64},
      oneHalf                                        ENUMERATED
{n4,n8,n12,n16,n20,n24,n28,n32,n36,n40,n44,n48,n52,n56,n60,n64},
      one                                            ENUMERATED
{n4,n8,n12,n16,n20,n24,n28,n32,n36,n40,n44,n48,n52,n56,n60,n64},
      two                                            ENUMERATED
{n4,n8,n12,n16,n20,n24,n28,n32},
      four                                           INTEGER (1..16),
      eight                                          INTEGER (1..8),
      sixteen                                        INTEGER (1..4)
   }
OPTIONAL,   -- Need M
   groupBconfigured                             SEQUENCE {
      ra-Msg3SizeGroupA                            ENUMERATED {b56, b144, b208, b256, b282, b480,
b640,
                                                      b800, b1000, b72, spare6,
spare5, spare4, spare3, spare2, spare1},
      messagePowerOffsetGroupB                     ENUMERATED { minusinfinity, dB0, dB5, dB8, dB10,
dB12, dB15, dB18},
```

-continued

RACH-ConfigCommon information element

```
      numberOfRA-PreamblesGroupA                 INTEGER (1..64)
   }
OPTIONAL,   -- Need R
   ra-ContentionResolutionTimer                 ENUMERATED { sf8, sf16, sf24, sf32, sf40, sf48,
sf56, sf64},
   rsrp-ThresholdSSB                            RSRP-Range
OPTIONAL,   -- Need R
   rsrp-ThresholdSSB-SUL                        RSRP-Range
OPTIONAL,   -- Cond SUL
   prach-RootSequenceIndex                      CHOICE {
      l839                                         INTEGER (0..837),
      l139                                         INTEGER (0..137)
   },
   msg1-SubcarrierSpacing                       SubcarrierSpacing
OPTIONAL,   -- Cond L139
   restrictedSetConfig                          ENUMERATED {unrestrictedSet, restrictedSetTypeA,
restrictedSetTypeB},
   msg3-transformPrecoder                       ENUMERATED {enabled}
OPTIONAL,   -- Need R
   ...,
   [ [
   ra-PrioritizationForAccessIdentity           SEQUENCE {
      ra-Prioritization-r16                        RA-Prioritization,
      ra-PrioritizationForAI-r16                   BIT STRING (SIZE (2))
   }
OPTIONAL,   -- Cond InitialBWP-Only
   prach-RootSequenceIndex-r16                  CHOICE {
      l571                                         INTEGER (0..569),
      l1151                                        INTEGER (0..1149)
   }   OPTIONAL   -- Need R
   ] ]
}
-- TAG-RACH-CONFIGCOMMON-STOP
-- ASN1STOP
```

RACH-ConfigCommon field descriptions messagePowerOffsetGroupB
Threshold for preamble selection. Value is in dB. Value minusinfinity corresponds to-infinity. Value dB0 corresponds to 0 dB, dB5 corresponds to 5 dB and so on. (see TS 38.321, clause 5.1.2)

msg1-SubcarrierSpacing
Subcarrier spacing of PRACH (see TS 38.211, clause 5.3.2). Only the values 15 or 30 kHz (FR1), and 60 or 120 kHz (FR2) are applicable. If absent, the UE applies the SCS as derived from the prach-ConfigurationIndex in RACH-ConfigGeneric (see tables Table 6.3.3.1-1 and Table 6.3.3.2-2, TS 38.211). The value also applies to contention free random access (RACH-ConfigDedicated), to SI-request and to contention-based beam failure recovery (CB-BFR). But it does not apply for contention free beam failure recovery (CF-BFR) (see BeamFailureRecoveryConfig).

msg3-transformPrecoder
Enables the transform precoder for Msg3 transmission according to clause 6.1.3 of TS 38.214. If the field is absent, the UE disables the transformer precoder (see TS 38.213, clause 8.3).

numberOfRA-PreamblesGroupA
The number of CB preambles per SSB in group A. This determines implicitly the number of CB preambles per SSB available in group B. (see TS 38.321, clause 5.1.1). The setting should be consistent with the setting of ssb-perRACH-OccasionAndCB-PreamblesPerSSB.

prach-RootSequenceIndex
PRACH root sequence index (see TS 38.211, clause 6.3.3.1). The value range depends on whether L = 839 or L = 139. The short/long preamble format indicated in this IE should be consistent with the one indicated in prach-ConfigurationIndex in the RACH-ConfigDedicated (if configured). If prach-RootSequenceIndex-r16 is signalled, UE shall ignore the prach-RootSequenceIndex (without suffix).

ra-ContentionResolutionTimer
The initial value for the contention resolution timer (see TS 38.321, clause 5.1.5). Value sf8 corresponds to 8 subframes, value sf16 corresponds to 16 subframes, and so on.

ra-Msg3SizeGroupA
Transport Blocks size threshold in bits below which the UE shall use a contention-based RA preamble of group A. (see TS 38.321, clause 5.1.2).

ra-PrioritizationForAI
Indicates whether the field ra-Prioritization-r16 applies for Access Identities. The first/leftmost bit corresponds to Access Identity 1, the next bit corresponds to Access Identity 2. Value 1 indicates that the field ra-Prioritization-r16 applies otherwise the field does not apply (see TS 23.501).

-continued

| RACH-ConfigCommon field descriptions |
| --- |
| ra-Prioritization<br>Parameters which apply for prioritized random access procedure on any UL BWP of SpCell for specific Access Identities (see TS 38.321, clause 5.1.1a).<br>rach-ConfigGeneric<br>RACH parameters for both regular random access and beam failure recovery.<br>restrictedSetConfig<br>Configuration of an unrestricted set or one of two types of restricted sets, see TS 38.211, clause 6.3.3.1.<br>rsrp-ThresholdSSB<br>UE may select the SS block and corresponding PRACH resource for path-loss estimation and (re)transmission based on SS blocks that satisfy the threshold (see TS 38.213).<br>rsrp-ThresholdSSB-SUL<br>The UE selects SUL carrier to perform random access based on this threshold (see TS 38.321, clause 5.1.1). The value applies to all the BWPs.<br>ssb-perRACH-OccasionAndCB-PreamblesPerSSB<br>The meaning of this field is twofold: the CHOICE conveys the information about the number of SSBs per RACH occasion. Value oneEighth corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). See TS 38.213.<br>totalNumberOfRA-Preambles<br>Total number of preambles used for contention based and contention free 4-step or 2-step random access in the RACH resources defined in RACH-ConfigCommon, excluding preambles used for other purposes (e.g., for SI request). If the field is absent, all 64 preambles are available for RA. The setting should be consistent with the setting of ssb-perRACH-OccasionAndCB-PreamblesPerSSB, i.e., it should be a multiple of the number of SSBs per RACH occasion. |

| Conditional Presence | Explanation |
| --- | --- |
| L139 | The field is mandatory present if prach-RootSequenceIndex L = 139, otherwise the field is absent, Need S. |
| SUL | The field is mandatory present in initialUplinkBWP in supplementaryUplink; otherwise, the field is absent. |
| InitialBWP-Only | This field is optionally present, Need R, if this BWP is the initial BWP of SpCell. Otherwise, the field is absent. |

RACH-ConfigCommonTwoStepRA information element

```
-- ASN1START
-- TAG-RACH-CONFIGCOMMONTWOSTEPRA-START
RACH-ConfigCommonTwoStepRA-r16 ::=                     SEQUENCE {
  rach-ConfigGenericTwoStepRA-r16                        RACH-ConfigGenericTwoStepRA-r16,
  msgA-TotalNumberOfRA-Preambles-r16                     INTEGER (1..63)
OPTIONAL, -- Need S
  msgA-SSB-PerRACH-OccasionAndCB-PreamblesPerSSB-r16     CHOICE {
    oneEighth                                              ENUMERATED
{n4,n8,n12,n16,n20,n24,n28,n32,n36,n40,n44,n48,n52,n56,n60,n64},
    oneFourth                                              ENUMERATED
{n4,n8,n12,n16,n20,n24,n28,n32,n36,n40,n44,n48,n52,n56,n60,n64},
    oneHalf                                                ENUMERATED
{n4,n8,n12,n16,n20,n24,n28,n32,n36,n40,n44,n48,n52,n56,n60,n64},
    one                                                    ENUMERATED
{n4,n8,n12,n16,n20,n24,n28,n32,n36,n40,n44,n48,n52,n56,n60,n64},
    two                                                    ENUMERATED
{n4,n8,n12,n16,n20,n24,n28,n32},
    four                                                   INTEGER(1..16),
    eight                                                  INTEGER(1..8),
    sixteen                                                INTEGER(1..4)
  }
OPTIONAL, -- Cond 2StepOnly
  msgA-CB-PreamblesPerSSB-PerSharedRO-r16                INTEGER (1..60)
OPTIONAL, -- Cond SharedRO
  msgA-SSB-SharedRO-MaskIndex-r16                        INTEGER (1..15)
OPTIONAL, -- Need S
  groupB-ConfiguredTwoStepRA-r16                         GroupB-ConfiguredTwoStepRA-r16
```

-continued

RACH-ConfigCommonTwoStepRA information element

```
OPTIONAL, -- Need S
  msgA-PRACH-RootSequenceIndex-r16                    CHOICE {
    l839                                                INTEGER (0..837),
    l139                                                INTEGER (0..137),
    l571                                                INTEGER (0..569),
    l1151                                               INTEGER (0..1149)
  }
OPTIONAL, -- Cond 2StepOnly
  msgA-TransMax-r16                                   ENUMERATED {n1, n2, n4, n6, n8, n10,
n20, n50, n100, n200}   OPTIONAL, -- Need R
  msgA-RSRP-Threshold-r16                             RSRP-Range
OPTIONAL, -- Cond 2Step4Step
  msgA-RSRP-ThresholdSSB-r16                          RSRP-Range
OPTIONAL, -- Need R
  msgA-SubcarrierSpacing-r16                          SubcarrierSpacing
OPTIONAL, -- Cond 2StepOnlyL139
  msgA-RestrictedSetConfig-r16                        ENUMERATED {unrestrictedSet,
restrictedSetTypeA,
                                                          restrictedSetTypeB}
OPTIONAL, -- Cond 2StepOnly
  ra-PrioritizationForAccessIdentityTwoStep-r16       SEQUENCE {
    ra-Prioritization-r16                               RA-Prioritization,
    ra-PrioritizationForAI-r16                          BIT STRING (SIZE (2))
  }
OPTIONAL, -- Cond InitialBWP-Only
  ra-ContentionResolutionTimer-r16                    ENUMERATED {sf8, sf16, sf24, sf32,
sf40, sf48, sf56, sf64}   OPTIONAL, -- Cond 2StepOnly
  ...
}
GroupB-ConfiguredTwoStepRA-r16 ::=                    SEQUENCE {
  ra-MsgA-SizeGroupA                                  ENUMERATED {b56, b144, b208, b256,
b282, b480, b640, b800,
                                                          b1000, b72, spare6,
spare5, spare4, spare3, spare2, spare1},
  messagePowerOffsetGroupB                            ENUMERATED {minusinfinity, dB0, dB5,
dB8, dB10, dB12, dB15, dB18},
  numberofRA-PreamblesGroupA                          INTEGER (1..64)
}
-- TAG-RACH-CONFIGCOMMONTWOSTEPRA-STOP
-- ASN1STOP
```

RACH-ConfigCommonTwoStepRA field descriptions groupB-ConfiguredTwoStepRA
Preamble grouping for 2-step random access type. If the field is absent then there is only one preamble group configured and only one msgA PUSCH configuration.

msgA-CB-PreamblesPerSSB-PerSharedRO
Number of contention-based preambles used for 2-step RA type from the non-CBRA 4-step type preambles associated with each SSB for RO shared with 4-step type RA. The number of preambles for 2-step RA type shall not exceed the number of preambles per SSB minus the number of contention-based preambles per SSB for 4-step type RA. The possible value range for this parameter needs to be aligned with value range for the configured SSBs per RACH occasion in SSB-perRACH-OccasionAndCB-PreamblesPerSSB in RACH-ConfigCommon. The field is only applicable for the case of shared ROs with 4-step type random access.

msgA-PRACH-RootSequenceIndex
PRACH root sequence index. If the field is not configured, the UE applies the value in field prach-RootSequenceIndex in RACH-ConfigCommon in the configured BWP. When both 2-step and 4-step type random access is configured, this field is only configured for the case of separate ROs between 2-step and 4-step type random access.

msgA-RestrictedSetConfig
Configuration of an unrestricted set or one of two types of restricted sets for 2-step random access type preamble. If the field is not configured, the UE applies the value in field restrictedSetConfig in RACH-ConfigCommon in the configured BWP. When both 2-step and 4-step type random access is configured, this field is only configured for the case of separate ROs between 2-step and 4-step type random access.

msgA-RSRP-Threshold
The UE selects 2-step random access type to perform random access based on this threshold (see TS 38.321, clause 5.1.1). This field is only present if both 2-step and 4-step RA type are configured for the BWP.

msgA-RSRP-ThresholdSSB
UE may select the SS block and corresponding PRACH resource for path-loss estimation and (re)transmission based on SS blocks that satisfy the threshold (see TS 38.213).

msgA-SSB-PerRACH-OccasionAndCB-PreamblesPerSSB

-continued

| RACH-ConfigCommonTwoStepRA field descriptions |
|---|
| The meaning of this field is twofold: the CHOICE conveys the information about the number of SSBs per RACH occasion. Value oneEight corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). If the field is not configured and both 2-step and 4-step are configured for the BWP, the UE applies the value in the field ssb-perRACH-OccasionAndCB-PreamblesPerSSB in RACH-ConfigCommon. The field is not present when RACH occasions are shared between 2-step and 4-step type random access in the BWP. |
| msgA-SSB-SharedRO-MaskIndex |
| Indicates the subset of 4-step type ROs shared with 2-step random access type for each SSB. This field is configured when there is more than one RO per SSB. If the field is absent, and 4-step and 2-step has shared ROs, then all ROs are shared. |
| msgA-SubcarrierSpacing |
| Subcarrier spacing of PRACH (see TS 38.211, clause 5.3.2). Only the values 15 or 30 kHz (FR1), and 60 or 120 kHz (FR2) are applicable. The field is only present in case of 2-step only BWP, otherwise the UE applies the SCS as derived from the msg1-SubcarrierSpacing in RACH-ConfigCommon. The value also applies to contention free 2-step random access type (RACH-ConfigDedicated). |
| msgA-TotalNumberOfRA-Preambles |
| Indicates the total number of preambles used for contention-based and contention-free 2-step random access type when ROs for 2-step are not shared with 4-step. If the field is absent, and 2-step and 4-step does not have shared ROs, all 64 preambles are available for 2-step random access type. |
| msgA-TransMax |
| Max number of MsgA preamble transmissions performed before switching to 4-step random access (see TS 38.321, clauses 5.1.1). This field is only applicable when 2-step and 4-step RA type are configured and switching to 4-step type RA is supported. If the field is absent, switching from 2-step RA type to 4-step RA type is not allowed. |
| ra-PrioritizationForAI |
| Indicates whether the field ra-Prioritization-r16 applies for Access Identities. The first/leftmost bit corresponds to Access Identity 1, the next bit corresponds to Access Identity 2. Value 1 indicates that the field ra-Prioritization-r16 applies, otherwise the field does not apply. |
| ra-ContentionResolutionTimer |
| The initial value for the contention resolution timer for fallback RAR in case no 4-step random access type is configured (see TS 38.321, clause 5.1.5). Value sf8 corresponds to 8 subframes, value sf16 corresponds to 16 subframes, and so on. If both 2-step and 4-step random access type resources are configured on the BWP, then this field is absent. |
| ra-Prioritization |
| Parameters which apply for prioritized random access procedure on any UL BWP of SpCell for specific Access Identities (see TS 38.321, clause 5.1.1a). |
| rach-ConfigGenericTwoStepRA |
| 2-step random access type parameters for both regular random access and beam failure recovery. |

| GroupB-ConfiguredTwoStepRA field descriptions |
|---|
| messagePowerOffsetGroupB |
| Threshold for preamble selection. Value is in dB. Value minusinfinity corresponds to -infinity. Value dB0 corresponds to 0 dB, dB5 corresponds to 5 dB and so on. (see TS 38.321, clause 5.1.1). |
| numberofRA-PreamblesGroupA |
| The number of CB preambles per SSB in group A for idle/inactive or connected mode. The setting of the number of preambles for each group should be consistent with ssb-perRACH-OccasionAndCB-PreamblesPerSSB-TwoStepRA or msgA-CB-PreamblesPerSSB if configured. |
| ra-MsgA-SizeGroupA |
| Transport block size threshold in bits below which the UE shall use a contention-based RA preamble of group A. (see TS 38.321, clause 5.1.1). |

| Conditional Presence | Explanation |
|---|---|
| 2StepOnlyL139 | The field is mandatory present if prach-RootSequenceIndex L = 139 and no 4-step random access type is configured, otherwise the field is absent, Need S. |
| 2StepOnly | The field is mandatory present if there are no 4-step random access configurations configured in the BWP, i.e., only 2-step random access type configured in the BWP, otherwise the field is Need S. |
| SharedRO | The field is mandatory present if the 2-step random access type occasions are shared with 4-step random access type, otherwise the field is not present. |
| 2Step4Step | The field is mandatory present if both 2-step random access type and 4-step random access type are configured in the BWP, otherwise the field is not present. |
| InitialBWP-Only | This field is optionally present, Need R, if this BWP is the initial BWP of SpCell. Otherwise, the field is absent. |

RACH-ConfigDedicated information element

```
-- ASN1START
-- TAG-RACH-CONFIGDEDICATED-START
RACH-ConfigDedicated ::=                    SEQUENCE {
   cfra                                       CFRA
OPTIONAL, -- Need S
   ra-Prioritization                          RA-Prioritization
OPTIONAL, -- Need N
   ...,
   [[
   ra-PrioritizationTwoStep-r16               RA-Prioritization
OPTIONAL, -- Need N
   cfra-TwoStep-r16                           CFRA-TwoStep-r16
OPTIONAL  -- Need S
   ]]
}
CFRA ::=                                    SEQUENCE {
   occasions                                  SEQUENCE {
      rach-ConfigGeneric                         RACH-ConfigGeneric,
      ssb-perRACH-Occasion                       ENUMERATED {oneEighth, oneFourth, oneHalf, two,
four, eight, sixteen}
OPTIONAL  -- Cond Mandatory
   }
OPTIONAL, -- Need S
   resources                                  CHOICE {
      ssb                                        SEQUENCE {
         ssb-ResourceList                           SEQUENCE (SIZE(1..maxRA-SSB-Resources)) OF CFRA-
SSB-Resource,
         ra-ssb-OccasionMaskIndex                   INTEGER (0..15)
      },
      csirs                                      SEQUENCE {
         csirs-ResourceList                         SEQUENCE (SIZE(1..maxRA-CSIRS-Resources)) OF CFRA-
CSIRS-Resource,
         rsrp-ThresholdCSI-RS                       RSRP-Range
      }
   },
   ...,
   [[
   totalNumberOfRA-Preambles INTEGER (1..63)
OPTIONAL -- Cond Occasions
   ]]
}
CFRA-TwoStep-r16 ::=                           SEQUENCE {
   occasionsTwoStepRA-r16                         SEQUENCE {
      rach-ConfigGenericTwoStepRA-r16                RACH-ConfigGenericTwoStepRA-r16,
      ssb-PerRACH-OccasionTwoStepRA-r16              ENUMERATED {oneEighth, oneFourth, oneHalf,
one,
                                                        two, four, eight, sixteen}
   }
OPTIONAL, -- Need S
   msgA-CFRA-PUSCH-r16                            MsgA-PUSCH-Resource-r16,
   msgA-TransMax-r16                              ENUMERATED {n1, n2, n4, n6, n8, n10, n20, n50,
n100, n200}   OPTIONAL, -- Need S
   resourcesTwoStep-r16                           SEQUENCE {
      ssb-ResourceList                               SEQUENCE (SIZE(1..maxRA-SSB-Resources)) OF
CFRA-SSB-Resource,
      ra-ssb-OccasionMaskIndex                       INTEGER (0..15)
```

-continued

RACH-ConfigDedicated information element

```
   },
   ...
}
CFRA-SSB-Resource ::=                     SEQUENCE {
   ssb                                       SSB-Index,
   ra-PreambleIndex                          INTEGER (0..63),
   ...,
   [ [
   msgA-PUSCH-resource-Index-r16             INTEGER (0..3071)   OPTIONAL -- Cond 2StepCFRA
   ] ]
}
CFRA-CSIRS-Resource ::=                   SEQUENCE {
   csi-RS                                    CSI-RS-Index,
   ra-OccasionList                           SEQUENCE (SIZE(1..maxRA-OccasionsPerCSIRS)) OF INTEGER
(0..maxRA-Occasions-1),
   ra-PreambleIndex                          INTEGER (0..63),
   ...
}
-- TAG-RACH-CONFIGDEDICATED-STOP
-- ASN1STOP
```

| CFRA-CSIRS-Resource field descriptions |
|---|
| csi-RS<br>The ID of a CSI-RS resource defined in the measurement object associated with this serving cell.<br>ra-OccasionList<br>RA occasions that the UE shall use when performing CF-RA upon selecting the candidate beam identified by this CSI-RS. The network ensures that the RA occasion indexes provided herein are also configured by prach-ConfigurationIndex and msg1-FDM. Each RACH occasion is sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots.<br>ra-PreambleIndex<br>The RA preamble index to use in the RA occasions associated with this CSI-RS. |

| CFRA field descriptions |
|---|
| occasions<br>RA occasions for contention free random access. If the field is absent, the UE uses the RA occasions configured in RACH-ConfigCommon in the first active UL BWP.<br>ra-ssb-OccasionMaskIndex<br>Explicitly signalled PRACH Mask Index for RA Resource selection in TS 38.321. The mask is valid for all SSB resources signalled in ssb-ResourceList.<br>rach-ConfigGeneric<br>Configuration of contention free random access occasions for CFRA. The UE shall ignore preambleReceivedTargetPower, preambleTransMax, powerRampingStep, ra-ResponseWindow signaled within this field and use the corresponding values provided in RACH-ConfigCommon.<br>ssb-perRACH-Occasion<br>Number of SSBs per RACH occasion.<br>totalNumberOfRA-Preambles<br>Total number of preambles used for contention free random access in the RACH resources defined in CFRA, excluding preambles used for other purposes (e.g., for SI request). If the field is absent but the field occasions is present, the UE may assume all the 64 preambles are for RA. The setting should be consistent with the setting of ssb-perRACH-Occasion, if present, i.e., it should be a multiple of the number of SSBs per RACH occasion. |

| CFRA-SSB-Resource field descriptions |
|---|
| msgA-PUSCH-resource-Index<br>Identifies the index of the PUSCH resource used for MSGA CFRA. The PUSCH resource index indicates a valid PUSCH occasion (as specified in TS 38.213, subclause 8.1A) and the associated DMRS resources corresponding to a PRACH slot. The PUSCH resource indexes are sequentially numbered and are mapped to valid PUSCH occasions corresponding to a PRACH slot which are ordered, first, in increasing order of frequency resource indexes for frequency multiplexed PUSCH occasions; second, in increasing order of DMRS resource indexes within a PUSCH occasion, where a DMRS resource index $DMRS_{id}$ is determined first in an ascending order of a DMRS port index and then in an ascending order of a DMRS sequence index, third in increasing order of time resource indexes for time multiplexed PUSCH occasions within a PUSCH slot and fourth, in increasing order of indexes for PUSCH slots. For the case of contention free 2-step random access type, if this field is absent, the UE shall use the value 0.<br>ra-PreambleIndex<br>The preamble index that the UE shall use when performing CF-RA upon selecting the candidate beams identified by this SSB.<br>ssb<br>The ID of an SSB transmitted by this serving cell. |

| CFRA-TwoStep field descriptions |
|---|
| msgA-CFRA-PUSCH<br>PUSCH resource configuration(s) for msgA CFRA.<br>msgA-TransMax<br>Max number of MsgA preamble transmissions performed before switching to 4-step type random access (see TS 38.321, clauses 5.1.1). This field is only applicable when 2-step and 4-step RA type are configured and switching to 4-step type RA is supported. If the field is absent in RACH-ConfigDedidated, switching from 2-step RA type to 4-step RA type is not allowed.<br>occasionsTwoStepRA<br>RA occasions for contention free random access. If the field is absent, the UE uses the RA occasions configured in RACH-ConfigCommonTwoStepRA in the first active UL BWP.<br>ra-SSB-OccasionMaskIndex<br>Explicitly signalled PRACH Mask Index for RA Resource selection in TS 38.321. The mask is valid for all SSB resources signalled in ssb-ResourceList.<br>rach-ConfigGenericTwoStepRA<br>Configuration of contention free random access occasions for CFRA 2-step random access type.<br>ssb-PerRACH-OccasionTwoStep<br>Number of SSBs per RACH occasion for 2-step random access type. |

| RACH-ConfigDedicated field descriptions |
|---|
| cfra<br>Parameters for contention free random access to a given target cell. If this field and cfra-TwoStep are absent, the UE performs contention based random access.<br>cfra-TwoStep<br>Parameters for contention free 2-step random access type to a given target cell. Network ensures that cfra and cfra-TwoStep are not configured at the same time. If this field and cfra are absent, the UE performs contention based random access. This field may only be present if msgA-ConfigCommon is configured on the BWP.<br>ra-prioritization<br>Parameters which apply for prioritized random access procedure to a given target cell (see TS 38.321, clause 5.1.1).<br>ra-PrioritizationTwoStep<br>Parameters which apply for prioritized 2-step random access type procedure to a given target cell (see TS 38.321, clause 5.1.1). |

| Conditional Presence | Explanation |
|---|---|
| Mandatory | The field is mandatory present. |
| Occasions | The field is optionally present, Need S, if the field occasions is present, otherwise it is absent. |
| 2StepCFRA | The field is optionally present for the case of 2-step RA type contention free random access, Need S, otherwise it is absent. |

MsgA-ConfigCommon information element

```
-- ASN1START
-- TAG-MSGACONFIGCOMMON-START
MsgA-ConfigCommon-r16 ::=           SEQUENCE {
  rach-ConfigCommonTwoStepRA-r16      RACH-ConfigCommonTwoStepRA-r16,
  msgA-PUSCH-Config-r16               MsgA-PUSCH-Config-r16
OPTIONAL --Cond InitialBWPConfig
}
-- TAG-MSGACONFIGCOMMON-STOP
-- ASN1STOP
```

| MsgA-ConfigCommon field descriptions |
|---|
| msgA-PUSCH-Config<br>Configuration of cell-specific MsgA PUSCH parameters which the UE uses for contention-based MsgA PUSCH transmission of this BWP. If the field is not configured for the selected UL BWP, the UE shall use the MsgA PUSCH configuration of initial UL BWP. |
| rach-ConfigCommonTwoStepRA<br>Configuration of cell specific random access parameters which the UE uses for contention based and contention free 2-step random access type procedure as well as for 2-step RA type contention based beam failure recovery in this BWP. |

| Conditional Presence | Explanation |
|---|---|
| InitialBWPConfig | The field is mandatory present when MsgA-ConfigCommon is configured for the initial uplink BWP, or when MsgA-ConfigCommon is configured for a non-initial uplink BWP and MsgA-ConfigCommon is not configured for the initial uplink BWP, otherwise the field is Need S. |

MsgA-PUSCH-Config information element

```
-- ASN1START
-- TAG-MSGA-PUSCH-CONFIG-START
MsgA-PUSCH-Config-r16 ::=             SEQUENCE {
  msgA-PUSCH-ResourceGroupA-r16           MsgA-PUSCH-Resource-r16
OPTIONAL, -- Cond InitialBWPConfig
  msgA-PUSCH-ResourceGroupB-r16           MsgA-PUSCH-Resource-r16
OPTIONAL, -- Cond GroupBConfigured
  msgA-TransformPrecoder-r16            ENUMERATED {enabled, disabled}
OPTIONAL, -- Need R
  msgA-DataScramblingIndex-r16            INTEGER (0..1023)
OPTIONAL, -- Need S
  msgA-DeltaPreamble-r16                  INTEGER (-1..6)
OPTIONAL  -- Need R
}
MsgA-PUSCH-Resource-r16 ::=           SEQUENCE {
  msgA-MCS-r16                            INTEGER (0..15),
  nrofSlotsMsgA-PUSCH-r16                 INTEGER (1..4),
  nrofMsgA-PO-PerSlot-r16                 ENUMERATED {one, two, three, six},
```

-continued

MsgA-PUSCH-Config information element

```
  msgA-PUSCH-TimeDomainOffset-r16             INTEGER (1..32),
  msgA-PUSCH-TimeDomainAllocation-r16         INTEGER (1..maxNrofUL-Allocations)
OPTIONAL, -- Need S
  startSymbolAndLengthMsgA-PO-r16             INTEGER (0..127)
OPTIONAL, -- Need S
  mappingTypeMsgA-PUSCH-r16                   ENUMERATED {typeA, typeB}
OPTIONAL, -- Need S
  guardPeriodMsgA-PUSCH-r16                   INTEGER (0..3)
OPTIONAL, -- Need R
  guardBandMsgA-PUSCH-r16                     INTEGER (0..1),
  frequencyStartMsgA-PUSCH-r16                INTEGER (0..maxNrofPhysicalResourceBlocks-
1),
  nrofPRBs-PerMsgA-PO-r16                     INTEGER (1..32),
  nrofMsgA-PO-FDM-r16                         ENUMERATED {one, two, four, eight},
  msgA-IntraSlotFrequencyHopping-r16          ENUMERATED {enabled}
OPTIONAL, -- Need R
  msgA-HoppingBits-r16                        BIT STRING (SIZE(2))
OPTIONAL, -- Need R
  msgA-DMRS-Config-r16                        MsgA-DMRS-Config-r16,
  nrofDMRS-Sequences-r16                      INTEGER (1..2),
  msgA-Alpha-r16                              ENUMERATED {alpha0, alpha04, alpha05,
alpha06,
                                                alpha07, alpha08, alpha09,
alpha1}      OPTIONAL, -- Need S
  interlaceIndexFirstPO-MsgA-PUSCH-r16        INTEGER (1..10)
OPTIONAL, -- Need R
  nrofInterlacesPerMsgA-PO-r16                INTEGER (1..10)
OPTIONAL, -- Need R
  ...
}
MsgA-DMRS-Config-r16 ::=                    SEQUENCE {
  msgA-DMRS-AdditionalPosition-r16            ENUMERATED {pos0, pos1, pos3}
OPTIONAL, -- Need S
  msgA-MaxLength-r16                          ENUMERATED {len2}
OPTIONAL, -- Need S
  msgA-PUSCH-DMRS-CDM-Group-r16               INTEGER (0..1)
OPTIONAL, -- Need S
  msgA-PUSCH-NrofPorts-r16                    INTEGER (0..1)
OPTIONAL, -- Need S
  msgA-ScramblingID0-r16                      INTEGER (0..65536)
OPTIONAL, -- Need S
  msgA-ScramblingID1-r16                      INTEGER (0..65536)
OPTIONAL  -- Need S
}
-- TAG-MSGA-PUSCH-CONFIG-STOP
-- ASN1STOP
```

| MsgA-PUSCH-Config field descriptions |
| --- |
| msgA-DataScramblingIndex<br>Identifier used to initiate data scrambling (c_init) for msgA PUSCH. If the field is absent the UE applies the value Physical cell ID (physCellID). |
| msgA-DeltaPreamble<br>Power offset of msgA PUSCH relative to the preamble received target power (see TS 38.213, clause 7.1). |
| msgA-PUSCH-ResourceGroupA<br>MsgA PUSCH resources that the UE shall use when performing MsgA transmission using preambles group A. If field is not configured for the selected UL BWP, the UE shall use the MsgA PUSCH configuration for group A of initial UL BWP. |
| msgA-PUSCH-ResourceGroupB<br>MsgA PUSCH resources that the UE shall use when performing MsgA transmission using preambles group B. |
| msgA-TransformPrecoder<br>Enables or disables the transform precoder for MsgA transmission (see clause 6.1.3 of TS 38.214). |

| MsgA-PUSCH-Resource field descriptions |
| --- |
| guardBandMsgA-PUSCH<br>PRB-level guard band between FDMed PUSCH occasions (see TS 38.213, clause 8.1A).<br>guardPeriodMsgA-PUSCH<br>Guard period between PUSCH occasions in the unit of symbols (see TS 38.213, clause 8.1A).<br>frequencyStartMsgA-PUSCH<br>Offset of lowest PUSCH occasion in frequency domain with respect to PRB 0 (see TS 38.213, clause 8.1A).<br>interlaceIndexFirstPO-MsgA-PUSCH<br>Interlace index of the first PUSCH occasion in frequency domain if interlaced PUSCH is configured. For 30 kHz SCS only the integers 1, 2, 3, 4, 5 are applicable (see TS 38.213, clause 8.1A).<br>mappingTypeMsgA-PUSCH<br>PUSCH mapping type A or B. If the field is absent, the UE shall use the parameter msgA-PUSCH-TimeDomainAllocation (see TS 38.213, clause 8.1A).<br>msgA-Alpha<br>Dedicated alpha value for MsgA PUSCH. If value is absent, the UE shall use the value of msg3-Alpha if configured, else UE applies value 1 (see TS 38.213, clause 7.1.1).<br>msgA-DMRS-Config<br>DMRS configuration for msgA PUSCH (see TS 38.213, clause 8.1A and TS 38.214 clause 6.2.2).<br>msgA-HoppingBits<br>Value of hopping bits to indicate which frequency offset to be used for second hop. See Table 8.3-1 in 38.213.<br>msgA-IntraSlotFrequencyHopping<br>Intra-slot frequency hopping per PUSCH occasion (see TS 38.213, clause 8.1A).<br>msgA-MCS<br>Indicates the MCS index for msgA PUSCH from the Table 6.1.4.1-1 for DFT-s-OFDM and Table 5.1.3.1-1 for CP-OFDM in 38.214.<br>msgA-PUSCH-TimeDomainAllocation<br>Indicates a combination of start symbol and length and PUSCH mapping type from the TDRA table (PUSCH-TimeDomainResourceAllocationList if provided in PUSCH-ConfigCommon, or else the default Table 6.1.2.1.1-2 in 38.214 is used if pusch-TimeDomainAllocationList is not provided in PUSCH-ConfigCommon). The parameter K2 in the table is not used for msgA PUSCH. The network configures one of msgA-PUSCH-TimeDomainAllocation and startSymbolAndLengthMsgA-PO, but not both. If the field is absent, the UE shall use the value of startSymbolAndLenghtMsgA-PO.<br>msgA-PUSCH-TimeDomainOffset<br>A single time offset with respect to the start of each PRACH slot (with at least one valid RO), counted as the number of slots (based on the numerology of active UL BWP). See 38.213, clause 8.1A.<br>nrofDMRS-Sequences<br>Number of DMRS sequences for MsgA PUSCH for CP-OFDM. In case of single PUSCH configuration or if the DMRS symbols of multiple configurations are not overlapped, if the DMRS resources configured in one PUSCH occasion is no larger than 8 (for len2) or 4 (for len1), then only DMRS port is configured.<br>nrofInterlacesPerMsgA-PO<br>Number of consecutive interlaces per PUSCH occasion if interlaced PUSCH is configured. For 30 kHz SCS only the integers 1, 2, 3, 4, 5 are applicable (see TS 38.213, clause 8.1A).<br>nrofMsgA-PO-FDM<br>The number of msgA PUSCH occasions FDMed in one time instance (see TS 38.213, clause 8.1A).<br>nrofMsgA-PO-PerSlot<br>Number of time domain PUSCH occasions in each slot. PUSCH occasions including guard period are contiguous in time domain within a slot (see TS 38.213, clause 8.1A).<br>nrofPRBs-PerMsgA-PO<br>Number of PRBs per PUSCH occasion (see TS 38.213, clause 8.1A).<br>nrofSlotsMsgA-PUSCH<br>Number of slots (in active UL BWP numerology) containing one or multiple PUSCH occasions, each slot has the same time domain resource allocation (see TS 38.213, clause 8.1A).<br>startSymbolAndLengthMsgA-PO<br>An index giving valid combinations of start symbol, length and mapping type as start and length indicator (SLIV) for the first msgA PUSCH occasion, for RRC_CONNECTED UEs in non-initial BWP as described in TS 38.214 [19] clause 6.1.2. The network configures the field so that the allocation does not cross the slot boundary. The number of occupied symbols excludes the guard period. If the field is absent, the UE shall use the value in msgA-PUSCH-TimeDomainAllocation (see TS 38.213, clause 8.1A). The network configures one of msgA-PUSCH-TimeDomainAllocation and startSymbolAndLengthMsgA-PO, but not both. If the field is absent, the UE shall use the value of msgA-PUSCH-TimeDomainAllocation. |

| MsgA-DMRS-Config field descriptions |
| --- |
| msgA-DMRS-AdditionalPosition<br>Indicates the position for additional DM-RS. If the field is absent, the UE applies value pos2. |
| msgA-MaxLength<br>indicates single-symbol or double-symbol DMRS. If the field is absent, the UE applies value len1. |
| msgA-PUSCH-DMRS-CDM-group<br>1-bit indication of indices of CDM group(s). If the field is absent, then both CDM groups are used. |
| msgA-PUSCH-NrofPort<br>0 indicates 1 port per CDM group, 1 indicates 2 ports per CDM group. If the field is absent then 4 ports per CDM group are used. |
| msgA-ScramblingID0<br>UL DMRS scrambling initialization for CP-OFDM. If the field is absent the UE applies the value Physical cell ID (physCellID). |
| msgA-ScramblingID1<br>UL DMRS scrambling initialization for CP-OFDM. If the field is absent the UE applies the value Physical cell ID (physCellID). |

| Conditional Presence | Explanation |
| --- | --- |
| GroupBConfigured | The field is mandatory present if groupB-ConfiguredTwoStepRA is configured in RACH-ConfigCommonTwoStepRA, otherwise the field is absent. |
| InitialBWPConfig | The field is mandatory present when MsgA-ConfigCommon is configured for the initial uplink BWP, or when MsgA-ConfigCommon is configured for a non-initial uplink BWP and MsgA-ConfigCommon is not configured for the initial uplink BWP, otherwise the field is Need S. |

A traditional 4-step approach is used for the NR Rel-15 (as well as for the LTE) random access procedure. An example is illustrated in FIG. 1.

FIG. 1 is a flow diagram illustrating an example four-step random access procedure. In the illustrated example, the UE detects a synchronization signal (SS) and decodes the broadcast system information before it initiates the actual random access procedure. To initiate the random access procedure, the UE transmits a random access preamble on the physical random access channel (PRACH) (referred to as message 1 (Msg1)) in the uplink using the transmission resources of a PRACH occasion (also referred to as RACH occasion (RO)) as configured by the system information.

The gNB replies with a random access response (RAR) message (referred to as message 2 (Msg2)). The UE then transmits a UE identification (referred to as message 3 (Msg3)) on the physical uplink shared channel (PUSCH), wherein the UE identification may be a 5G-S temporary mobile subscriber identity (5G-S-TMSI) in an RRCSetupRequest message (if the UE is in RRC_IDLE state) or an inactive radio network temporary identifier (I-RNTI) in an RRCResumeRequest message (if the UE is in RRC_INACTIVE state) or a cell RNTI (C-RNTI) in a C-RNTI MAC control element (CE) in a MAC protocol data unit (PDU) typically containing user plane data (if the UE is in RRC_CONNECTED state). This is referred to as message 3 (Msg3) and is transmitted on uplink resources allocated by the RAR message.

As a last step, the gNB transmits a contention resolution message (referred to as message 4 (Msg4)), wherein a UE Contention Resolution Identification MAC CE is included, containing the 48 first bits of Msg3, to resolve a possible situation where two or more UEs have transmitted the same preamble in the same PRACH occasion.

The UE transmits PUSCH (message 3) after receiving a timing advance command in the RAR, allowing PUSCH to be received with a timing accuracy within the cyclic prefix. Without the timing advance, a very large cyclic prefix (CP) would be needed to be able to detect and demodulate the PUSCH transmission, except in a cell with small distances between cell edge and gNB, where the roundtrip propagation delay between the cell edge and the gNB is less than the CP. Because NR will also support larger cells with a need for providing a timing advance to the UE, the 4-step random access procedure is designed to enable the UE to transmit on the PUSCH with a proper timing advance rather than a very large CP.

The above description of the 4-step RA procedure applies in its entirety only for contention-based random access (CBRA). For contention-free random access (CFRA), the random access procedure is in principle regarded as completed by the reception of the RAR message (provided that it includes a response to the CFRA preamble the UE transmitted).

In NR, the time and frequency resource on which a PRACH preamble is transmitted is defined as a PRACH occasion. The PRACH occasion may also be referred to as a RACH occasion, or RA occasion, or in short RO. And sometimes the RO used for the transmission of the preambles in 2-step RA is referred to as 2-step RO, while the RO used for the transmission of the preambles in 4-step RA is referred to as 4-step RO.

The time resources and preamble format for PRACH transmission are configured by a PRACH configuration index, which indicates a row in a PRACH configuration table specified in 3GPP TS 38.211 rev. 15.6.0 Tables 6.3.3.2-2, 6.3.3.2-3, 6.3.3.2-4 for FR1 paired spectrum, FR1 unpaired spectrum and FR2 with unpaired spectrum, respectively.

Part of the Table 6.3.3.2-3 for FR1 unpaired spectrum for PRACH preamble format 0 is copied in Table 1 below, where the value of x indicates the PRACH configuration period in number of system frames. The value of y indicates the system frame within each PRACH configuration period on which the PRACH occasions are configured. For example, if y is set to 0, then it means PRACH occasions are only configured in the first frame of each PRACH configuration period. The values in the column "subframe number" indicate which subframes are configured with PRACH occasion. The values in the column "starting symbol" is the symbol index.

In case of TDD, semi-statically configured downlink parts and/or actually transmitted synchronization signal blocks (SSBs) can override and invalidate some time-domain PRACH occasions defined in the PRACH configuration table. More specifically, PRACH occasions in the uplink part are always valid, and a PRACH occasion within the X part is valid as long as it does not precede or collide with an SSB in the PRACH slot and it is at least N symbols after the downlink part and the last symbol of an SSB. N is 0 or 2 depending on PRACH format and subcarrier spacing.

TABLE 1

PRACH configuration for preamble format 0 for FR1 unpaired spectrum.

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | | | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In the frequency domain, NR supports multiple frequency-multiplexed (also referred to as FDMed) PRACH occasions on the same time-domain PRACH occasion. This is mainly motivated by the support of analog receive beam sweeping in NR gNBs, such that the PRACH occasions associated with one SSB are configured at the same time instance but different frequency locations. The number of PRACH occasions FDMed in one time domain PRACH occasion, can be 1, 2, 4, or 8. FIG. 2 illustrates an example PRACH configuration in NR.

NR Rel-15 includes up to 64 sequences that can be used as random-access preambles per PRACH occasion in each cell. The RRC parameter totalNumberOfRA-Preambles determines how many of the 64 sequences are used as random-access preambles per PRACH occasion in each cell. The 64 sequences are configured by including firstly all the available cyclic shifts of a root Zadoff-Chu sequence, and secondly in the order of increasing root index, until 64 preambles have been generated for the PRACH occasion.

An alternative to the regular 4-step RA procedure is introduced in NR in 3GPP release 16. This alternative RA type is referred to as 2-step RA (or Type 2 RA). With the 2-step random access approach, a UE completes a random access procedure in only two steps, as illustrated in FIG. 3.

FIG. 3 is a flow diagram illustrating an example two-step initial access procedure. As a first step, the UE sends a message A (msgA) including random access preamble (transmitted on the PRACH) together with a PUSCH transmission, typically containing higher layer data such as an RRC message (for a UE in RRC_IDLE or RRC_INACTIVE state) or user plane data (for a UE in RRC_CONNECTED state). The part of msgA transmitted on the PRACH, i.e., the random access preamble, is sometimes referred to as msgA preamble or 2-step preamble. The part of msgA transmitted on the PUSCH is herein often referred to as msgA PUSCH.

As a second step, the gNB sends a response, referred to as message B (msgB). A msgB may contain a response to multiple UEs and it may also contain a backoff indicator, which is an indication to UEs that transmitted 2-step random access preamble in the concerned PRACH occasion but did not find any matching response in the received msgB.

The response to a UE contained in a msgB may have the form of a successRAR (more strictly denoted successRAR MAC subPDU) or a fallbackRAR (more strictly denoted fallbackRAR MAC subPDU). The response is a successRAR when the gNB successfully received msgA, including both the preamble and the msgA PUSCH transmission. The fallbackRAR is used in the case where the gNB only received the preamble but failed to receive the msgA PUSCH transmission and chooses to instruct the UE to fallback to 4-step RA for the remainder of the RA procedure, i.e., to conclude the random access procedure with a msg3 (retransmitting the content of msgA PUSCH) and a msg4.

A successRAR MAC subPDU includes a UE contention resolution identity, a timing advance command, a C-RNTI assigned to the UE and hybrid automatic repeat request (HARQ) feedback configuration consisting of a transmit power control command for the PUCCH, HARQ feedback timing information, and a PUCCH resource indicator. The content of a fallbackRAR MAC subPDU is the same as in a MAC RAR, i.e., the response to a UE in the RAR message, that is, a timing advance command, an uplink grant and a temporary C-RNTI. MsgB and its content are specified in the MAC specification 3GPP TS 38.321.

The above description of the 2-step RA procedure applies in its entirety only for contention-based random access (CBRA). For contention-free random access (CFRA), msgB is used only for fallback to 4-step RA (i.e., with a fallbackRAR addressed to the UE), whereas in the successful case, the 2-step random access procedure is concluded by a PDCCH downlink assignment addressed to the UE's C-RNTI, with an Absolute Timing Advance Command MAC CE contained in the associated PUSCH transmission.

One of the benefits of 2-step RA is the latency gains. Depending on the numerology that is used in NR, the 2-step RA procedure may lead to a reduction of approximately factor 3 compared to the 4-step RA procedure. An example is illustrated in FIG. 4.

FIG. 4 illustrates timing and latency differences between 4-step random access and 2-step random access. As illustrated, the 2-step RA procedure (lower part of FIG. 4) completes sooner than the 4-step RA procedure (upper part of FIG. 4).

The configuration of 2-step RA builds on the configuration specified for 4-step RA, but extends it with configuration data to account for the special characteristics of 2-step RA. For example, 2-step configuration includes configuration for a MsgA transmission that consists of both a PRACH transmission (a preamble) and a PUSCH transmission (data), and configuration data to control the co-existence of 2-step RA and 4-step RA.

In 2-step RA, a preamble is associated with a PUSCH Resource Unit (PUSCH RU), which is used for the MsgA PUSCH transmission. A PUSCH RU consists of a PUSCH occasion (PO), which consists of the time/frequency resource allocation for the transmission, combined with the demodulation reference signal (DMRS) configuration (DMRS port and DMRS sequence initialization) to be used for the msgA PUSCH transmission. In 3GPP release 16, the MsgA PUSCH configuration is specified in the MsgA-PUSCH-Resource-r16 IE, as follows:

```
-- ASN1START
-- TAG-MSGA-PUSCH-CONFIG-START
MsgA-PUSCH-Config-r16 ::=                    SEQUENCE {
   msgA-PUSCH-ResourceGroupA-r16               MsgA-PUSCH-Resource-r16
                                                   OPTIONAL, -- Cond InitialBWPConfig
   msgA-PUSCH-ResourceGroupB-r16               MsgA-PUSCH-Resource-r16
                                                   OPTIONAL, -- Cond GroupBConfigured
   msgA-TransformPrecoder-r16                  ENUMERATED {enabled, disabled}  OPTIONAL, -- Need R
   msgA-DataScramblingIndex-r16                INTEGER (0..1023)               OPTIONAL, -- Need S
   msgA-DeltaPreamble-r16                      INTEGER (−1..6)                 OPTIONAL  -- Need R
}
MsgA-PUSCH-Resource-r16 ::=                  SEQUENCE {
   msgA-MCS-r16                                INTEGER (0..15),
   nrofSlotsMsgA-PUSCH-r16                     INTEGER (1..4),
   nrofMsgA-PO-PerSlot-r16                     ENUMERATED {one, two, three, six},
   msgA-PUSCH-TimeDomainOffset-r16             INTEGER (1..32),
   msgA-PUSCH-TimeDomainAllocation-r16         INTEGER (1..maxNrofUL-Allocations)
```

-continued

```
                                                                        OPTIONAL, -- Need S
  startSymbolAndLengthMsgA-PO-r16          INTEGER (0..127)             OPTIONAL, -- Need S
  mappingTypeMsgA-PUSCH-r16                ENUMERATED {typeA, typeB}    OPTIONAL, -- Need S
  guardPeriodMsgA-PUSCH-r16                INTEGER (0..3)               OPTIONAL, -- Need R
  guardBandMsgA-PUSCH-r16                  INTEGER (0..1),
  frequencyStartMsgA-PUSCH-r16             INTEGER (0..maxNrofPhysicalResourceBlocks-1),
  nrofPRBs-PerMsgA-PO-r16                  INTEGER (1..32),
  nrofMsgA-PO-FDM-r16                      ENUMERATED {one, two, four, eight},
  msgA-IntraSlotFrequencyHopping-r16       ENUMERATED {enabled}         OPTIONAL, -- Need R
  msgA-HoppingBits-r16                     BIT STRING (SIZE(2))         OPTIONAL, -- Need R
  msgA-DMRS-Config-r16                     MsgA-DMRS-Config-r16,
  nrofDMRS-Sequences-r16                   INTEGER (1..2),
  msgA-Alpha-r16                           ENUMERATED {alpha0, alpha04, alpha05, alpha06,
                                             alpha07, alpha08, alpha09, alpha1}
                                                                        OPTIONAL, -- Need S
  interlaceIndexFirstPO-MsgA-PUSCH-r16     INTEGER (1..10)              OPTIONAL, -- Need R
  nrofInterlacesPerMsgA-PO-r16             INTEGER (1..10)              OPTIONAL, -- Need R
  ...
}
MsgA-DMRS-Config-r16 ::=                 SEQUENCE {
  msgA-DMRS-AdditionalPosition-r16         ENUMERATED {pos0, pos1, pos3} OPTIONAL, -- Need S
  msgA-MaxLength-r16                       ENUMERATED {len2}            OPTIONAL, -- Need S
  msgA-PUSCH-DMRS-CDM-Group-r16            INTEGER (0..1)               OPTIONAL, -- Need S
  msgA-PUSCH-NrofPorts-r16                 INTEGER (0..1)               OPTIONAL, -- Need S
  msgA-ScramblingID0-r16                   INTEGER (0..65535)           OPTIONAL, -- Need S
  msgA-ScramblingID1-r16                   INTEGER (0..65535)           OPTIONAL -- Need S
}
-- TAG-MSGA-PUSCH-CONFIG-STOP
-- ASN1STOP
```

A set of MsgA PUSCH resources configured as above are associated with each PRACH slot (i.e., a slot containing one or more PRACH occasions), such that for all the PRACH transmissions in the PRACH slot, the associated MsgA PUSCH transmission occurs in a MsgA PUSCH resource following after the PRACH slot (i.e., one of the MsgA PUSCH resources associated with the PRACH slot).

Regarding the PRACH occasions (or RACH occasions, ROs), the ROs for 2-step RA may be shared with the ROs for 4-step RA or may be separate (used only for 2-step RA). Either shared ROs or separate ROs are configured in a cell—they cannot both be used in parallel. When shared ROs are configured, separate RA preamble ranges are configured for 4-step RA and 2-step RA.

Thus, there are a set of preambles that are dedicated for use for 2-step RA in a cell where shared ROs are configured for 2-step RA and 4-step RA. For this configuration option, 2-step RA may be configured for all or a subset of the ROs configured for 4-step RA and the ROs which are shared are indicated by a configured mask. The mask can be used for a configuration where some ROs are shared, while some ROs are used only for 4-step RA. However, the opposite is not an option. There are no ROs for only 2-step RA when shared ROs are configured.

To configure ROs dedicated for 2-step RA, an alternative configuration option, i.e., separate ROs, may be used, where separate PRACH resources (i.e., time/frequency resources) are provided for 2-step ROs and 4-step Ros, respectively. With that configuration option, each RO is configured for either 2-step RA or 4-step RA, but no RO is shared by both 2-step RA and 4-step RA. As an example separate RO configuration, there may be N frequency multiplexed PRACH resources (i.e., occurring simultaneously but on different frequencies, e.g., different subcarriers), where M (M≤N) of these PRACH resources are associated with regular 4-step RA, and the remaining N-M PRACH resources are associated with 2-step RA.

When both 4-step RA and 2-step RA are configured in a cell, a UE selects which RA type to use based on the reference signal receive power (RSRP) the UE experiences in the cell (measured on the UE's configured pathloss reference signal). If the measured RSRP exceeds an RA type selection threshold, the UE selects 2-step RA, otherwise the UE selects 4-step RA. The UE performs the RA type selection only once for an entire RA procedure (where an RA procedure in this context consists of a series of RA attempts (i.e., preamble or MsgA transmissions) ending either in success or failure. The RA type selection threshold is configured by the msgA-RSRP-Threshold-r16 parameter.

If the UE selects 2-step RA, and a certain number of attempts fail, then UE may switch to 4-step RA and continue with further RA attempts. The number of failed 2-step RA attempts after which the UE switches to 4-step RA is configured by the msgA-TransMax-r16 parameter.

After the UE is connected to the network, the UE may be scheduled for uplink transmission. The gNB schedules a UE for PUSCH transmission by sending downlink control information (DCI) on the PDCCH scrambled with the UE's C-RNTI, wherein the DCI contains an uplink grant that provides an uplink transmission resource allocation to the UE through a time domain resource allocation and a frequency domain resource allocation.

The time domain resource allocation consists of four bits which indicate a row in a time domain resource allocation table. The applicable time domain resource allocation table is configured in the PUSCH-ConfigCommon IE (in SIB1 in the broadcast system information or in an RRCReconfiguration message) or in the PUSCH-Config IE in an RRCReconfiguration message, or else a default time domain resource allocation table specified in 3GPP TS 38.214 is used.

Each row in the time domain resource allocation table contains: (a) a slot offset, $K_2$, indicating the number of slots between the uplink grant and the slot for the allocated uplink transmission resources; (b) a start symbol, S, indicating the start symbol for the allocated resources within the slot indicated by $K_2$; (c) a length indicator, L, indicating the length in number of symbols of the allocated resources within the slot indicated by $K_2$; and (d) a PUSCH mapping type, A or B, which is related to which combinations of S and L that are valid and which symbol(s) of the allocated resources to which the DMRS may be allocated.

The scheduling of downlink transmission resources on the PDSCH works according to similar principles, albeit not without differences.

In addition to terrestrial networks, NR also includes satellite communication and non-terrestrial networks (NTN). There is an ongoing resurgence of satellite communications. Several plans for satellite networks have been announced in the past few years. The target services vary, from backhaul and fixed wireless, to transportation, to outdoor mobile, to IoT. Satellite networks may complement mobile networks on the ground by providing connectivity to underserved areas and multicast/broadcast services.

To benefit from the strong mobile ecosystem and economy of scale, adapting the terrestrial wireless access technologies including LTE and NR for satellite networks is drawing significant interest, which has been reflected in the 3GPP standardization work. In 3GPP release 15, 3GPP started to prepare NR for operation in a NTN. The work was performed within the study item "NR to support Non-Terrestrial Networks" and resulted in 3GPP TR 38.811. In 3GPP release 16, the work to prepare NR for operation in an NTN network continued with the study item "Solutions for NR to support Non-Terrestrial Network", which has been captured in 3GPP TR 38.821 In parallel, the interest to adapt NB-IoT and LTE-M for operation in NTN is growing. As a consequence, 3GPP release 17 contains both a work item on NR NTN and a study item on NB-IoT and LTE-M support for NTN.

A satellite radio access network usually includes the following components: a satellite that refers to a space-borne platform; an earth-based gateway that connects the satellite to a base station or a core network, depending on the choice of architecture; a feeder link that refers to the link between a gateway and a satellite; and an access link that refers to the link between a satellite and a UE.

Depending on the orbit altitude, a satellite may be categorized as low earth orbit (LEO), medium earth orbit (MEO), or geostationary earth orbit (GEO) satellite. LEO includes typical heights ranging from 250-1,500 km, with orbital periods ranging from 90-120 minutes. MEO includes typical heights ranging from 5,000-25,000 km, with orbital periods ranging from 3-15 hours. GEO includes height at about 35,786 km, with an orbital period of 24 hours.

Two basic architectures have been considered. One is the transparent payload (also referred to as bent pipe architecture). In this architecture, the gNB is located on the ground and the satellite forwards signals/data between the gNB and the UE. Another is the regenerative payload. In this architecture the gNB is located in the satellite. In the work item for NR NTN in 3GPP release 17, only the transparent architecture is considered.

FIG. 5 is an example architecture of a satellite network with bent pipe transponders. The gNB may be integrated in the gateway or connected to the gateway via a terrestrial connection (wire, optic fiber, wireless link).

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Propagation delay is an important aspect of satellite communications that is different from the delay expected in a terrestrial mobile system. For a bent pipe satellite network, the round-trip delay may, due to the orbit height, range from tens of ms in the case of LEO to several hundreds of ms for GEO. This can be compared to the round-trip delays catered for in a cellular network which are limited to 1 ms.

The distance between the user equipment (UE) and a satellite can vary significantly, depending on the position of the satellite and thus the elevation angle ε seen by the UE. Assuming circular orbits, the minimum distance is realized when the satellite is directly above the UE (ε=90°), and the maximum distance when the satellite is at the smallest possible elevation angle. Table 2 shows the distances between satellite and UE for different orbital heights and elevation angles together with the one-way propagation delay and the maximum propagation delay difference (the difference towards ε=90°). Table 2 assumes regenerative architecture. For the transparent case, the propagation delay between gateway and satellite needs to be considered as well, unless the base station corrects for that.

TABLE 2

Propagation delay for different orbital heights and elevation angles.

| Orbital height | Elevation angle | Distance UE <—> satellite | One-way propagation delay | Propagation delay difference |
|---|---|---|---|---|
| 600 km | 90° | 600 km | 2.0 ms | — |
| | 30° | 1075 km | 3.6 ms | 1.6 ms |
| | 10° | 1932 km | 6.4 ms | 4.4 ms |
| 1200 km | 90° | 1200 km | 4.0 ms | — |
| | 30° | 1999 km | 6.7 ms | 2.7 ms |
| | 10° | 3131 km | 10.4 ms | 6.4 ms |
| 35786 km | 90° | 35786 km | 119.4 ms | — |
| | 30° | 38609 km | 128.8 ms | 9.4 ms |
| | 10° | 40581 km | 135.4 ms | 16.0 ms |

The propagation delay may also be highly variable due to the high velocity of the LEO and MEO satellites and change in the order of 10-100 us every second, depending on the orbit altitude and satellite velocity.

In the context of propagation delay, the timing advance (TA) the UE uses for its uplink transmissions is essential and has to be much greater than in terrestrial networks for the uplink and downlink to be time aligned at the gNB, as is the case in NR and LTE. One of the purposes of the random access (RA) procedure is to provide the UE with a valid TA (which the network later can adjust based on the reception timing of uplink transmission from the UE). However, even the random access preamble (i.e., the initial message from the UE in the random access procedure) has to be transmitted with a timing advance to enable a reasonable size of the RA preamble reception window in the gNB, but this TA does not have to be as accurate as the TA the UE subsequently uses for other uplink transmissions. The TA the UE uses for the RA preamble transmission is referred to as "pre-compensation TA". Various proposals are considered for how to determine the pre-compensation TA, all of which involve information originating both at the gNB and at the UE.

One proposal is broadcast of a "common TA," which is valid at a certain reference point, e.g., a center point in the cell. The UE then calculates how its own pre-compensation TA deviates from the common TA, based on the difference between the UE's own location and the reference point together with the position of the satellite. Herein, the UE acquires its own position using global navigation satellite system (GNSS) measurements and the UE obtains the satellite position using satellite orbital data (including satellite position at a certain time) broadcast by the network.

Another proposal is the UE autonomously calculates the propagation delay between the UE and the satellite, based on the UE's and the satellite's respective positions, and the network/gNB broadcasts the propagation delay on the feeder link, i.e., the propagation delay between the gNB and the satellite. Herein, the UE acquires its own position using GNSS measurements and the UE obtains the satellite position using satellite orbital data (including satellite position at a certain time) broadcast by the network. The pre-compensation TA is then twice the sum of the propagation delay on the feeder link and the propagation delay between the satellite and the UE.

In another proposal, the gNB broadcasts a timestamp (in SIB9) that the UE compares with a reference timestamp acquired from GNSS. Based on the difference between the two timestamps, the UE calculates the propagation delay between the gNB and the UE, and the pre-compensation TA is twice as long as the propagation delay.

In conjunction with the random access procedure, the gNB provides the UE with an accurate (i.e., fine-adjusted) TA in the Random Access Response message (in 4-step RA) or MsgB (in 2-step RA), based on the time of reception of the random access preamble. The gNB can subsequently adjust the UE's TA using a Timing Advance Command MAC CE (or an Absolute Timing Advance Command MAC CE), based on the timing of receptions of uplink transmissions from the UE. A goal with such network control of the UE's timing advance is typically to keep the time error of the UE's uplink transmissions at the gNB's receiver within the cyclic prefix (which is required for correct decoding of the uplink transmissions).

The timing advance control framework also includes a time alignment timer with which the gNB configures the UE. The time alignment timer is restarted every time the gNB adjusts the UE's TA and if the time alignment timer expires, the UE is not allowed to transmit in the uplink without a prior random access procedure (which provides the UE with a valid timing advance).

For NTN, 3GPP has agreed that in addition to the gNB's control of the UE's TA, the UE may autonomously update its TA based on estimation of changes in the UE-gNB round trip time (RTT) using the UE's location (e.g., obtained from GNSS measurement) and knowledge of the serving satellite's ephemeris data and feeder link delay information from the gNB. The UE may signal (e.g., to the gNB) the TA that it used for the preamble transmission in Msg3 or Msg5 in 4-step RA and in MsgA (or a subsequent message) in 2-step RA.

A second relevant aspect is that not only is the propagation delay between the UE and a satellite, or between the UE and a gNB, substantially long in NTN, but due to the large distances, the difference in propagation delay to two different satellites, or two different gNBs, may be significant on the timescales relevant for cellular communication, including signaling procedures, even when the satellites/gNBs serve neighboring cells. This has an impact on all procedures involving reception or transmission in two cells served by different satellites and/or different gNBs.

A third important aspect related to the long propagation delay/RTT in NTNs is the introduction of an additional parameter to compensate for the long propagation delay/RTT. In terrestrial cellular networks, the UE-gNB RTT may range from more or less zero to several tens of microseconds in a cell. A major difference in NTNs, apart from the sheer size of the propagation delay/RTT, is that even at the location in the cell where the propagation delay/RTT is the smallest, it will be large and nowhere close to zero. In fact, the variation of the propagation delay/RTT within a NTN cell is small compared to the propagation delay/RTT. This speaks in favor of introducing an offset which essentially takes care of the RTT between the cell's footprint on the ground and the satellite, while other mechanisms, including signaling and control loops, take care of the RTT dependent aspects within the smaller range of RTT variation within the cell on top of the offset. To this end, 3GPP may specify such a parameter, which is denoted $K_{offset}$ (or sometimes K_offset).

The $K_{offset}$ parameter may be used in various timing related mechanisms, but the relevant application of $K_{offset}$ herein is its use in scheduling of uplink transmissions on the PUSCH. $K_{offset}$ is used to indicate an additional delay between the uplink grant and the PUSCH transmission resources allocated by uplink grant to be added to the slot offset parameter $K_2$ in the DCI containing the uplink grant. The offset between the uplink grant and the slot in which the PUSCH transmission resources are allocated is thus $K_{offset}+K_2$. When used this way in uplink scheduling, $K_{offset}$ ensures that the UE is not scheduled to transmit at a point in time that, due to the large TA the UE has to apply, would occur before the point in time when the UE receives the uplink grant.

As opposed to $K_2$, $K_{offset}$ is assumed to neither be included in the uplink grant nor in the uplink time domain resource allocation table to be applied. Instead, $K_{offset}$ is assumed to be signaled by other means, such as RRC signaling or MAC signaling. The network's configuration of $K_{offset}$ may account for the TA the UE signaled that it has used.

A fourth important aspect closely related to the timing is a Doppler frequency offset induced by the motion of the satellite. The access link may be exposed to Doppler shift in the order of 10-100 kHz in sub-6 GHz frequency band and proportionally higher in higher frequency bands. Also, the Doppler shift is varying, with a rate of up to several hundred Hz per second in the S-band and several kHz per second in the Ka-band.

TR 38.821 specifies that ephemeris data may be provided to the UE, for example, to assist with pointing a directional antenna (or an antenna beam) towards the satellite, and to calculate a correct Timing Advance (TA) and Doppler shift. Broadcasting of ephemeris data in the system information is one option.

A satellite orbit can be fully described using 6 parameters. Which set of parameters chosen may be decided by the user and many different representations are possible. For example, a choice of parameters used often in astronomy is the set (a, ε, i, Ω, ω, t). Here, the semi-major axis and the eccentricity ε describe the shape and size of the orbit ellipse; the inclination i, the right ascension of the ascending node Ω, and the argument of periapsis @ determine its position in space, and the epoch t determines a reference time (e.g., the time when the satellites moves through periapsis). This set of parameters is illustrated in FIG. 6.

As an example of a different parametrization, the two line elements (TLEs) use mean motion n and mean anomaly M instead of a and t. A completely different set of parameters is the position and velocity vector (x, y, z, $v_x$, $v_y$, $v_z$) of a satellite. These are sometimes referred to as orbital state vectors. They can be derived from the orbital elements and vice versa because they contain equivalent information. All these formulations (and many others) are possible choices for the format of ephemeris data to be used in NTN.

It is important that a UE can determine the position of a satellite with accuracy of at least a few meters. However, several studies have shown that this might be hard to achieve when using the de-facto standard of TLEs. On the other hand, LEO satellites often have GNSS receivers and can determine their position with meter level accuracy.

Another aspect discussed during the study item and captured in 3GPP TR 38.821, is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data are updated quite frequently, for example. The update frequency depends on the satellite and its orbit and ranges from weekly to multiple times a day for satellites on very low orbits which are exposed to strong atmospheric drag and need to perform correctional maneuvers often.

So, while it seems possible to provide the satellite position with the required accuracy, care needs to be taken to meet these requirements, e.g., when choosing the ephemeris data format, or the orbital model to be used for the orbital propagation.

The coverage pattern of NTN is described in section 4.6 of 3GPP TR 38.811 as follows. Satellite or aerial vehicles typically generate several beams over a given area. The footprint of the beams are typically elliptic shape. The beam footprint may be moving over the earth with the satellite or the aerial vehicle motion on its orbit. Alternatively, the beam footprint may be earth fixed, and a beam pointing mechanism (mechanical or electronic steering feature) compensates for the satellite or the aerial vehicle motion.

TABLE 3

Typical beam footprint size

| Attributes | GEO | Non-GEO | Aerial |
|---|---|---|---|
| Beam footprint size in diameter | 200-1000 km | 100-500 km | 5-200 km |

FIG. 7 illustrates typical beam patterns of various NTN access networks. The network on the left is a transparent (bent-pipe) network and the network on the right is a non-transparent network.

3GPP TR 38.821 describes that a NTN typically features the following elements. The NTN includes one or several sat-gateways that connect the NTN to a public data network. A GEO satellite is fed by one or several sat-gateways that are deployed across the satellite targeted coverage (e.g., regional or even continental coverage). UEs in a cell are served by one sat-gateway. A Non-GEO satellite is served successively by one sat-gateway at a time. The system ensures service and feeder link continuity between the successive serving sat-gateways with sufficient time duration to proceed with mobility anchoring and hand-over.

Four scenarios are considered as depicted in 4 and detailed in Table 5.

TABLE 4

Reference scenarios

| | Transparent satellite | Regenerative satellite |
|---|---|---|
| GEO based non-terrestrial access network | Scenario A | Scenario B |
| LEO based non-terrestrial access network | Scenario C | Scenario D |

TABLE 5

Reference scenario parameters

| Scenarios | GEO based non-terrestrial access network (Scenario A and B) | LEO based non-terrestrial access network (Scenario C & D) |
|---|---|---|
| Orbit type | Notional station keeping position fixed in terms of elevation/azimuth with respect to a given earth point | Circular orbiting around the earth |
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |

TABLE 5-continued

| Reference scenario parameters | | |
|---|---|---|
| Max channel bandwidth (service link) | 30 MHz for band < 6 GHz<br>400 MHz for band > 6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes |
| Earth-fixed beams | Yes | Scenario C: No (the beams move with the satellite)<br>Scenario D, option 1: Yes (steering beams), see note 1<br>Scenario D, option 2: No (the beams move with the satellite) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 562 ms (service and feeder links)<br>Scenario B: 281 ms | Scenario C: 25.76 ms (transparent payload: service and feeder links)<br>Scenario D: 12.88 ms (regenerative payload: service link only) |
| Max delay variation within a beam (earth fixed user equipment) | 16 ms | 4.44 ms (600 km)<br>6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion on the earth | 1000 km/h (e.g., aircraft) | 500 km/h (e.g., high speed train)<br>Possibly 1000 km/h (e.g., aircraft) |
| User equipment antenna types | Omnidirectional antenna (linear polarisation), assuming 0 dBi<br>Directive antenna (up to 60 cm equivalent aperture diameter in circular polarisation) | |
| User equipment Tx power | Omnidirectional antenna: UE power class 3 with up to 200 mW<br>Directive antenna: up to 4 W | |
| User equipment Noise figure | Omnidirectional antenna: 7 dB<br>Directive antenna: 1.2 dB | |
| Service link | 3GPP defined New Radio | |
| Feeder link | 3GPP or non-3GPP defined Radio interface | 3GPP or non-3GPP defined Radio interface |

Each satellite has the capability to steer beams towards fixed points on earth using beamforming techniques. This is applicable for a period of time corresponding to the visibility time of the satellite. Max delay variation within a beam (earth fixed user equipment) is calculated based on Min Elevation angle for both gateway and user equipment. Max differential delay within a beam is calculated based on Max beam footprint diameter at nadir.

For scenario D, which is LEO with regenerative payload, both earth-fixed and earth moving beams have been listed. Factoring in the fixed/non-fixed beams results in an additional scenario. The complete list of 5 scenarios in 3GPP TR 38.821 is then:

Scenario A—GEO, transparent satellite, Earth-fixed beams;

Scenario B—GEO, regenerative satellite, Earth fixed beams;

Scenario C—LEO, transparent satellite, Earth-moving beams;

Scenario D1—LEO, regenerative satellite, Earth-fixed beams;

Scenario D2—LEO, regenerative satellite, Earth-moving beams.

A Global Navigation Satellite System (GNSS) comprises a set of satellites orbiting the earth in orbits crossing each other, such that the orbits are distributed around the globe. The satellites transmit signals and data that allows a receiving device on earth to accurately determine time and frequency references and accurately determine its position, provided that signals are received from a sufficient number of satellites (e.g., four). The position accuracy may typically be in the range of a few meters, but using averaging over multiple measurements, a stationary device may achieve much better accuracy.

A well-known example of a GNSS is the American Global Positioning System (GPS). Other examples are the Russian Global Navigation Satellite System (GLONASS), the Chinese BeiDou Navigation Satellite System, and the European Galileo.

The transmissions from GNSS satellites include signals that a receiving device uses to determine the distance to the satellite. By receiving such signals from multiple satellites, the device can determine its position. However, this requires that the device also knows the positions of the satellites. To enable this, the GNSS satellites also transmit data about their own orbits (from which position at a certain time can be derived). In GPS, such information is referred to as ephemeris data and almanac data (or sometimes lumped together under the term navigation information).

The time required to perform a GNSS measurement, e.g. GPS measurement, may vary widely, depending on the circumstances, mainly depending on the status of the ephemeris and almanac data the measuring device has previously acquired (if any). In the worst case, a GPS measurement can take several minutes. GPS is using a bit rate of 50 bps for transmitting its navigation information. The transmission of the GPS date, time, and ephemeris information takes 90 seconds. Acquiring the GPS almanac containing orbital information for all satellites in the GPS constellation takes more than 10 minutes. If a UE already possesses this information the synchronization to the GPS signal for acquiring the UE position and Coordinated Universal Time (UTC) is a significantly faster procedure.

To handle the timing and frequency synchronization in a NR or LTE based NTN, a promising technique is to equip each device with a GNSS receiver. The GNSS receiver enables a device to estimate its geographical position. In one example, a NTN gNB carried by a satellite broadcasts its ephemeris data (i.e., data that informs the UE about the satellite's position, velocity, and orbit) to a GNSS equipped UE. The UE can then determine the propagation delay, the delay variation rate, the Doppler shift and its variation rate based on its own location (obtained through GNSS measurements) and the satellite location and movement (derived from the ephemeris data).

The GNSS receiver also allows a device to determine a time reference (e.g., in terms of Coordinated Universal Time (UTC)) and frequency reference. This can also be used to handle the timing and frequency synchronization in a NR or LTE based NTN. In a second example, a NTN gNB carried by a satellite broadcasts its timing (e.g., in terms of a Coordinated Universal Time (UTC) timestamp) to a GNSS equipped UE. The UE can then determine the propagation delay, the delay variation rate, the Doppler shift and its variation rate based on its time/frequency reference (obtained through GNSS measurements) and the satellite timing and transmit frequency.

The UE may use this knowledge to compensate its uplink transmissions for the propagation delay and Doppler effect.

The 3GPP releases for NB-IoT and LTE-M for NTN assume GNSS capability, i.e., a NTN capable UE is also GNSS capable and GNSS measurements at the UEs are essential for the operation of the NTN.

There currently exist certain challenges. For example, the timing advance a UE uses and the $K_{offset}$ parameter, in combination with required time to process a receive an uplink grant, determines the minimum delay required between an uplink grant and the uplink transmission resources allocated by the uplink grant. As described above, the $K_{offset}$ parameter ensures that the delay between the uplink grant and the uplink transmission resources is not too short, thereby preventing the situation where a UE is scheduled to transmit at a point in time that, due to the large TA the UE has to apply, would occur before the point in time when the UE is ready to transmit according to the received uplink grant.

There is thus a relation between the UE's TA and the uplink scheduling flexibility and the $K_{offset}$ parameter. For example, the gNB may base the configuration of the $K_{offset}$ parameter on a UE's TA to optimize (e.g., minimize) the delay in the uplink scheduling. Thus, when a UE autonomously adapts the TA it is using, as described above, the network's/gNB's possibility to optimize the uplink scheduling and the $K_{offset}$ parameter is hampered.

A UE reporting the TA it uses to the network/gNB mitigates this problem at the expense of increased uplink and downlink control signaling. Furthermore, frequent such TA reporting results in increased signaling overhead, while the signaled information may be redundant or too fine-grained for the gNB's need. On the other hand, too infrequent, or relaxed, TA reporting may result in suboptimal uplink scheduling, e.g., unnecessary long delay between the uplink grant and the allocated uplink transmission resources or too short delay resulting in the situation where the UE is not able to use the allocated uplink transmission resources.

SUMMARY

As described above, certain challenges currently exist with user equipment (UE) timing advance (TA) reporting in a non-terrestrial network (NTN). Certain aspects of the present disclosure and their embodiments may provide solutions to these or other challenges.

For example, in particular embodiments, the network controls how and when a UE reports the TA that the UE uses (or the UE location, based on which the network can calculate the UE TA), so that the reporting may be tailored to the uplink scheduling strategy (and $K_{offset}$ setting) that the network uses.

In general, the network configures a UE to perform UE autonomous updating of its timing advance (TA)—or alternatively the UE is enabled, allowed or mandated to do so through standard specification—and further configures the UE with rules for when and how to report the UE timing advance and/or location and/or rules for when to stop performing UE autonomous TA updates.

In some embodiments, the rules stipulate at least one condition for when a UE should report its TA (or location) to the network and/or when the UE should stop performing UE autonomous updates, wherein the condition may be based on a timer related to the time the UE has been performing UE autonomous TA updating and/or a threshold related to the accumulated size of the UE's autonomous TA adjustments.

The timer may be (re)started when the network provides a TA adjustment instruction (e.g., in the form of a Timing Advance Command MAC CE or an Absolute Timing Advance Command MAC CE) to the UE and/or when the UE reports its TA or location to the network and if/when the timer expires, the UE reports its TA or location to the network and/or stops performing UE autonomous TA updating.

When the condition is based on a threshold on TA, the UE is triggered to report its TA or location to the network and/or to stop performing the UE autonomous TA updating when the UE's accumulated autonomous TA updates exceeds the threshold. The calculation of the accumulated UE autonomous TA adjustments is (re)started at zero when the network provides a TA adjustment instruction (e.g., in the form of a Timing Advance Command MAC CE or an Absolute Timing Advance Command MAC CE) to the UE and/or when the UE reports its TA or location to the network.

The threshold may be a single threshold, in which case it has a positive value which is compared with the absolute value of the UE's accumulated autonomous TA adjustments. The threshold may also be split into two thresholds, one for positive accumulated UE autonomous TA adjustments (i.e., increasing TA) and one for negative accumulated UE autonomous TA adjustments (i.e., decreasing TA). If the threshold for negative accumulated UE autonomous TA adjustments is defined as a negative value, the threshold condition is fulfilled when the UE's accumulated autonomous TA adjustments reaches a negative value that is equal to or has a greater size (i.e., a greater absolute value) than the threshold.

When the condition is based on a threshold on distance, the UE is triggered to report its TA or location to the network and/or to stop performing the UE autonomous TA updating when the UE's distance to the location where the last reported TA or location exceeds the distance threshold. The calculation of the UE distance is (re)started at zero when the network provides a TA adjustment instruction (e.g., in the form of a Timing Advance Command MAC CE or an Absolute Timing Advance Command MAC CE) to the UE and/or when the UE reports its TA or location to the network.

The embodiments are applied together with two different principles for how to treat a TA provided by the network (e.g., through a Timing Advance Command MAC CE or an Absolute Timing Advance Command MAC CE or a Timing Advance Command in a Random Access Response message or a MsgB in a 2-step random access procedure). According to one principle, a TA provided by the network is regarded as fixed and the UE performs its autonomous TA adjustments in relation to this fixed TA value. According to a second principle, a TA provided by the network is regarded as dynamic which changes as a function of time, wherein this time dependent change is calculated based on the predictable changes of the UE-gNB propagation delay or round trip time (RTT) (or the propagation delay or RTT between the UE and a reference point somewhere on the path between the UE and the gNB, e.g., in the serving satellite or at the gateway in which case the gateway location may be made known to the UE and the UE can then calculate the changing TA), wherein the propagation delay or RTT can be derived from information about the satellite's orbit (including position and velocity), which can be obtained from the satellite's ephemeris data, and information about the propagation delay or RTT on the feeder link (i.e., the link between the GW/gNB and the satellite).

Some embodiments include an ability to modify the condition depending on the remaining time of the time alignment timer and/or the current value of the UE's accumulated autonomous TA adjustments, e.g., by scaling or modifying the monitoring timer and/or the threshold for accumulated UE autonomous TA updates. The modification may make the condition stricter (i.e., easier to be fulfilled and thus fulfilled earlier than it would have been without the modification), the less time remaining until the time alignment timer expires and/or the closer the accumulated UE autonomous TA adjustments are to its related threshold and/or the closer the UE distance from last location when TA or location was reported is to its related threshold. In particular, in some embodiments, when the condition is based on a monitoring timer, the modification may ensure that the monitoring timer never expires after the time alignment timer expires, i.e., ensuring that the monitoring timer is never running when the time alignment timer expires According to some embodiments, a method performed by a wireless device operating in a NTN comprises obtaining a first TA value for uplink transmission in the NTN. The first TA value comprises a reference TA value. The method further comprises obtaining a trigger condition for reporting a TA used by the wireless device for uplink transmission in the NTN and autonomously obtaining an adjusted TA value for uplink transmission. The adjusted TA is obtained via autonomous adjustment to the reference TA value based on a propagation delay between the wireless device and a serving satellite of the NTN. The method further comprises, upon determining the trigger condition for reporting the TA is satisfied, reporting the adjusted TA to a network node.

In particular embodiments, the trigger condition for reporting the TA comprises one or more of a timer value for performing autonomous TA adjustments, a threshold value for an accumulated amount of autonomous TA adjustments, and a location value. The threshold value for an accumulated amount of autonomous TA adjustments may comprise a first threshold value for positive accumulated TA adjustments and a second threshold value for negative accumulated TA adjustments.

In particular embodiments, the trigger condition for reporting the TA comprises one or more of a feeder link switch, a serving satellite switch, a handover, an addition of a secondary cell, and receiving an updated TA value.

In particular embodiments, the method further comprises, upon determining the trigger condition for reporting the TA is satisfied, resetting the trigger condition for reporting TA and/or refraining from adjusting autonomously the TA value for uplink transmission.

In particular embodiments, the method further comprises obtaining a second TA value for uplink transmission in the NTN. The second TA value comprises the reference TA value. The method further comprises resetting the trigger condition for reporting TA and/or refraining from adjusting autonomously the TA value for uplink transmission based on obtaining the second TA value.

In particular embodiments, the adjusted TA value becomes the reference TA value. In particular embodiments, the reference TA value is dynamically updated as a function of time with respect to the propagation delay between the wireless device and the serving satellite of the NTN.

In particular embodiments, determining the trigger condition for reporting the TA is satisfied comprises predicting when the adjusted TS will be reported.

According to some embodiments, a wireless device comprises a wireless communication interface and processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node operating in a NTN comprises transmitting a first TA value for uplink transmission in the NTN to a wireless device and transmitting, to the wireless device, an indication of a trigger condition for reporting a TA used by the wireless device for uplink transmission in the NTN. The method further comprises receiving, from the wireless device, a TA report comprising an indication of an autonomously adjusted TA value based on the first TA value and a propagation delay between the wireless device and a serving satellite of the NTN.

In particular embodiments, the indication of the trigger condition for reporting the TA comprises one or more of a timer value for performing autonomous TA adjustments, a threshold value for an accumulated amount of autonomous TA adjustments, and a location value. The threshold value for an accumulated amount of autonomous TA adjustments may comprise a first threshold value for positive accumulated TA adjustments and a second threshold value for negative accumulated TA adjustments.

In particular embodiments, the indication of the trigger condition for reporting the TA comprises one or more of a feeder link switch, a serving satellite switch, a handover, an addition of a secondary cell, and receiving an updated TA value.

According to some embodiments, a network node comprises a wireless communication interface and processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments enable the network/gNB to control how and when a UE reports the used TA or the location of the UE, so that the reporting can be tailored to the uplink scheduling strategy (and $K_{offset}$ setting) the network uses.

BRIEF DESCRIPTION OF THE DRAWINGS

For a more complete understanding of the disclosed embodiments and their features and advantages, reference is now made to the following description, taken in conjunction with the accompanying drawings, in which:

FIG. 4 illustrates timing and latency differences between 4-step random access and 2-step random access;

FIG. 12A is a flowchart illustrating an example method performed by a wireless device, according to particular embodiments;

DETAILED DESCRIPTION

Figure 1:
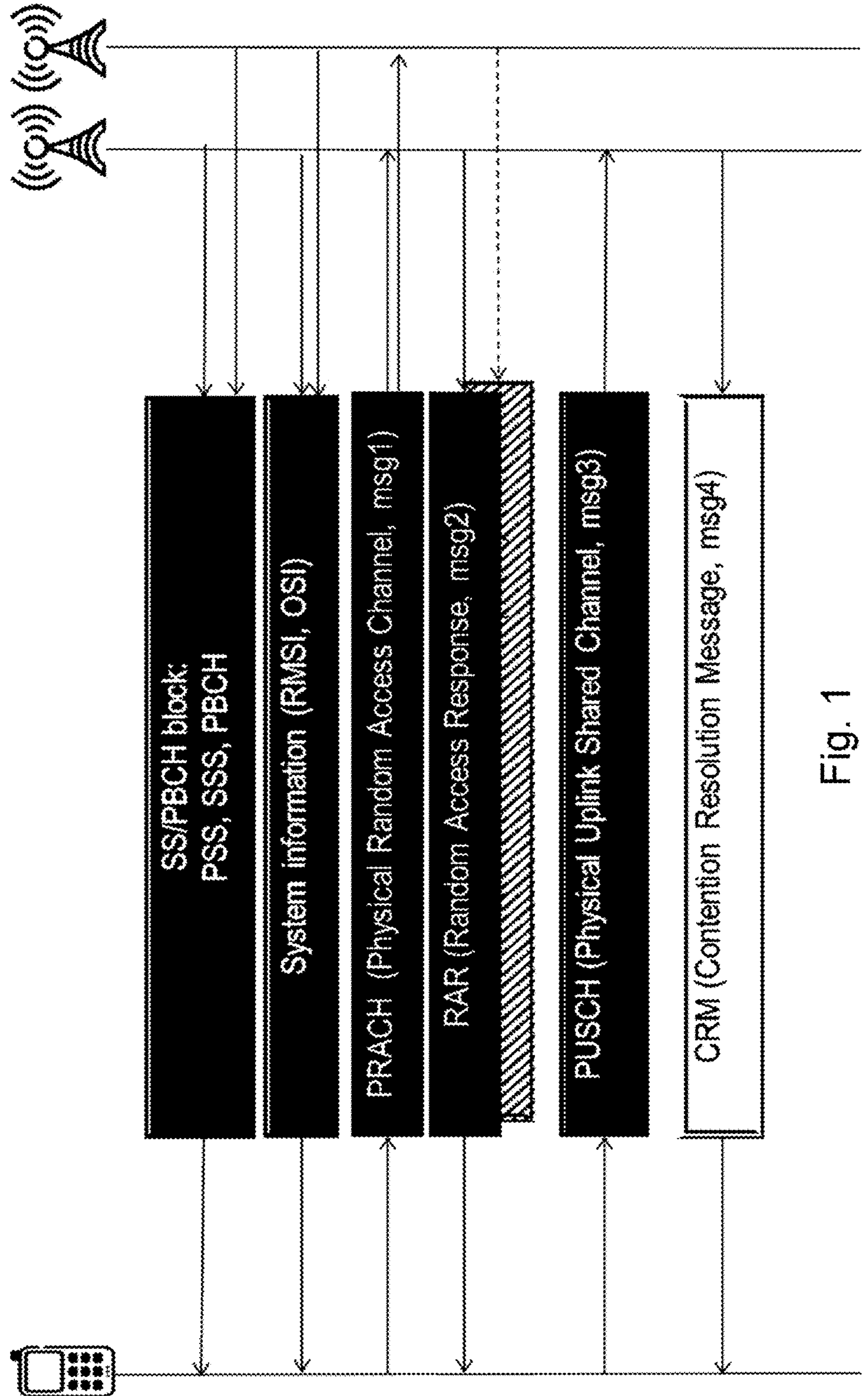
FIG. 1 is a flow diagram illustrating an example four-step random access procedure.
Figure 2:
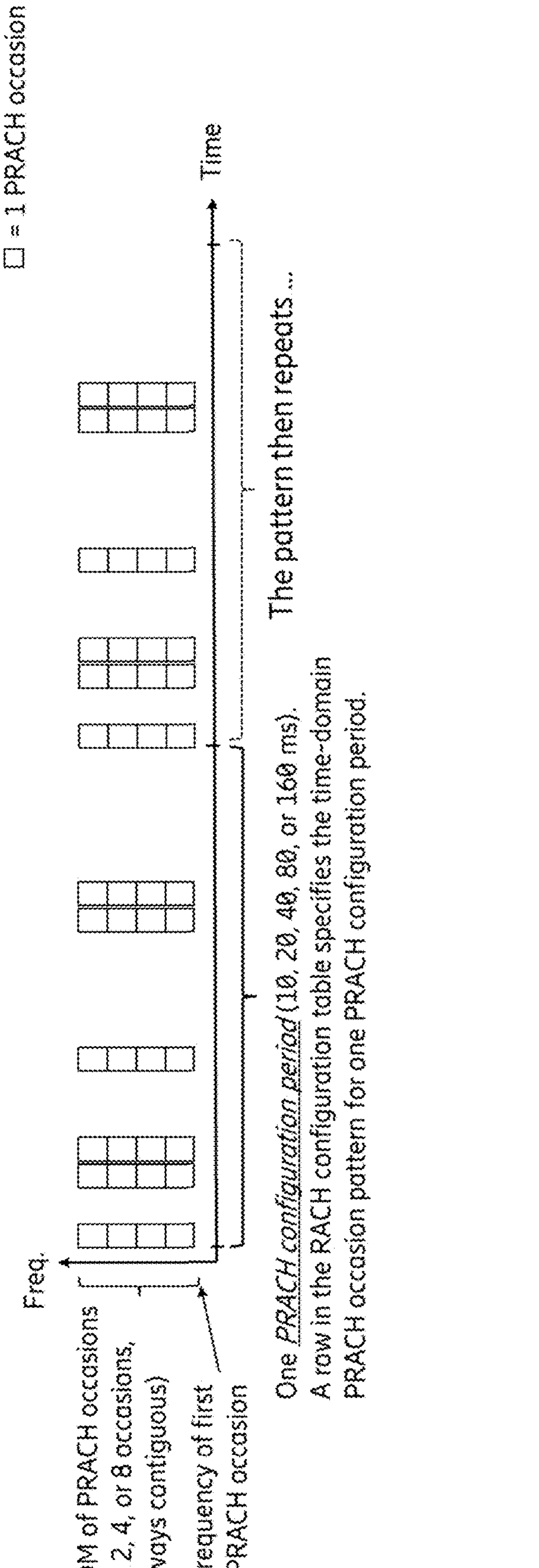
FIG. 2 illustrates an example PRACH configuration in NR.

As described above, certain challenges currently exist with user equipment (UE) timing advance (TA) reporting in a non-terrestrial network (NTN). Certain aspects of the present disclosure and their embodiments may provide solutions to these or other challenges.

For example, in particular embodiments, the network controls how and when a UE reports the TA that the UE uses (or the UE location, based on which the network can calculate the UE TA), so that the reporting may be tailored to the uplink scheduling strategy (and $K_{offset}$ setting) that the network uses.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments described herein are described mainly in terms of new radio (NR) based non-terrestrial networks (NTNs), but they are equally applicable in a NTN based on long term evolution (LTE) technology or any other network requiring a global navigation satellite system (GNSS) capability and support in a terminal device (such as a network involved in high speed train (HST) scenarios).

The term "network" is used herein to refer to a network node, which typically may be a gNB (e.g., in an NR based NTN), but which may also be an eNB (e.g., in an LTE based NTN) or another type of network node with the ability to communicate with a UE.

Transmission of a random access preamble, or random access preamble transmission, may be considered equivalent to the term physical random access channel (PRACH) transmission (because the random access preamble is transmitted on the PRACH).

Particular examples refer to the terms "UE autonomous TA updates" (or "autonomous TA updates") and "UE autonomous TA adjustments" (or "autonomous TA adjustments"), which imply that the UE performs discrete updates or adjustments, i.e., discontinuously changing the TA at separate discrete points in time. However, these terms should not be interpreted literally in this way and they do not exclude a UE performing its autonomous TA updating "continuously" rather than in the form of discrete updates. The term "UE autonomous TA updating" (or "autonomous TA updating") may have a more generic interpretation which covers both discrete updates/adjustments and continuous updating. However, even if truly continuous UE autonomous updates are not precluded, a likely alternative is a form of "close to continuous" updating which may be seen as quantized into miniscule discrete updates.

The term "preamble" is used herein as short for "random access preamble." The terms "pre-compensation TA", "pre-compensation TA value", "TA pre-compensation", "TA compensation" and sometimes "TA" (Timing Advance) may be used more or less interchangeably.

In embodiments described herein, the UE's reporting of its TA may be replaced by reporting of the UE's location. Some embodiments may mention both alternatives (e.g., "TA or UE location reporting", "TA or location reporting", "TA or UE location report", "TA or location report", "TA/location reporting", "TA/location report", "report TA or UE location", "report TA or location", "report TA/location", etc.).

In embodiments described herein, where the UE's triggered reporting of its TA or location is based on a threshold on accumulated autonomous TA updates, the trigger may be replaced by a trigger based on a threshold distance from the location where last TA or location was reported.

In embodiments described herein, the terms "satellite" is used as an example, the embodiments are applicable in other type of systems such as high altitude platform systems (HAPS) or drones or airplanes that carry the communication payload.

To address the problems described above, in particular embodiments a UE reports its used TA (thus reflecting the autonomous updates the UE has performed). Some embodiment includes elements for controlling how and when such reporting is performed.

As described above, the UE may base its autonomous TA updates on the sum of the service link round trip time (RTT) (i.e., the RTT between the serving satellite and the UE) and the feeder link RTT (i.e., the RTT between the gNB/GW and the serving satellite). The UE may calculate the serving link delay based on the serving satellite's ephemeris data and the UE's location. Regarding the feeder link RTT, the network (e.g., the gNB) provides the UE (via broadcast system information and/or dedicated signaling, such as radio resource control (RRC) or medium access control (MAC) signaling) with information about the feeder link, which enables the UE to determine the feeder link RTT.

The information about the feeder link may be an explicit indication of the feeder link RTT or propagation delay or it could be in the form of the location of the gNB/GW, in which case the UE can calculate the feeder link RTT based on the serving satellite's ephemeris data (and its therefrom derived position and movements) and the gNB/GW location. If an explicit indication of the feeder link RTT or propagation delay is used, it may comprise a snapshot, which is more or less frequently updated through further signaling, e.g., updated system information, or a mathematical function of time describing the time dependence of the feeder link RTT or propagation delay, or a series of multiple (sequentially valid) feeder link RTT or propagation delay values, wherein each of the multiple feeder link RTT or propagation delay values has an associated timestamp indicating when it becomes valid. The associated timestamps may be replaced by a common validity interval/duration (e.g., X seconds or Y milliseconds) which is applied to each of the multiple feeder link RTT or propagation delay values, or, as another alternative, each feeder link RTT or propagation delay value may have a specific associated validity interval/duration which may be different for different ones of the multiple feeder link RTT or propagation delay values. As one option, the feeder link information is part of the satellite's ephemeris data.

In some embodiments, the UE TA reporting may be replaced by the UE reporting its location. Based on the UE's location, together with the serving satellite's ephemeris data (from which the satellite's position can be derived) and knowledge of the feeder link delay (e.g., derived based on the location of the GW/gNB), the network, e.g., the gNB, may calculate the UE TA. An advantage of letting the UE report its location instead of its TA is that it facilitates for the network to predict the UE autonomous TA updates. In addition, the UE location is useful for the network to know for other purposes, e.g., in conjunction with handover assessment and various location based services, features or mechanisms. Thus, a UE's reported location may serve several purposes in addition to enabling the network to calculate the UE TA. In the embodiments where the UE reports its TA or its location, an additional option is that the UE reports both its TA and its location.

To this end, a number of TA reporting, or UE location reporting, configuration options are described herein, which the network may use to configure how and when the UE should report its TA or its location (e.g., in the form of rules, periodicities, thresholds (e.g., thresholds for the autonomous change of a TA), triggering thresholds (e.g., a threshold whose exceedance triggers TA or location reporting) or triggering events). The rules and/or conditions are preferably configured by the network and conveyed to the UE, but an alternative may be to specify the rules and/or conditions in a standard. Hybrid embodiments may specify some involved parameters while others are configurable, and/or may specify multiple rules/conditions/events and the network may indicate which one(s) of the specified rules/conditions/events the UE should apply.

The configuration information may be provided through the system information broadcast in the cell, dedicated RRC signaling (e.g., using an RRCSetupComplete message, an RRCReconfiguration message, or a new RRC message), MAC signaling (e.g., one or more new MAC CE(s)), downlink control information (DCI) (on the physical downlink control channel (PDCCH)) or a combination of any of these signaling options. The UE may report its TA or location, e.g.

using an RRC message, e.g. a new RRC message for this purpose, or a MAC message, e.g. using a new MAC CE.

In the embodiments related to a TA provided by the network, e.g., through (relative) adjustments in a Timing Advance Command MAC CE, in an Absolute Timing Advance MAC CE, or in a Timing Advance Command field in a Random Access Response message or a MsgB (in a 2-step random access procedure), the TA may be regarded as fixed, i.e., it remains unchanged unless explicitly updated by the network or autonomously updated by the UE on the UE's own initiative. The fixed TA value is the TA value relative to which a UE's accumulated autonomous updates are counted.

In the embodiments related to a TA provided by the network, e.g., through (relative) adjustments in a Timing Advance Command MAC CE, in an Absolute Timing Advance MAC CE, or in a Timing Advance Command field in a Random Access Response message or a MsgB (in a 2-step random access procedure), the TA may be regarded as dynamic, where its subsequent changes (without further explicit instructions from the network) are based on configured or specified information, typically consisting of the information about the serving satellite's position and velocity (associated with the satellite's orbit), e.g., the satellite's ephemeris data and information regarding the propagation or RTT on the feeder link (i.e., the link between the GW/gNB to the satellite). The dynamically changing TA value is the TA value relative to which a UE's accumulated autonomous updates are counted at any given time.

As one embodiment or option, whether the UE should regard a TA provided by the network as fixed or dynamic may be configurable. The instruction may thus be provided by the network through signaling, e.g., using broadcast system information signaling or using dedicated signaling, e.g., RRC signaling or MAC signaling.

In some embodiments, a TA provided by the network is fixed. In the embodiments in this section, a TA provided by the network, e.g., through (relative) adjustments in a Timing Advance Command MAC CE, in an Absolute Timing Advance MAC CE, or in a Timing Advance Command field in a Random Access Response message or a MsgB (in a 2-step random access procedure), is regarded as fixed, i.e., it remains unchanged unless explicitly updated by the network or autonomously updated by the UE on the UE's own initiative.

Using any of the above described signaling, the network, e.g. a gNB, may in some embodiments configure a UE with instructions regarding the UE's autonomous TA adaptation/updating and/or TA or location reporting, wherein the instructions may indicate one or more of the following.

The instructions may indicate that UE autonomous TA updates are allowed or not allowed. The instructions may indicate to stop UE autonomous TA updating when the accumulated autonomous updates have reached (or exceeded) a configured (or specified) threshold.

Note that when UE autonomous TA adjustments accumulate, this may lead to an increasingly large positive value or an increasingly large negative value. Thus, the threshold principle may be realized as separate thresholds for positive and negative accumulated UE autonomous TA adjustments, e.g., denoted $\Delta_{TA\text{-}acc\text{-}threshold+}$ and $\Delta_{TA\text{-}acc\text{-}threshold+}$. The condition is fulfilled when $$\sum_{i=1}^{N} \Delta_{TAi} \geq \Delta_{TA-acc-threshold+}$$

or $$\sum_{i=1}^{N} \Delta_{TAi} \leq \Delta_{TA-acc-threshold-}.$$

Alternatively, a single threshold, $\Delta_{TA\text{-}acc\text{-}threshold}$, may be used, wherein the condition is fulfilled when $$\left|\sum_{i=1}^{N} \Delta_{TAi}\right| \geq \Delta_{TA-acc-threshold}.$$

Typically, $\Delta_{TA\text{-}acc\text{-}threshold+} = -\Delta T_{A\text{-}acc\text{-}threshold-} = \Delta_{TA\text{-}acc\text{-}threshold} > 0$, but it is also possible to have differentiated threshold sizes such that $\Delta_{TA\text{-}acc\text{-}threshold+} \neq \Delta_{TA\text{-}acc\text{-}threshold-}$.

The calculation of the accumulated autonomous TA updates is restarted every time the UE's TA is adjusted by the network/gNB (e.g., in the form of a Timing Advance Command MAC CE, an Absolute Timing Advance Command MAC CE, or a Timing Advance Command field in a Random Access Response (RAR) message or a MsgB). As an optional variant, the calculation of the accumulated autonomous TA updates may also be restarted when the UE reports its TA or location to the network (even if the UE does not receive any TA adjustment instruction in response). Thus, in this embodiment, the calculation of the accumulated autonomous TA updates is restarted when the UE's TA is adjusted by the network/gNB or the UE reports its TA or location to the network.

In some embodiments, the UE stops performing UE autonomous TA updating when the UE's time alignment timer expires, irrespective of the size of the accumulated autonomous TA updates. In some embodiments, the control of the UE's autonomous TA updating is independent of the UE's time alignment timer.

In some embodiments, the UE autonomous TA update accumulation monitoring replaces the UE's time alignment timer, such that the UE's TA is valid as long as the UE is allowed to perform UE autonomous TA updating (i.e., until the maximum allowed autonomous TA update accumulation limit is reached, i.e., until the configured or specified threshold is reached or exceeded). Optionally, this may be combined with a rule that the UE should report its TA or location to the network when it stops performing autonomous TA updates because the accumulated autonomous TA updates have reached (or exceeded) the configured or specified threshold. Then the UE's TA may be valid until the UE reports a TA or location indicating that the accumulated UE autonomous TA updates have reached the configured or specified threshold.

In some embodiments, the value of the threshold for the UE's accumulated autonomous TA adjustments may be scaled or modified in a way that depends on the time alignment timer.

The instructions may indicate to stop UE autonomous TA updating when a configured (or specified) time period has elapsed (e.g., a timer has expired) since the UE's TA was last adjusted by an instruction (e.g., in the form of a Timing Advance Command MAC CE, an Absolute Timing Advance Command MAC CE, or a Timing Advance Command field in a Random Access Response (RAR) message or a MsgB) from the network/gNB. The monitoring of this time period may at least conceptually be modeled as a timer. The timer may be restarted every time the UE's TA is adjusted by the network/gNB.

In some embodiments, the instruction may comprise an indication that the UE should restart the monitoring timer when the UE reports its TA or location to the network (even if the UE does not receive any TA adjustment instruction in response). Thus, the monitoring timer may be restarted when the UE's TA is adjusted by the network/gNB or the UE reports its TA or location to the network (which means that the UE is triggered to stop the UE autonomous TA updating when a configured (or specified) time period has elapsed since the UE's TA was adjusted by the network or since the UE reported its TA or location to the network).

In some embodiments, the timer is a timer that is separate from the UE's time alignment timer. In some embodiments, when the timer is configured or restarted, it is set equal to the UE's time alignment timer, or it is set equal to the time remaining of the UE's time alignment timer.

In some embodiments, the UE's time alignment timer also serves the purpose of defining the time period during which the UE is allowed to perform continuous autonomous TA updating. That is, the UE is allowed to perform UE autonomous TA updating until the time alignment timer expires.

In some embodiments, the timer governing the UE's autonomous TA updating replaces the UE's time alignment timer (i.e., it may be said to serve the same purpose as the time alignment timer in addition to controlling the time period during which the UE is allowed to perform UE autonomous TA updating).

In some embodiments, the timer has a relation to the UE's time alignment timer, e.g., such that the timer is scaled or modified in a way that depends on the time alignment timer. The scaling or modification may ensure that the timer does not expire after the time alignment timer expires, i.e., ensuring that the timer is not running when the time alignment timer expires. The scaling or modification may depend on the time alignment timer's configured start value or on the remaining time of the time alignment timer (which decreases when the time alignment timer is running).

The instructions may indicate to stop UE autonomous TA updating when the accumulated autonomous TA updates have reached a configured (or specified) threshold (where the threshold principle optionally may be realized as separate thresholds for positive accumulated UE autonomous TA adjustments and negative accumulated UE autonomous TA adjustments) or a configured (or specified) time period has elapsed (e.g., a timer has expired) since the UE's TA was last adjusted by an instruction (e.g., in the form of a Timing Advance Command MAC CE, an Absolute Timing Advance Command MAC CE, or a Timing Advance Command field in a Random Access Response (RAR) message or a MsgB) from the network/gNB. The above described options for when to restart the calculation of the accumulated UE autonomous TA updates and/or when to restart the (conceptual) monitoring timer may be applied in this conditional stopping instruction embodiment.

In particular embodiments, the monitoring timer may have any of the relations to the UE's time alignment timer described above for the preceding embodiments (where a monitoring timer determines when the UE stops performing UE autonomous TA updating). This may thus also involve scaling or modification of the timer (e.g., the timer's start value, assuming a timer that is counted downwards and expires at zero), wherein the scaling/modification may depend on the time alignment timer or the accumulated UE autonomous TA adjustments. In some scenarios, the value of the threshold for the UE's accumulated autonomous TA adjustments may also be scaled or modified depending on the time alignment timer.

The instructions may indicate to stop UE autonomous TA updating when the UE has moved to a location which, measured along a straight line, is a distance away from the UE's position at the time of provisioning of the instructions from the network (or, alternatively, the UE's position at the time when the UE last reported its TA or UE location to the network) which exceeds a configured or specified threshold distance.

The instructions may indicate to stop UE autonomous TA updating when the UE has moved to a location which, measured along a straight line, is a distance away from the UE's position at the time of provisioning of the instructions from the network (or, alternatively, the UE's position at the time when the UE last reported its TA or UE location to the network) which exceeds a configured or specified threshold distance, or the accumulated UE autonomous TA updates have reached (or exceeded) a configured (or specified) threshold (as described above, wherein all associated options are applicable).

The instructions may indicate to stop UE autonomous TA updating when the UE has moved to a location which, measured along a straight line, is a distance away from the UE's position at the time of provisioning of the instructions from the network (or, alternatively, the UE's position at the time when the UE last reported its TA or UE location to the network) which exceeds a configured or specified threshold distance, or a configured (or specified) time period has elapsed (e.g., a timer has expired) since the UE's TA was last adjusted by an instruction from the network/gNB, or, optionally, since the UE last reported its TA or location to the network (as described above, wherein all associated options are applicable).

The instructions may indicate to stop UE autonomous TA updating when the UE has moved to a location which, measured along a straight line, is a distance away from the UE's position at the time of provisioning of the instructions from the network (or, alternatively, the UE's position at the time when the UE last reported its TA or UE location to the network) which exceeds a configured or specified threshold distance, or the accumulated UE autonomous TA updates have reached (or exceeded) a configured (or specified) threshold (as described above, wherein all associated options are applicable), or a configured (or specified) time period has elapsed (e.g. a timer has expired) since the UE's TA was last adjusted by an instruction from the network/gNB, or, optionally, since the UE last reported its TA or location to the network (as described above, wherein all associated options are applicable).

The instructions may indicate to report the current TA or UE location when the accumulated UE autonomous TA updates reach or exceed a configured or specified threshold since the last time the UE's TA was adjusted by the network/gNB (e.g., in the form of a Timing Advance Command MAC CE, an Absolute Timing Advance Command MAC CE, or a Timing Advance Command field in a Random Access Response (RAR) message or a MsgB from the network/gNB) or (as an optional complement) the last time the UE reported its TA to the network/gNB).

When UE autonomous TA adjustments accumulate, this may lead to an increasingly large positive value or an increasingly large negative value. Thus, the threshold principle may be realized as separate thresholds for positive and negative accumulated UE autonomous TA adjustments, e.g., denoted $\Delta_{TA\text{-}acc\text{-}threshold+}$ and $\Delta_{TA\text{-}acc\text{-}threshold+}$. The condition is fulfilled when $$\sum_{i=1}^{N} \Delta_{TAi} \geq \Delta_{TA-acc-threshold+}$$

or $$\sum_{i=1}^{N} \Delta_{TAi} \leq \Delta_{TA-acc-threshold-}.$$

Alternatively, a single threshold, $\Delta_{TA\text{-}acc\text{-}threshold}$, may be used, wherein the condition is fulfilled when $$\left|\sum_{i=1}^{N} \Delta_{TAi}\right| \geq \Delta_{TA-acc-threshold}.$$

Typically, $\Delta_{TA\text{-}acc\text{-}threshold+} = -\Delta_{TA\text{-}acc\text{-}threshold-} = \Delta_{TA\text{-}acc\text{-}threshold} > 0$, but it is also possible to have differentiated threshold sizes such that $\Delta_{TA\text{-}acc\text{-}threshold+} \neq \Delta_{TA\text{-}acc\text{-}threshold-}$ (more about this below).

As a variant, the absolute value of the allowed accumulated UE autonomous TA updates before a TA or location report is sent may be greater for a decreasing TA than for an increasing TA. The rationale for this is that the potential consequence on uplink scheduling when the gNB assumes that the UE is using a greater TA than the UE actually is using (i.e., because the UE's autonomous updates of the TA have decreased the TA to a smaller value) are not detrimental, but will only cause less optimal uplink grant to uplink resource delays ($K_{offset}$+$K_2$). On the other hand, the potential consequences on uplink scheduling when the gNB assumes that the UE is using a smaller TA than the UE actually is using (i.e., because the UE's autonomous TA updating has increased the TA to a larger value), there is a risk that the gNB schedules the UE with such a short uplink grant to uplink resource delay ($K_{offset}$+$K_2$) that the UE does not have enough time to prepare its uplink transmission and apply the TA in time to use the allocated uplink transmission resources. Thus, because the potential consequences if the UE autonomously increases the TA too much are that uplink transmission fails, while the potential consequences if the UE autonomously (even excessively) decreases its TA are merely that the delay involved in uplink scheduling may be suboptimally large, it is rational to allow more freedom to the UE to autonomously decrease its TA than to autonomously increase its TA before the UE reports its TA or location to the network/gNB.

If the UE does not receive a TA adjustment or instruction related to the UE autonomous TA updating in response to the TA or location report, there are different options for how the UE may behave (in accordance with the overall UE autonomous TA updating instructions previously received or in accordance with specified rules governing this behavior). For example, the UE may restart its calculation of the accumulated autonomous TA updates and keep performing UE autonomous TA updating, the UE may stop performing UE autonomous TA updating (and may reset its calculation of the accumulated autonomous TA updates), or the UE may restart its calculation of the accumulated autonomous TA updates, but is only allowed to autonomously decrease its TA (but not to autonomously increase it).

As described above, the monitoring of the accumulation of the UE's autonomous TA updates may replace the time alignment timer and the UE's TA is valid until the UE reports a TA value (or location) that indicates that the accumulated autonomous TA updates have reached or exceeded the configured or specified threshold.

In some scenarios, the value of the threshold for the UE's accumulated autonomous TA adjustments may be scaled or modified in a way that depends on the time alignment timer.

The instructions may indicate to report the current TA or UE location when a configured (or specified) time period has elapsed (e.g., a timer has expired) since the UE's TA was last adjusted by an instruction (e.g., in the form of a Timing Advance Command MAC CE, an Absolute Timing Advance Command MAC CE, or a Timing Advance Command field in a Random Access Response (RAR) message or a MsgB) from the network/gNB. The monitoring of the time period may at least conceptually be modeled as a timer. The timer may be restarted every time the UE's TA is adjusted by the network/gNB. As an optional variant, the instruction may also indicate that the UE should restart the monitoring timer when the UE reports its TA or location to the network (even if the UE does not receive any TA adjustment instruction in response). Thus, with this variant, the monitoring timer is restarted when the UE's TA is adjusted by the network/gNB or the UE reports its TA or location to the network (which means that the UE is triggered to report its current TA or location when a configured (or specified) time period has elapsed since the UE's TA was adjusted by the network or since the UE reported its TA or location to the network).

In some embodiments, the timer is a timer that is separate from the UE's time alignment timer. When the timer is configured or restarted, it may be set equal to the UE's time alignment timer or to the time remaining of the UE's time alignment timer.

In some embodiments, the UE's time alignment timer also defines the time period for triggering the UE to report its TA or location to the network/gNB. That is, the UE is allowed to perform UE autonomous TA updating until the time alignment timer expires.

In some embodiments, the timer governing the UE's TA or location reporting replaces the UE's time alignment timer (i.e., it may serve the same purpose as the time alignment timer in addition to controlling the UE's TA or location reporting).

In some embodiments, the timer has a relation to the UE's time alignment timer, e.g., such that the timer is scaled or modified in a way that depends on the time alignment timer. The scaling or modification may ensure that the timer does not expire after the time alignment timer expires, i.e., ensuring that the timer is not running when the time alignment timer expires. The scaling or modification may depend on the time alignment timer's configured start value or on the remaining time of the time alignment timer (which decreases when the time alignment timer is running).

The instructions may indicate to report the current TA or UE location when the accumulated autonomous TA updates have reached a configured (or specified) threshold (where the threshold principle optionally may be realized as separate thresholds for positive accumulated UE autonomous TA adjustments and negative accumulated UE autonomous TA adjustments) or a configured (or specified) time period has elapsed (e.g., a timer has expired) since the UE's TA was last adjusted by an instruction (e.g., in the form of a Timing Advance Command MAC CE, an Absolute Timing Advance Command MAC CE, or a Timing Advance Command field in a Random Access Response (RAR) message or a MsgB) from the network/gNB. The above described options for when to restart the calculation of the accumulated UE autonomous TA updates and/or when to restart the (conceptual) monitoring timer may be applied in this conditional reporting instruction alternative too.

The monitoring timer may have any of the relations to the UE's time alignment timer described above for the preceding embodiments (where a monitoring timer determines when the UE reports its TA or location to the network/gNB).

In addition, in some scenarios, the value of the threshold for the UE's accumulated autonomous TA adjustments may also be scaled or modified in a way that depends on the time alignment timer.

The instructions may indicate to report the current TA or UE location when the UE has moved to a location which, measured along a straight line, is a distance away from the UE's position at the time of provisioning of the instructions from the network (or, alternatively, the UE's position at the time when the UE last reported its TA or UE location to the network) which exceeds a configured or specified threshold distance.

The instructions may indicate to report the current TA or UE location when the UE has moved to a location which, measured along a straight line, is a distance away from the UE's position at the time of provisioning of the instructions from the network (or, alternatively, the UE's position at the time when the UE last reported its TA or UE location to the network) which exceeds a configured or specified threshold distance, or the accumulated UE autonomous TA updates have reached (or exceeded) a configured (or specified) threshold (as described above, wherein all associated options are applicable).

The instructions may indicate to report the current TA or UE location when the UE has moved to a location which, measured along a straight line, is a distance away from the UE's position at the time of provisioning of the instructions from the network (or, alternatively, the UE's position at the time when the UE last reported its TA or UE location to the network) which exceeds a configured or specified threshold distance, or a configured (or specified) time period has elapsed (e.g., a timer has expired) since the UE's TA was last adjusted by an instruction from the network/gNB, or, optionally, since the UE last reported its TA or location to the network (as described above, wherein all associated options are applicable).

The instructions may indicate to report the current TA or UE location when the UE has moved to a location which, measured along a straight line, is a distance away from the UE's position at the time of provisioning of the instructions from the network (or, alternatively, the UE's position at the time when the UE last reported its TA or UE location to the network) which exceeds a configured or specified threshold distance, or the accumulated UE autonomous TA updates have reached (or exceeded) a configured (or specified) threshold (as described above, wherein all associated options are applicable), or a configured (or specified) time period has elapsed (e.g., a timer has expired) since the UE's TA was last adjusted by an instruction from the network/gNB, or, optionally, since the UE last reported its TA or location to the network (as described above, wherein all associated options are applicable).

The instructions may indicate to report the current TA or UE location after a feeder link switch has occurred, or when a new satellite has been accessed, e.g., after a satellite switch, e.g., in an earth fixed deployment scenario.

The instructions may indicate to report the current TA or UE location after a handover has occurred. Optionally, this applies only if the handover is an inter-satellite handover.

The instructions may indicate to report the current TA or UE location after an SCell addition. Optionally, this applies only if the SCell addition is an inter-satellite SCell addition, i.e., for example, if the new SCell is served by another satellite than the PCell and/or a PSCell.

The instructions may indicate to report the current TA or UE location opportunistically when sending another message to the network, e.g., using a MAC CE for reporting the TA or location. The UE may be configured to do this every time the UE has a chance before another condition (e.g., any of the conditions described herein) triggers the reporting. This may be combined with a TA/location reporting prohibit timer (which is restarted every time the UE reports its TA/location and which prevents the UE from reporting its TA/location again until the prohibit timer expires) or any suitable timer or counter for limiting the frequency of the TA/location reports.

The instructions may indicate to report the current TA or location on request from the network/gNB, where the request, e.g., may be sent in an RRC message or a MAC message.

The instructions may indicate to report the expected TA to a cell when sending measurement results about that cell to the network, e.g., handover measurements when the measured cell belongs to a different satellite and, e.g., using an RRC message for reporting the expected TA to the network.

Some embodiments include configuration of the UE's behavior if it detects that the serving satellite's ephemeris data has changed (this behavior may also be specified in a standard). The UE may detect a change in the serving satellite's ephemeris data, e.g., from a change in the ephemeris data broadcast in the system information. This behavior configuration may comprise one or more of the following configured behaviors.

In some embodiments, the UE may stop performing UE autonomous TA updating. In addition, the UE may do one or more (or none) of the following. For example, the UE may immediately regard the current TA as invalid. Optionally, the UE regards the TA as invalid only if the accumulated UE autonomous TA updates are non-zero. As another option, the UE regards the TA as invalid if the absolute value of the accumulated UE autonomous TA updates is above a configured or specified threshold.

In some embodiments, the UE may stop performing UE autonomous TA updating and send a TA/location report to the network, start a (configured or specified) timer and send a TA/location report to the network when the timer expires, start a (configured or specified) timer and regard the current TA as valid until the timer expires (but regard the TA as invalid when the timer has expired), regard the current TA as valid until the time alignment timer expires, and/or (re)start the time alignment timer.

In some embodiments, the UE may continue to perform UE autonomous TA updating. In addition, the UE may do one or more (or none) of the following. For example, the UE may send a TA/location report to the network, start a (configured or specified) timer and send a TA/location report to the network when the timer expires, start a (configured or specified) timer and stop performing UE autonomous TA updating when the timer expires, start a (configured or specified) timer and regard the UE autonomously updated TA as valid until the timer expires (but regard it as invalid when the timer has expired), regard the UE autonomously updated TA as valid until the time alignment timer expires, and/or (re)start the time alignment timer.

All or any of the above behaviors and actions may be associated with a condition stating that the behavior or action is performed only if the impact the detected change in the serving satellite's ephemeris data has on the TA is that the TA changes more than a configured or specified threshold.

Some embodiments include configuration of properties of the TA report, where the configuration may comprise one or more of the following. The configuration may comprise reporting the full TA, reporting the difference from a common TA configured for the cell (which, e.g., is valid at a configured reference point in the cell), reporting the difference since the last reported TA (i.e., the difference from the TA reported in the preceding TA report), reporting the difference since the last time the UE received a TA adjustment (e.g., in the form of a Timing Advance Command MAC CE, an Absolute Timing Advance Command MAC CE, or a Timing Advance Command field in a Random Access Response (RAR) message or a MsgB) from the network/gNB, and/or reporting the accumulated UE autonomous TA adjustments.

The reporting configuration may comprise reporting the TA with reduced accuracy, e.g., rounded to the closest $2^N$. For example, with N=4, the reported TA would be rounded to the closest value which in binary form has the three LSBs equal to zero. In general, rounding to the closest $2^N$ means rounding to the closest value which in binary form has the N−1 LSBs equal to zero. This option allows the N−1 LSBs to be omitted (and implicitly assumed to be zero).

As another option, the reported TA is rounded to the closest greater $2^N$ (in line with the principle that it may be detrimental if the network/gNB believes that the UE is using a smaller TA value that the UE is actually using, while the opposite is comparably harmless since the consequences are merely that the uplink grant to uplink transmission resource delay may be suboptimally large). As another option, the reported TA may be rounded to the closest (or closest greater) 10, or the closest (or closest greater) 100, or the closest (or closest greater) $10^N$, depending on the unit in which the reported TA is measured/indicated.

In another option, the reported TA is truncated by removing the N last LSBs (or setting them to zero). In these rounding and truncation options, an additional option is that the N LSBs are omitted in the report (because these bits are anyway equal to zero because of the rounding or truncation).

Other options for configuring the accuracy of the reported TA includes configuring of the granularity the TA should be reported with, e.g. symbol granularity, microsecond (μs) granularity, N microsecond (μs) granularity (where N e.g. may be 10, 50, 100, 200, 400, 500, 600 or 800), slot granularity or millisecond (ms) granularity.

The reporting configuration may comprise, together with any of the above, reporting the current estimated rate of change of the TA (or the rate of the autonomous TA adjustments), i.e., the time derivative of the TA.

Some embodiments include configuration of properties of the report of the UE's location, where the configuration may comprise one or more of the following. The configuration may include reporting the UE location with full accuracy (e.g., obtained from a GNSS measurement), reporting the UE location with estimated error margin that is smaller than a maximum error limit (where the maximum error limit, e.g., may be expressed as a radius of a certain length, e.g., 10 meters, 20 meters, 30 meters, 50 meters, 100 meters, 500 meters, 1 km, 5 km, 10 km, 20 km, 30 km, 40 km, 50 km or 100 km), reporting the UE location together with an uncertainty estimate, e.g., expressed as a radius, reporting the change of the UE location since the last reported UE location, e.g., in the form of a vector originating at the last reported UE location, and/or reporting the UE location with reduced accuracy, e.g., with each coordinate rounded to the closest $2^N$ or $10^N$ meters. As explained above, rounding to the closest $2^N$ means rounding to the closest value which in binary form has the N−1 LSBs equal to zero.

In some embodiments, the report configuration includes, together with any of the above, reporting the UE's current speed and movement direction.

Some embodiments include configuration of the UE's reporting, wherein the configuration includes that the UE should report both its TA and its location. The above described configuration options related to reporting of the UE's TA and reporting of the UE's location are applicable here too.

Some embodiments include activating UE autonomous TA updating (e.g., start UE autonomous TA updating). If the activation instruction is provided via DCI, the UE may, in some embodiments, validate the activation instruction by checking the CRC and/or other fields of the DCI. To enable the validation, the CRC of a corresponding DCI format may be scrambled with a particular RNTI and/or some field(s) in the DCI may be set to predefined values such as all '0's. Validation of the DCI format is achieved if all fields for the DCI format are set according to predefined values. If validation is achieved, the UE considers the information in the DCI format as a valid activation instruction.

Some embodiments include deactivating UE autonomous TA updating (e.g., stop UE autonomous TA updating). If the instruction is provided via DCI, the UE may, in some embodiments, validate the deactivation instruction by checking the CRC and/or other fields of the DCI. To enable this validation, the CRC of a corresponding DCI format may be scrambled with a particular RNTI and/or some field(s) in the DCI may be set to predefined values such as all '0's. Validation of the DCI format is achieved if all fields for the DCI format are set according to predefined values. If validation is achieved, the UE considers the information in the DCI format as a valid deactivation instruction.

After deactivation/stopping of the UE autonomous TA updating, the UE may, as one option, report its current TA or location to the network. Such reporting upon deactivation/stopping of the UE autonomous TA updating may as one option be configurable by the network, e.g., included in the deactivation/stopping instruction.

Some embodiments include activating TA or location reporting. If the instruction is provided via DCI, the UE may, in some embodiments, validate the activation instruction by checking the CRC and/or other fields of the DCI. To enable the validation, the CRC of a corresponding DCI format may be scrambled with a particular RNTI and/or some field(s) in the DCI may be set to predefined values such as all '0's. Validation of the DCI format is achieved if all fields for the DCI format are set according to predefined values. If validation is achieved, the UE considers the information in the DCI format as a valid activation instruction.

Some embodiments include deactivating TA or location reporting. If the instruction is provided via DCI, the UE may, in some embodiments, validate the deactivation instruction by checking the CRC and/or other fields of the DCI. To enable this validation, the CRC of a corresponding DCI format may be scrambled with a particular RNTI and/or some field(s) in the DCI may be set to predefined values such as all '0's. Validation of the DCI format is achieved if all fields for the DCI format are set according to predefined values. If validation is achieved, the UE considers the information in the DCI format as a valid deactivation instruction.

Some embodiments include restarting the calculation of the accumulated UE autonomous TA adjustments. As one option, when the condition for reporting the TA or UE location is fulfilled, the UE may wait for an opportunity to piggyback the report on another transmission, e.g., together with a buffer status report (BSR) or in a new MAC CE. In some embodiments, after the fulfillment of the condition for reporting the TA or UE location, the UE may wait only a maximum (configured or specified) time period for an opportunity to piggyback the report on another transmission, and if this time period expires, the UE sends the report anyway, e.g., using a message dedicated for this purpose.

In some embodiments, when the UE has reported its TA to the network, the reported TA, or, if the UE reported its location instead of its TA, the TA the UE is using and regards as valid at the time of reporting, becomes the new reference TA value relative to which the UE's accumulated autonomous TA adjustments are calculated, unless the network provides the UE with new TA instructions (e.g., in the form of a Timing Advance MAC CE or an Absolute Timing Advance MAC CE).

In some embodiments, if the UE has reported its location to the network, the reported location becomes the new reference location relative to which the UE's distance is calculated, unless the network provides the UE with new TA instructions (e.g., in the form of a Timing Advance MAC CE or an Absolute Timing Advance MAC CE).

In some embodiments, when a UE is configured to perform UE autonomous TA updating, or is enabled, allowed or mandated to do so by standard specification, the network may choose to set the UE's time alignment timer to a larger value (i.e., such that it takes longer time to expire) than it otherwise would have done. This may thus complement, or be combined with, any of the embodiments described herein.

In some embodiments, a TA provided by the network is regarded as dynamic. In the embodiments in this section, a TA provided by the network, e.g., through (relative) adjustments in a Timing Advance Command MAC CE, in an Absolute Timing Advance MAC CE (or in a Timing Advance Command field in a Random Access Response message or a MsgB), is regarded as dynamic, where its subsequent changes are based on a mutual (configured or specified) understanding between the UE and the network (e.g., the gNB). That is, the provided TA changes over time according to an agreed, configured and/or specified mutual understanding, unless explicitly updated by the network or autonomously updated by the UE on the UE's own initiative. In other words, the dynamic TA value changes as a function of time (without further explicit instructions from the network), wherein its change is based on configured or specified information, typically consisting of the information about the serving satellite's position and velocity (associated with the satellite's orbit), e.g., the satellite's ephemeris data and information regarding the propagation delay or RTT on the feeder link (i.e., the link between the GW/gNB to the satellite). The dynamically changing TA value is the TA value relative to which a UE's accumulated autonomous updates are counted at any given time.

A rationale behind the dynamic TA leveraged by particular embodiments is that due to the fast satellite movements relative to the earth's surface (except in the case of GEO satellites), the TA will change rapidly, and this may lead to frequent signaling of TA updates from the network/gNB and/or frequent (or continuous) UE autonomous TA updates, which quickly accumulate to a significant size.

To mitigate such consequences of the serving satellite's movements relative to the UE, a TA provided by the network is dynamic and is assumed to change with the passing of time, e.g., as a function of time. The time dependent change of the TA is thus to be regarded as included in the TA configuration and both the UE and the network can calculate how the TA changes, based on commonly known information (although only the UE is mandated to do so, while it is optional for the network).

The basis for the time dependent changes of the dynamic TA, denoted as TA dynamic, consists of: (a) the predicted movements of the serving satellite in relation to the earth's surface (where the earth's rotation is taken into account in the calculation), which both the UE and the network can calculate based on the serving satellite's ephemeris data, (b) information about the feeder link, which the network (e.g., the gNB) provides to the UE, e.g., through broadcasting, e.g., in the system information, and (c) a reference position in the cell.

The reference position may be the UE's location at the time of $TA_{dynamic}$ provision from the network (after which the provided $TA_{dynamic}$ changes with the passing of time) and the resulting $TA_{dynamic}$, at any moment in time, is equal to the RTT between the gNB and the reference position (which is the sum of the feeder link RTT (i.e., the RTT between the gNB/GW and the satellite) and the RTT between the satellite and the reference position). With the UE's location at the time of $TA_{dynamic}$ provisioning as the reference position, at the time of $TA_{dynamic}$ provisioning, the RTT between the satellite and the reference position is equal to the service link RTT (i.e., the RTT between the satellite and the UE) and as long as the UE remains stationary, the RTT between the satellite and the reference position will remain equal to the service link RTT.

To support using the UE's location at the time of provisioning, the UE may report its position in conjunction with the provision of the dynamic TA, or if the UE relatively recently has provided its location, then this can be sufficient. This may be controlled by the network, e.g., by requesting the UE to provide its location. In addition, the UE may report its location in Msg3 or Msg5 during the 4-step random access procedure or in MsgA (or a subsequent PUSCH transmission) during the 2-step random access procedure.

As an alternative to using the UE's location at the time of provisioning of the dynamic TA as the reference position, some embodiments use the latest UE location the UE has reported to the network or another reference position in the cell, e.g., the (approximate) cell center. A reference position that is not related to the UE's current or recent/previous location may be common for all UEs in the cell, e.g., configured via the broadcast system information, or as an option, the network (e.g., the gNB) may configure a UE with a reference position using dedicated signaling (e.g., RRC or MAC signaling). Dedicated signaling of a reference position may be combined with a broadcast reference position, wherein the reference position provided through dedicated signaling overrides the common broadcast reference position.

The information about the feeder link that the network provides to the UE (in the broadcast system information or using dedicated signaling) may include information that enables the UE to determine the feeder link RTT. This may be an explicit indication of the feeder link RTT or propagation delay, or it may be in the form of the location of the gNB/GW, in which case the UE can calculate the feeder link RTT based on the serving satellite's ephemeris data (and its therefrom derived position and movements) and the gNB/GW location.

If an explicit indication of the feeder link RTT or propagation delay is used, this may comprise a snapshot, which is more or less frequently updated through further signaling, e.g., updated system information, a mathematical function of time describing the time dependence of the feeder link RTT or propagation delay, or a series of multiple (sequentially valid) feeder link RTT or propagation delay values, wherein each of the multiple feeder link RTT or propagation delay values has an associated timestamp indicating when it becomes valid. The associated timestamps may be replaced by a common validity interval/duration (e.g., X seconds or Y milliseconds) that is applied to each of the multiple feeder link RTT or propagation delay values. As another alternative, each feeder link RTT or propagation delay value may have a specific associated validity interval/duration which may be different for different ones of the multiple feeder link RTT or propagation delay values. As one option, the feeder link information may be part of the satellite's ephemeris data.

With the dynamic TA concept, the UE's autonomous TA updates may be assumed to be much less frequent and/or accumulate much slower than when a TA provided by the network (e.g., in a relative adjustment in a Timing Advance Command MAC CE or in an Absolute Timing Advance Command MAC CE) is fixed. With this improvement, the embodiments described above (including the scaling/modification schemes) may be reused, one difference being that the UE autonomous TA adjustments are performed relative to the dynamic TA to compensate for deviation of the TA the UE uses (i.e., considers as valid) from the dynamic TA as configured by the network. Thus, the accumulated UE autonomous TA adjustments is equal to the sum of all the autonomous adjustments the UE has applied (since the UE's TA was last adjusted by the network), which means that at any given time, the accumulated UE autonomous TA adjustments are equal to the difference between the TA the UE is using (or regards as currently valid) and the dynamic TA (i.e., $TA_{dynamic}$) derived from the dynamic TA formula (e.g., $TA_{dynamic}=f(t)=TA_{dynamic}(t)$). Thus, in the context of calculation of UE autonomous TA adjustments, the dynamic TA may be considered a reference TA or a reference TA value.

Figure 8:
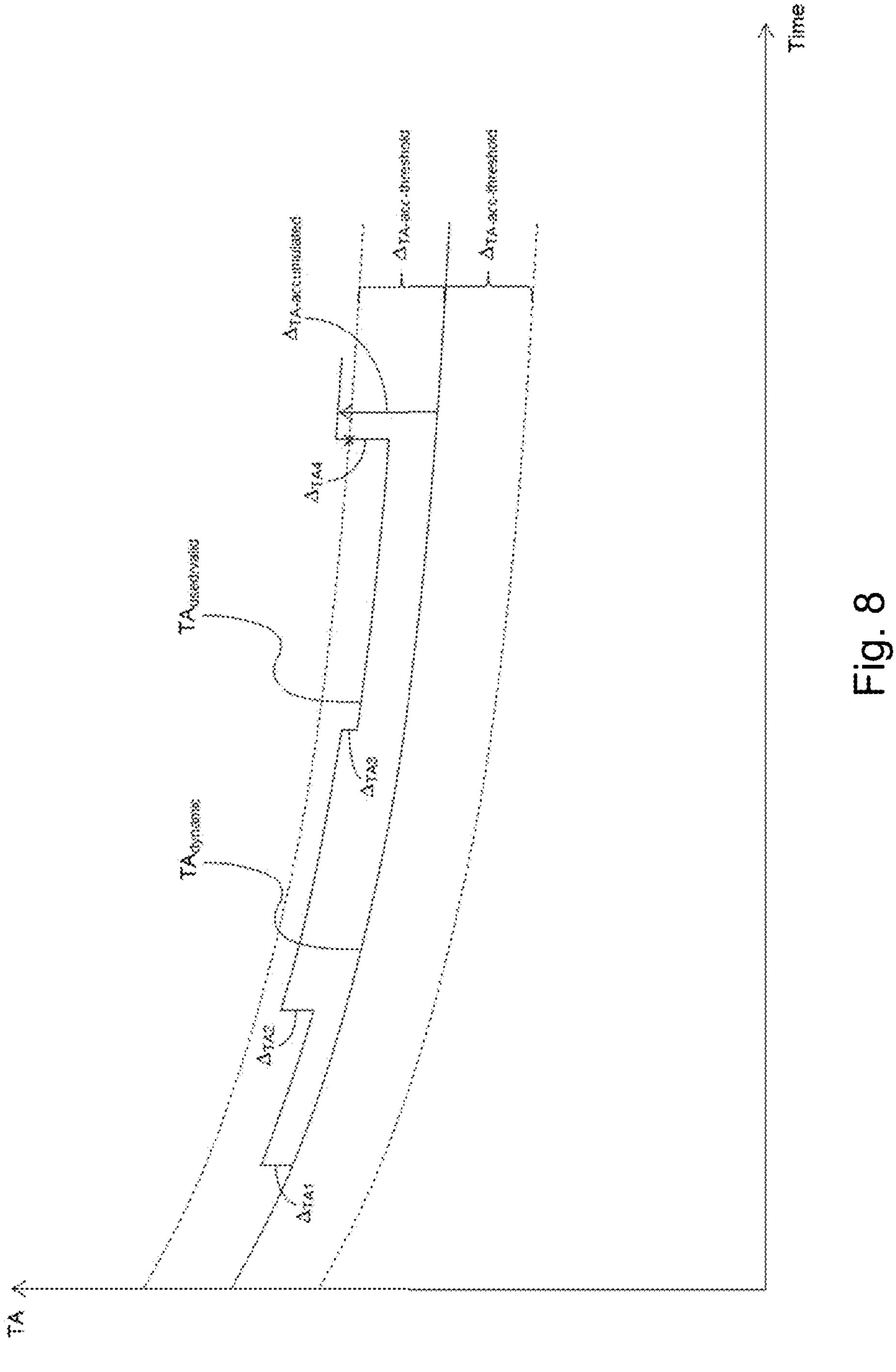
FIG. 8 illustrates UE autonomous TA adjustment in relation to a dynamic TA using symmetric thresholds for positive and negative accumulated adjustments.
Figure 9:
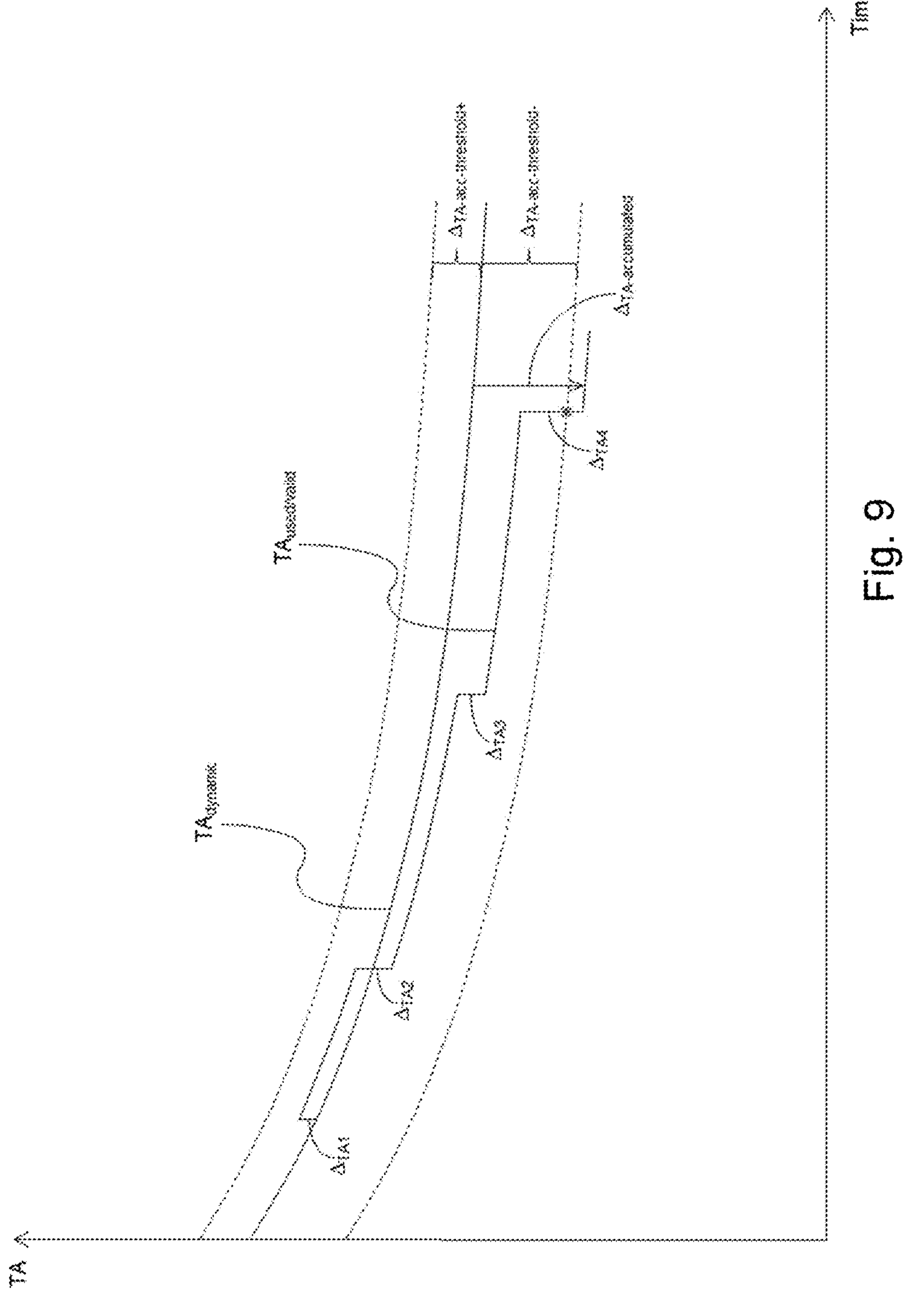
FIG. 9 illustrates UE autonomous TA adjustment in relation to a dynamic TA using asymmetric thresholds for positive and negative accumulated adjustments.

FIG. 8 and FIG. 9 illustrate two examples of accumulated UE autonomous TA adjustments that trigger TA or location reporting when the dynamic TA principle is used. The following notation is used in the figures and in the related text below.

$TA_{dynamic}(t)/TA_{dynamic}$ The dynamic TA, which changes with time (i.e., $TA_{dynamic}=TA_{dynamic}(t)=f(t)$) configured by the network.

$\Delta_{TA1}$, $\Delta_{TA2}$, $\Delta_{TA3}$. $\Delta_{TA4}$ UE autonomous TA adjustments. Note each such adjustment may be positive or negative, i.e., $\Delta_{TAX}>0$ or $\Delta_{TAX}<0$.

$\Delta_{TA\text{-}accumulated}$ The accumulated UE autonomous TA adjustments (e.g., $\Delta_{TA\text{-}accumulated}=\Delta_{TA1}+\Delta_{TA2}+\Delta_{TA3}+\Delta_{TA4}$).

$TA_{used/valid}$ The TA the UE is using and/or regards as valid (i.e., $TA_{used/valid}=TA_{dynamic}+\Delta_{TA\text{-}accumulated}$).

$\Delta_{TA\text{-}acc\text{-}threshold}$ The threshold value for the accumulated UE autonomous TA adjustments triggering a TA or location report when $$\left|\sum_{i=1}^{N}\Delta_{TAi}\right| \geq \Delta_{TA-acc-threshold},$$

where $\Delta_{TAi}$ is the i$^{th}$ UE autonomous TA adjustment. This notation is used when the same size of the deviation from the dynamic TA is used for TA/location report triggering both for positive and negative accumulated UE autonomous TA adjustments.

$\Delta_{TA\text{-}acc\text{-}threshold+}$ The threshold value for positive accumulated UE autonomous TA adjustments (i.e., increased TA) triggering a TA or location report when $$\sum_{i=1}^{N}\Delta_{TAi} \geq \Delta_{TA-acc-threshold+},$$

where $\Delta_{TAi}$ is the i$^{th}$ UE autonomous TA adjustment. This notation is used when the size of the allowed deviation from the dynamic TA before a TA/location report is triggered is different for positive and negative accumulated UE autonomous TA adjustments.

$\Delta_{TA\text{-}acc\text{-}threshold-}$ The threshold value for negative accumulated UE autonomous TA adjustments (i.e., decreased TA) triggering a TA or location report. This notation is used when the size of the allowed deviation from the dynamic TA before a TA/location report is triggered is different for positive and negative accumulated UE autonomous TA adjustments. There are two options. In a first option, $\Delta_{TA\text{-}acc\text{-}threshold-}$ is a negative value (i.e., $\Delta_{TA\text{-}acc\text{-}threshold-}<0$) and a TA/location report is triggered when $$\sum_{i=1}^{N}\Delta_{TAi} \leq \Delta_{TA-acc-threshold-},$$

where $\Delta_{TAi}$ is the i$^{th}$ UE autonomous TA adjustment. In second option, $\Delta_{TA\text{-}acc\text{-}threshold-}$ is a positive value (i.e. $\Delta_{TA\text{-}acc\text{-}threshold-}>0$) and a TA/location report is triggered when $$\sum_{i=1}^{N}\Delta_{TAi} \geq \Delta_{TA-acc-threshold-}$$

AND $$\sum_{i=1}^{N}\Delta_{TAi} < 0,$$

where $\Delta_{TAi}$ is the i$^{th}$ UE autonomous TA adjustment.

FIG. 8 illustrates UE autonomous TA adjustment in relation to a dynamic TA using symmetric thresholds for positive and negative accumulated adjustments. The illustrated example includes UE autonomous TA adjustments ($\Delta_{TA1}$, $\Delta_{TA2}$, $\Delta_{TA3}$. $\Delta_{TA4}$) in relation to a dynamic TA ($TA_{dynamic}$), the resulting accumulated UE autonomous TA adjustments ($\Delta_{TA\text{-}accumulated}=\Delta_{TA1}+\Delta_{TA2}+\Delta_{TA3}+\Delta_{TA4}$) and the TA the UE is using and regards as valid ($TA_{used/valid}=TA_{dynamic}+\Delta_{TA\text{-}accumulated}$). In this example, the same threshold size is used for positive and negative accumulated UE autonomous TA adjustments.

As illustrated in FIG. 8, the fourth UE autonomous TA adjustment brings the accumulated UE autonomous TA adjustments above the threshold (i.e., $\Delta_{TA\text{-}accumulated}=\Delta_{TA1}+\Delta_{TA2}+\Delta_{TA3}+\Delta_{TA4}>\Delta_{TA\text{-}acc\text{-}threshold}$), which triggers the UE to send a TA/location report and/or stop performing UE autonomous TA updating. If the UE sends a TA report to the network, the report may contain the TA the UE is using and regards as valid (i.e., $TA_{used/valid}$) or, alternatively, the accumulated UE autonomous TA adjustments (i.e., $\Delta_{TA\text{-}accumulated}$). (Note that $\Delta_{TA1}>0$, $\Delta_{TA2}>0$ and $\Delta_{TA4}>0$, while $\Delta_{TA3}<0$.)

FIG. 9 illustrates UE autonomous TA adjustment in relation to a dynamic TA using asymmetric thresholds for positive and negative accumulated adjustments. The illustrated example includes UE autonomous TA adjustments ($\Delta_{TA1}$, $\Delta_{TA2}$, $\Delta_{TA3}$, $\Delta_{TA4}$) in relation to a dynamic TA ($TA_{dynamic}$), the resulting accumulated UE autonomous TA adjustments ($\Delta_{TA\text{-}accumulated}=\Delta_{TA1}+\Delta_{TA2}+\Delta_{TA3}+\Delta_{TA4}$) and the TA the UE is using and regards as valid ($TA_{used/valid}=TA_{dynamic}+\Delta_{TA\text{-}accumulated}$). In this example, asymmetric thresholds (i.e., with different sizes) are used for positive and negative accumulated UE autonomous TA adjustments.

As illustrated in FIG. 9, the fourth UE autonomous TA adjustment brings the accumulated UE autonomous TA adjustments across the threshold (i.e., $\Delta_{TA\text{-}accumulated}=\Delta_{TA1}+\Delta_{TA2}+\Delta_{TA3}+\Delta_{TA4}<\Delta_{TA\text{-}acc\text{-}threshold\text{-}}$, if $\Delta_{TA\text{-}acc\text{-}threshold\text{-}}$ is defined as a negative value, or $|\Delta_{TA\text{-}accumulated}|=|\Delta_{TA1}+\Delta_{TA2}+\Delta_{TA3}+\Delta_{TA4}|>\Delta_{TA\text{-}acc\text{-}threshold\text{-}}$ AND $\Delta_{TA\text{-}accumulated}<0$, if $\Delta_{TA\text{-}acc\text{-}threshold\text{-}}$ is defined as a positive value), which triggers the UE to send a TA/location report and/or stop performing UE autonomous TA updating. If the UE sends a TA report to the network, the report may contain the TA the UE is using and regards as valid (i.e., $TA_{used/valid}$) or, alternatively, the accumulated UE autonomous TA adjustments (i.e., $\Delta_{TA\text{-}accumulated}$). (Note that $\Delta_{TA1}>0$, while $\Delta_{TA2}<0$, $\Delta_{TA3}<0$ and $\Delta_{TA4}<0$.)

In some embodiments, the calculation of the dynamic TA's time dependent changes does not rely on satellite ephemeris data and feeder link RTT/propagation delay. Instead, the network provides the dynamic TA in the form of a function of time, i.e., $T_{Adynanmic}=f(t)=TA_{dynamic}(t)$. Alternatively, the dynamic TA may be provided in the form of multiple TA values and associated timestamps or time intervals (which may be signaled using dedicated RRC or MAC signaling or broadcast system information signaling, or alternatively may be specified in a standard), wherein the UE applies the TA values sequentially, optionally with interpolation between the TA values to smoothen out the switches between the TA values.

In some embodiments, when the UE has reported its TA to the network, the reported TA, or, in case the UE reported its location instead of its TA, the TA the UE is using and regards as valid at the time of reporting, becomes the new reference TA value relative to which the UE's accumulated autonomous TA adjustments are calculated, unless the network provides the UE with new TA instructions (e.g., in the form of a Timing Advance MAC CE or an Absolute Timing Advance MAC CE). The new TA reference value follows the same dynamic update rule (e.g., the same function of time) as a value provided by the network.

In some embodiments, when the UE has reported its location to the network, the reported location becomes the new reference location relative to which the UE's distance is calculated, unless the network provides the UE with new TA instructions (e.g., in the form of a Timing Advance MAC CE or an Absolute Timing Advance MAC CE).

As described above, when a UE is configured to perform UE autonomous TA updating, or is enabled, allowed or mandated to do so by standard specification, the network may choose to set the UE's time alignment timer to a larger value (i.e., such that it takes longer time to expire) than it otherwise would have done. This may thus complement, or be combined with, any of the embodiments described herein.

As an additional embodiment or option, it may be configurable whether the UE should regard a TA provided by the network as fixed or dynamic. This instruction may thus be provided by the network through signaling. e.g., using broadcast system information signaling or using dedicated signaling, e.g., in the DCI, RRC signaling or MAC signaling.

Some embodiments include scaling/modification of the UE autonomous TA adjustment's monitoring timer and/or accumulation threshold. When the UE's autonomous TA updating is governed by a timer (e.g., the UE reports its TA to the network when the timer expires or the UE stops performing UE autonomous TA updating when the timer expires), the timer may have a relation to the UE's time alignment timer, e.g., such that the timer is scaled or modified in a way that depends on the time alignment timer. In some embodiments, the scaling or modification may serve ensure that the timer does not expire after the time alignment timer expires, i.e., ensuring that the timer is not running when the time alignment timer expires.

This is avoidable when the timer governing the UE's autonomous TA updating and the time alignment timer are started simultaneously (e.g., the timer governing the UE's autonomous TA updating has a configured start value that leaves less time until the timer expires than the corresponding configured start value for the UE's time alignment timer).

However, time alignment timer dependent scaling or modification of the timer governing the UE's autonomous TA updating is a relevant mechanism in situations where the timer governing the UE's autonomous TA updating is (re) started, while the time alignment timer is running (and not restarted). An example of a scenario when this may occur is if the UE is configured to restart the timer governing the UE's autonomous TA updating when the UE has reported its TA to the network. Then, if the UE reports its TA to the network, and the network does not adjust the UE's TA (e.g., the network does not send a Timing Advance Command MAC CE or an Absolute Timing Advance Command MAC CE to the UE), the UE restarts its timer governing the UE's autonomous TA updating, but not its time alignment timer (which is kept running). To deal with such situations, the timer governing the UE's autonomous TA updating may thus be scaled or modified in relation to the current value of the (running) time alignment timer.

In the description of these scaling or modification mechanisms, it is assumed that time alignment timer is started at a value greater than zero and counted downwards until it reaches zero, where the timer expires. The same principle is assumed for the timer governing the UE's autonomous TA updating. However, the described mechanisms are applicable also if the timers are started at zero and counted upwards until they expire when they reach their respective configured value.

The following notation and definitions are used for the parameters involved in the description of the scaling and modification mechanisms:

$T_{Align}$ (TA) The configured time alignment timer value (i.e., the timer's start value with the assumption that the timer is counted downwards to zero).

$T_{AlignRemaining}$ ($T_{AR}$) The time remaining until the time alignment timer expires ($T_{AR}\leq T_A$). In the scaling/modification mechanisms, this is the time alignment timer's value at the time when the timer governing the UE's autonomous TA updating is (re)started.

$T_{AutoAdjust}$ ($T_{AA}$) This is the start value of the timer governing the UE's autonomous TA updating after any scaling or modification has been applied to the configured start value.

$T_{AutoAdjustConfig}$ ($T_{AAC}$) The configured start value for the timer governing the UE's autonomous TA updating, before any scaling or modification has been applied (where the start value to actually apply is the result of the possible scaling or modification of this configured start value).

$T_{AutoAldjustMin}$ ($T_{AAM}$) The minimum start value for the timer governing the UE's autonomous TA updating.

This parameter is used in some options, whereas the timer's start value may have no lower limit (other than zero) in other options.

$\Delta_{Scale1}$ ($\Delta_{S1}$) A scaling parameter used in some options. $\Delta S_1 \geq \geq 0$.

$\Delta_{Scale2}$ ($\Delta_{S2}$) A scaling parameter used in some options. $0 \leq \Delta_{S2} \leq 1$.

The following are some non-limiting options for how to set the start value of the timer governing the UE's autonomous TA updating, $T_{AA}$, when it is (re)started while the time alignment timer is already running (and is kept running).

Option 1:

$$T_{AA}=T_{AAC}$$

This is the trivial option, where no scaling or modification is applied, and which may serve as a reference.

Option 2;

$$T_{AA}=\mathrm{MIN}(T_{AAC},T_{AR})$$

Option 3:

$$T_{AA}=T_{AAC}\frac{T_{AR}}{T_A}$$

Option 4:

$$T_{AA}=T_{AAC}\frac{T_{AR}}{(1+\Delta_{S1})T_A}=T_{AAC}\frac{T_{AR}}{k_1T_A}$$

where $k_1 \geq 0$.

Option 5:

$$T_{AA}=T_{AAC}\frac{(1-\Delta_{S2})T_{AR}}{T_A}=T_{AAC}\frac{k_2T_{AR}}{T_A}$$

where $0 \leq k_2 \leq 1$.

Option 6:

$$T_{AA}=\mathrm{MAX}\left(T_{AAC}\frac{T_{AR}}{T_A},\ T_{AAM}\right)$$

Option 7:

$$T_{AA}=\mathrm{MIN}(T_{AAC},T_{AR})\times\frac{T_{AR}}{T_A}$$

Option 8:

$$T_{AA}=\mathrm{MIN}(T_{AAC},T_{AR})\times\frac{T_{AR}}{T_A+\Delta_{AAA}}$$

Option 9:

$$T_{AA}=\mathrm{MIN}(T_{AAC},T_{AR})\times\frac{T_{AR}}{(1+\Delta_{S1})T_A}=\mathrm{MIN}(T_{AAC},T_{AR})\times\frac{T_{AR}}{k_1T_A}$$

where $k_1 \geq 0$.

Option 10:

$$T_{AA}=\mathrm{MIN}(T_{AAC},T_{AR})\times\frac{(1-\Delta_{S2})T_{AR}}{T_A}=\mathrm{MIN}(T_{AAC},T_{AR})\times\frac{k_2T_{AR}}{T_A}$$

where $0 \leq k_2 \leq 1$.

Option 11:

$$T_{AA}=\mathrm{MAX}\left(\mathrm{MIN}(T_{AAC},T_{AR})\times\frac{T_{AR}}{T_A},\ T_{AAM}\right)$$

Option 12:

$T_{AA}$=MAX(Any of the $T_{AAC}$ to $T_{AA}$ scaling formulae of option 2-option 11,$T_{AAM}$)

This may alternatively be expressed as a two-step algorithm:

Step 1: $T_{AA\text{-}preliminary}$=Any of the $T_{AAC}$ to $T_{AA}$ scaling formulae of option 2-option 11

Step 2: $T_{AA}$=MAX($T_{AA\text{-}preliminary}$,$T_{AAM}$)

Option 13:

$T_{AA}$=MIN(Any of the $T_{AAC}$ to $T_{AA}$ scaling formulae of option 2-option 11,$T_{AR}$)

This may alternatively be expressed as a two-step algorithm:

Step 1: $T_{AA\text{-}preliminary}$=Any of the $T_{AAC}$ to $T_{AA}$ scaling formulae of option 2-option 11

Step 2: $T_{AA}$=MIN($T_{AA\text{-}preliminary}$,$T_{AR}$)

Some embodiments may scale or modify $T_{AA}$ in a manner that depends on the threshold for accumulated UE autonomous TA adjustments, e.g. $\Delta_{TA\text{-}acc\text{-}threshold}$ in FIG. 8, e.g., depending on the relation between $\Delta_{AAA}$ and $\Delta_{TA\text{-}acc\text{-}threshold}$. A prerequisite for this is that the UE maintains both a timer governing the UE's autonomous TA adjustments and a parameter for accumulating the autonomous TA adjustments the UE performs as well as a threshold for the latter.

Thus, a relevant scenario is where the UE's TA/location reporting (or the UE's stopping to perform UE autonomous TA adjustments) is governed by a combination a timer and a threshold for the UE's autonomous TA adjustments, e.g., that the TA/location reporting (or stop UE autonomous TA adjustment condition) is fulfilled when the timer expires or the UE's autonomous TA adjustments exceed its threshold (e.g., when $$\left|\sum_{i=1}^{N}\Delta_{TAi}\right| \geq \Delta_{TA-acc-threshold},$$

where $\Delta_{TAi}$ is the $i^{th}$ UE autonomous TA adjustment). In addition, for this kind of scaling to be meaningful, the timer governing the UE's autonomous TA updating and the accumulation of UE autonomous TA adjustments should not be (re)started at the same time.

Thus, one example targets a scenario where the timer governing the UE's autonomous TA adjustments expires and triggers a TA/location report to be sent from the UE to the network, and this does not result in a TA adjustment instruction being sent from the network to the UE (e.g., neither a Timing Advance Command MAC CE nor an Absolute Timing Advance Command MAC CE). Then there may be two options for the UE's behavior with regards to the monitoring timer and the accumulation of UE autonomous TA adjustments.

As a first option, the UE may restart the monitoring timer and restart the accumulation of UE autonomous TA adjustments, in which case scaling/modification of the monitoring timer's start value (i.e., $T_{AA}$) in relation to the accumulated UE autonomous TA adjustments becomes pointless (or simply infeasible).

As a second option, only the monitoring timer (whose expiration triggered the TA/location reporting) is restarted, while the accumulation of UE autonomous TA adjustments is unaffected and keeps accumulating UE autonomous TA adjustment. With the second option, scaling/modification of the start value of the timer governing the UE's autonomous TA updating (i.e., scaling/modification of $T_{AA}$) in relation to the accumulated UE autonomous TA adjustments (e.g., such that it depends on the relation between the accumulated UE autonomous TA adjustments and the threshold for the accumulated UE autonomous TA adjustments) is both feasible and potentially useful. This is thus the assumed scenario for the options for such scaling/modification.

The following additional notation and definitions are used to describe this type of scaling:

$\Delta_{TA\text{-}acc\text{-}threshold}$ ($\Delta_{TAAT}$) This parameter is defined as before in conjunction with FIG. 8. That is, it is the threshold value for the accumulated UE autonomous TA adjustments triggering a TA or location report (or stopping of UE autonomous TA adjustments) when $$\left|\sum_{i=1}^{N}\Delta_{TAi}\right| \geq \Delta_{TA-acc-threshold},$$

where $\Delta_{TAi}$ is the $i^{th}$ UE autonomous TA adjustment. This notation is used when the same size of the deviation from the dynamic TA is used for TA/location report triggering (or stopping of UE autonomous TA adjustments) both for positive and negative accumulated UE autonomous TA adjustments.

$\Delta_{AccAutoAdjustments}$ (ΔAAA) The absolute value of the accumulated UE autonomous TA adjustments, i.e., $$\Delta_{AAA} = \left|\sum_{i=1}^{N}\Delta_{TAi}\right|,$$

where $\Delta_{TAi}$ is the $i^{th}$ UE autonomous TA adjustment.

($\Delta_{AccAutoAdjustments}$ ($\Delta_{AAA}$) is equivalent to the absolute value of $\Delta_{TA\text{-}accumulated}$ in FIG. 8 and FIG. 9, i.e. $\Delta_{AccAutoAdjustments}=|\Delta_{TA\text{-}accumulated}|$.)

$\Delta_{AccAutoAdjustRemaining}$ ($\Delta_{AAAR}$) The remaining accumulated UE autonomous TA adjustments (in terms of absolute value) until the threshold $\Delta_{TA\text{-}acc\text{-}threshold}$ is reached, i.e., $\Delta_{AccAutoAdjustRemaining}=\Delta_{TA\text{-}acc\text{-}threshold}-\Delta_{AccAutoAdjustments}$ (i.e., $\Delta_{AAAR}=\Delta_{TAAT}-\Delta_{AAA}$).

With the above parameters, the concerned type of scaling/modification may be achieved by modifying options 3-13 above by replacing $T_A$ with $\Delta_{TA\text{-}acc\text{-}threshold}$ ($\Delta_{TAAT}$) and replacing $T_{AR}$ with $\Delta_{AccAutoAdjustRemaining}$ ($\Delta_{AAAR}$) (except in the expression MIN($T_{AAC}$, $T_{AR}$) in options 7-11). This results in the following non-limiting options.

Option 14:

$$T_{AA} = T_{AAC}\frac{\Delta_{AAAR}}{\Delta_{TAAT}}$$

Option 15:

$$T_{AA} = T_{AAC}\frac{\Delta_{AAAR}}{(1+\Delta_{S1})\Delta_{TAAT}} = T_{AAC}\frac{\Delta_{AAAR}}{k_1\Delta_{TAAT}}$$

where $k_1 \geq 0$.

Option 16:

$$T_{AA} = T_{AAC}\frac{(1-\Delta_{S2})\Delta_{AAAR}}{\Delta_{TAAT}} = T_{AAC}\frac{k_2\Delta_{AAAR}}{\Delta_{TAAT}}$$

where $0 \leq k_2 \leq 1$.

Option 17:

$$T_{AA} = T_{AAC}\frac{\Delta_{AAAR}}{\Delta_{TAAT}\left(1+\frac{\Delta_{AAA}}{\Delta_{TAAT}}k_3\right)}$$

where $k_2$ is a constant fulfilling $k_3 \geq 0$.

Option 18:

$$T_{AA} = T_{AAC}\frac{\Delta_{AAAR}}{\Delta_{TAAT}+\Delta_{AAA}}$$

Option 19:

$$T_{AA} = \text{MAX}\left(T_{AAC}\frac{\Delta_{AAAR}}{\Delta_{TAAT}}, T_{AAM}\right)$$

Option 20:

$$T_{AA} = \text{MIN}(T_{AAC}, T_{AR}) \times \frac{\Delta_{AAAR}}{\Delta_{TAAT}}$$

Option 21:

$$T_{AA} = \text{MIN}(T_{AAC}, T_{AR}) \times \frac{\Delta_{AAAR}}{\Delta_{TAAT}+\Delta_{AAA}}$$

Option 22:

$$T_{AA} = \text{MIN}(T_{AAC}, T_{AR}) \times \frac{\Delta_{AAAR}}{(1+\Delta_{S1})\Delta_{TAAT}} = \text{MIN}(T_{AAC}, T_{AR}) \times \frac{\Delta_{AAAR}}{k_1\Delta_{TAAT}}$$

where $k_1 \geq 0$.

Option 23:

$$T_{AA} = \text{MIN}(T_{AAC}, T_{AR}) \times \frac{(1-\Delta_{S2})\Delta_{AAAR}}{\Delta_{TAAT}} = \text{MIN}(T_{AAC}, T_{AR}) \times \frac{k_2\Delta_{AAAR}}{\Delta_{TAAT}}$$

where $0 \leq k_2 \leq 1$.

Option 24:

$$T_{AA}=\text{MAX}\left(\text{MIN}(T_{AAC},T_{AR})\times\frac{\Delta_{AAAR}}{\Delta_{TAAT}},T_{AAM}\right)$$

Option 25:

$T_{AA}$=MAX(Any of the $T_{AAC}$ to $T_{AA}$ scaling formulae of option 14-option 24,$T_{AAM}$)

This may alternatively be expressed as a two-step algorithm:

Step 1: $T_{AA\text{-}preliminary}$=Any of the $T_{AAC}$ to $T_{AA}$ scaling formulae of option 14-option 24

Step 2: $T_{AA}$=MAX($T_{AA\text{-}preliminary}$,$T_{AAM}$)

Option 26:

$T_{AA}$=MIN(Any of the $T_{AAC}$ to $T_{AA}$ scaling formulae of option 14-option 24, $T_{AR}$) This may alternatively be expressed as a two-step algorithm:

Step 1: $T_{AA\text{-}preliminary}$=Any of the $T_{AAC}$ to $T_{AA}$ scaling formulae of option 14-option 24

Step 2: $T_{AA}$=MIN($T_{AA\text{-}preliminary}$,$T_{AR}$)

And an additional option, where the time alignment timer and the accumulated UE autonomous TA adjustments are mixed in the scaling/modification formula:

Option 27:

$$T_{AA}=T_{AAC}\frac{T_{AR}}{T_A\left(1+\frac{\Delta_{AAA}}{\Delta_{TAAT}}k_4\right)}$$

where $k_3$ is a constant fulfilling $k_4\geq 0$.

Some embodiments may use similar formulae to scale or modify $\Delta_{TA\text{-}acc\text{-}threshold}$ ($\Delta_{TAAT}$) in a similar manner in relation to the time alignment timer, e.g., by letting the configured value be preliminary, e.g., $\Delta_{TA\text{-}acc\text{-}threshold}$-preliminary ($\Delta_{TAATP}$), which is scaled/modified into a final value $\Delta_{TA\text{-}acc\text{-}threshold}$-final ($\Delta_{TAATF}$), which is the one the UE applies.

In a relevant scenario, both a monitoring timer and a threshold for the accumulated UE autonomous TA adjustments is used to control the UE's TA/location reporting. Furthermore, in analogy with the description above, a situation where this kind of scaling/modification is relevant is when exceedance of the threshold for accumulated UE autonomous TA adjustments (i.e.

$$\left|\sum_{i=1}^{N}\Delta_{TAi}\right|\geq\Delta_{TA-acc-threshold},$$

where $\Delta_{TAi}$ is the $i^{th}$ UE autonomous TA adjustment) triggers a TA/location report and this does not result in a TA adjustment instruction being sent from the network to the UE.

Similar to above, the UE then has two options. As a first option, the UE may restart both the monitoring timer and restart the accumulation of UE autonomous TA adjustments, in which case scaling/modification of the threshold $\Delta_{TA\text{-}acc\text{-}threshold}$ becomes pointless (or simply infeasible).

As a second option, only the accumulation of UE autonomous TA adjustments is restarted, while the monitoring timer is unaffected and keeps running. With the second option, scaling/modification of the threshold $\Delta_{TA\text{-}acc\text{-}threshold}$ in relation to the time alignment timer (e.g., such that it depends on the relation between the remaining time until the time alignment timer expires, i.e., $T_{AR}$, and the time alignment timer's configured start value, i.e., $T_A$) is both feasible and potentially useful. This is thus the assumed scenario for the options for such scaling/modification.

The following additional notation and definitions are used to describe this type of scaling:

- $\Delta_{TA\text{-}acc\text{-}threshold\text{-}preliminary}$ ($\Delta_{TAATP}$) This is the configured value for the threshold for the UE's accumulated autonomous TA adjustments governing the UE's TA/location reporting.
- $\Delta_{TA\text{-}acc\text{-}threshold}$-final ($\Delta_{TAATF}$) This is the final value for the threshold for the UE's accumulated autonomous TA adjustments governing the UE's TA/location reporting, resulting from scaling/modification of the configured preliminary value, $\Delta_{TA\text{-}acc\text{-}threshold}$-preliminary ($\Delta_{TAATP}$). This is the value applied by the UE.
- $\Delta_{TA\text{-}acc\text{-}threshold\text{-}min}$ ($\Delta T_{AATM}$) This is the minimum value for the threshold for the UE's accumulated autonomous TA adjustments governing the UE's TA/location reporting. This parameter is used in some options, whereas the threshold's value may have no lower limit (other than zero) in other options.

The following are some non-limiting options for this type of scaling/modification.

Option 28:

$\Delta_{TAATF}=\Delta_{TAATP}$

This is the trivial option, where no scaling or modification is applied, and which may serve as a reference.

Option 29:

$$\Delta_{TAATF}=\Delta_{TAATP}\frac{T_{AR}}{T_A}$$

Option 30:

$$\Delta_{TAATF}=\Delta_{TAATP}\frac{T_{AR}}{(1+\Delta_{S1})T_A}=\Delta_{TAATP}\frac{T_{AR}}{k_1T_A}$$

where $k_1\geq 0$.

Option 31:

$$\Delta_{TAATF}=\Delta_{TAATP}\frac{(1-\Delta_{S2})T_{AR}}{T_A}=\Delta_{TAATP}\frac{k_2T_{AR}}{T_A}$$

where $0\leq k_2\leq 1$.

Option 32:

$$\Delta_{TAATF}=\Delta_{TAATP}\frac{T_{AR}}{T_A\left(1+\frac{T_A-T_{AR}}{T_A}k_3\right)}=\Delta_{TAATP}\frac{T_{AR}}{T_A\left(1+\left(1-\frac{T_{AR}}{T_A}\right)k_3\right)}$$

where $k_2$ is a constant fulfilling $k_3\geq 0$.

Option 33:

$$\Delta_{TAATF}=\text{MAX}\left(\Delta_{TAATP}\frac{T_{AR}}{T_A},\Delta_{TAATM}\right)$$

Option 34:

$\Delta_{TAATF}$=MAX(Any of the $\Delta_{TAATP}$ to $\Delta_{TAATF}$ scaling formulae of option 29-option 33,$\Delta T_{AATM}$)

As previously described, the condition for TA/location reporting and/or stopping of UE autonomous TA updating may be based on the distance the UE has moved since the time of the provisioning of the instructions from the network (i.e., the instructions related to UE autonomous TA updating), or since the UE last reported its TA or location to the network. In such scenarios, the threshold distance may be scaled or modified in a similar way as the above described scaling/modification of the threshold for the UE's autonomous TA adjustments.

The following notation is introduced in the descriptions of these scaling/modification formulae/algorithms:

$\Delta_{Distance\text{-}threshold\text{-}preliminary}$ ($\Delta_{DTP}$) This is the configured value for the threshold distance for the UE's movements (measured as a straight line from the start position).

$\Delta_{Distance\text{-}threshold\text{-}final}$ ($\Delta_{DTF}$) This is the final value for the threshold distance for the UE's movements (measured as a straight line from the start position), which governs the UE's TA/location reporting, resulting from scaling/modification of the configured preliminary value, Distance-threshold-preliminary ($\Delta_{DTP}$). This is the value applied by the UE.

$\Delta_{Distance\text{-}threshold\text{-}min}$ (ADTM) This is the minimum value for the threshold distance for the UE's movements (measured as a straight line from the start position). This parameter is used in some options, whereas the threshold's value may have no lower limit (other than zero) in other options.

The following are some non-limiting options for this type of scaling/modification.

Option 35:

$\Delta_{DTF}$=$\Delta_{DTP}$

This is the trivial option, where no scaling or modification is applied, and which may serve as a reference.

Option 36:

$$\Delta_{DTF} = \Delta_{DTP}\frac{T_{AR}}{T_A}$$

Option 37:

$$\Delta_{DTF} = \Delta_{DTP}\frac{T_{AR}}{(1+\Delta_{S1})T_A} = \Delta_{DTP}\frac{T_{AR}}{k_1 T_A}$$

where $k_4 \geq 0$.

Option 38:

$$\Delta_{DTF} = \Delta_{DTP}\frac{(1-\Delta_{S2})T_{AR}}{T_A} = \Delta_{DTP}\frac{k_2 T_{AR}}{T_A}$$

where $0 \leq k_2 \leq 1$.

Option 39:

$$\Delta_{DTF} = \Delta_{DTP}\frac{T_{AR}}{T_A\left(1+\frac{T_A - T_{AR}}{T_A}k_3\right)} = \Delta_{DTP}\frac{T_{AR}}{T_A\left(1+\left(1-\frac{T_{AR}}{T_A}\right)k_3\right)}$$

where $k_2$ is a constant fulfilling $k_3 \geq 0$.

Option 40:

$$\Delta_{DTF} = \mathrm{MAX}\left(\Delta_{DTP}\frac{T_{AR}}{T_A}, \Delta_{DTM}\right)$$

Option 41:

$\Delta_{TAATF}$=MAX(Any of the $\Delta_{DTP}$ to $\Delta_{DTF}$ scaling formulae of option 36-option 40,$\Delta_{DTM}$)

Figure 10:
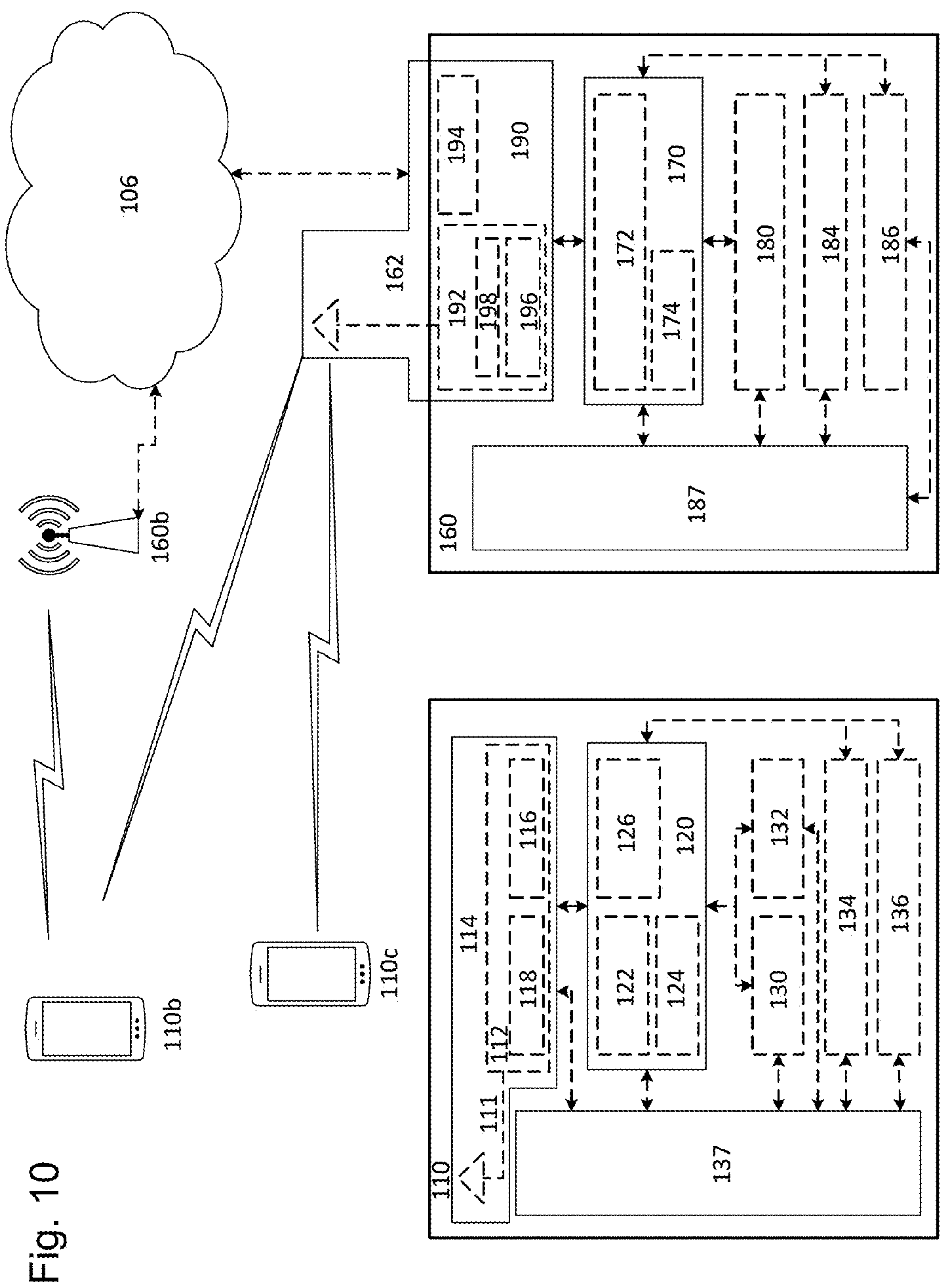
FIG. 10 is a block diagram illustrating an example wireless network.

FIG. 10 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs).

Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 160 includes processing circuitry 170, device readable medium 180, interface 190, auxiliary equipment 184, power source 186, power circuitry 187, and antenna 162. Although network node 160 illustrated in the example wireless network of FIG. 10 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 10 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicleto-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 11:
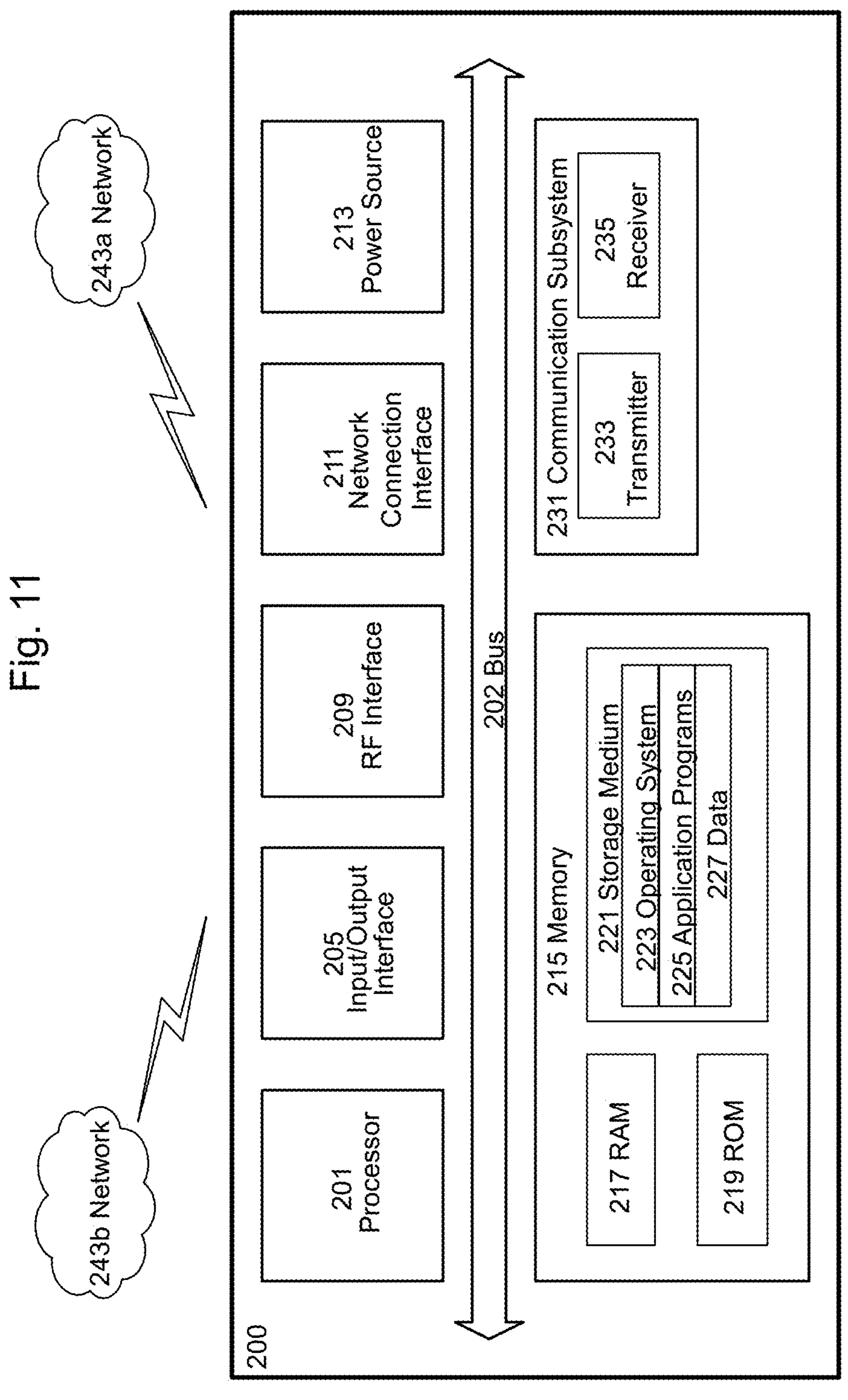
FIG. 11 illustrates an example user equipment, according to certain embodiments.

FIG. 11 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 11, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 11, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2. CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-arca network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 12A:
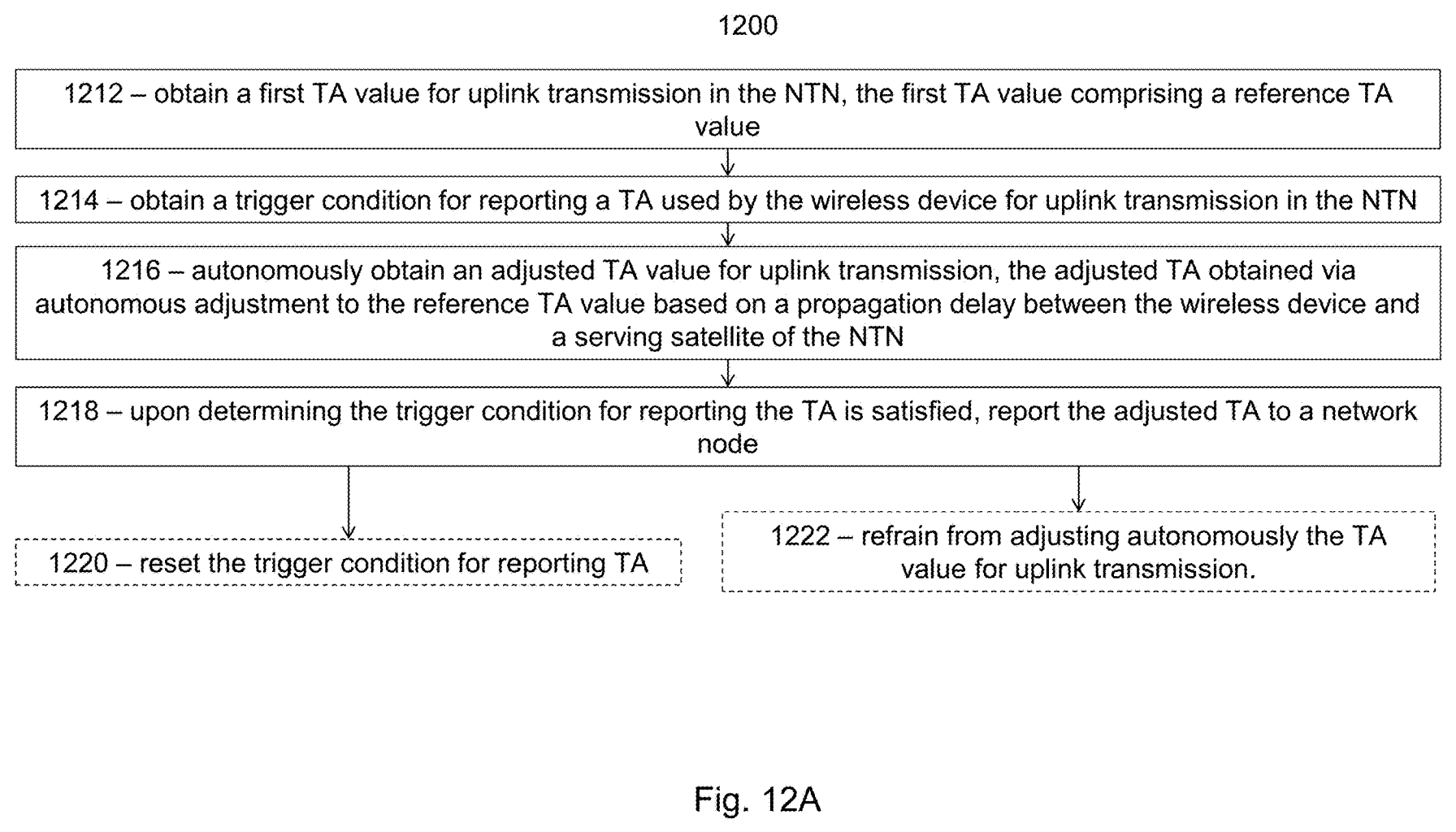

FIG. 12A is a flowchart illustrating an example method in a wireless device, according to certain embodiments. In particular embodiments, one or more steps of FIG. 12A may be performed by wireless device 110 described with respect to FIG. 10. The wireless device is operating in a NTN.

The method begins at step 1212, where the wireless device (e.g., wireless device 110) obtains a first TA value for uplink transmission in the NTN. For example, the wireless device may obtain a TA value through a random access procedure or a timing advance command.

The wireless device may use the obtained TA value as a reference TA value for adjustments performed in the following steps.

At step 1214, the wireless device obtains a trigger condition for reporting a TA used by the wireless device for uplink transmission in the NTN. For example, to prevent the wireless device from under reporting or over reporting TA values, the network may configure the wireless device with a trigger condition for reporting TA values, where the trigger condition may be optimized for particular network conditions.

In particular embodiments, the trigger condition for reporting the TA comprises one or more of a timer value for performing autonomous TA adjustments, a threshold value for an accumulated amount of autonomous TA adjustments, and a location value. The threshold value for an accumulated amount of autonomous TA adjustments may comprise a first threshold value for positive accumulated TA adjustments and a second threshold value for negative accumulated TA adjustments.

In particular embodiments, the trigger condition for reporting the TA comprises one or more of a feeder link switch, a serving satellite switch, a handover, an addition of a secondary cell, and receiving an updated TA value.

In particular embodiments, the trigger condition may comprise any of the trigger conditions described with respect to any of the embodiments and examples described herein.

At step 1216, the wireless device autonomously obtains an adjusted TA value for uplink transmission. The adjusted TA is obtained via autonomous adjustment to the reference TA value based on a propagation delay between the wireless device and a serving satellite of the NTN. For example, as the wireless device moves with respect to the satellite, or the satellite moves with respect to the wireless device, the propagation delay changes and the wireless device may adjust its TA accordingly. For example, the wireless device may adjust its TA based on changes to round trip time determines based on, for example, GNSS information and/or ephemeris information.

In some embodiments, the adjustments are with respect to the reference TA value. In some embodiments, the reference TA value may be updated dynamically and TA adjustments are with respect to the dynamically updated reference TA. In particular embodiments, the reference TA value is dynamically updated as a function of time with respect to the propagation delay between the wireless device and the serving satellite of the NTN.

In some embodiments, the TA is adjusted according to any of the embodiments and examples described herein.

At step 1218, the wireless device, upon determining the trigger condition for reporting the TA is satisfied, reports the adjusted TA to a network node. For example, upon timer expiration, accumulation of a threshold amount of TA adjustments. and/or occurrence of an event such as a mobility event, the wireless device may report the adjusted TA. The wireless device may report the adjusted TA to the network node according to any of the embodiments and examples described herein.

After reporting the adjusted TA, the wireless device make perform any one or more of the following steps. In some embodiments, the method continues to step 1220 where the wireless device resets the trigger condition for reporting TA. For example, the wireless device may reset the trigger condition and continue adjusting the TA value until the trigger condition is reached again.

In some embodiments, the method may continue to step 1222, where the wireless device refrains from adjusting autonomously the TA value for uplink transmission. For example, after reporting the adjusted TA, the wireless device may have reached a threshold amount of accumulated adjustments where the accuracy of such adjustments may diminish, and thus the wireless device may refrain from adjusting the TA until, for example, the wireless device receives a new reference TA value.

In particular embodiments, determining the trigger condition for reporting the TA is satisfied comprises predicting when the adjusted TS will be reported.

In some embodiments, the method may return to step 1212, where the wireless device obtains a second TA value for uplink transmission in the NTN. The second TA value comprises the reference TA value. The wireless device may perform the subsequent adjusting steps based on the new reference TA value.

Modifications, additions, or omissions may be made to method 1200 of FIG. 12A. Additionally, one or more steps in the method of FIG. 12A may be performed in parallel or in any suitable order.

Figure 12B:
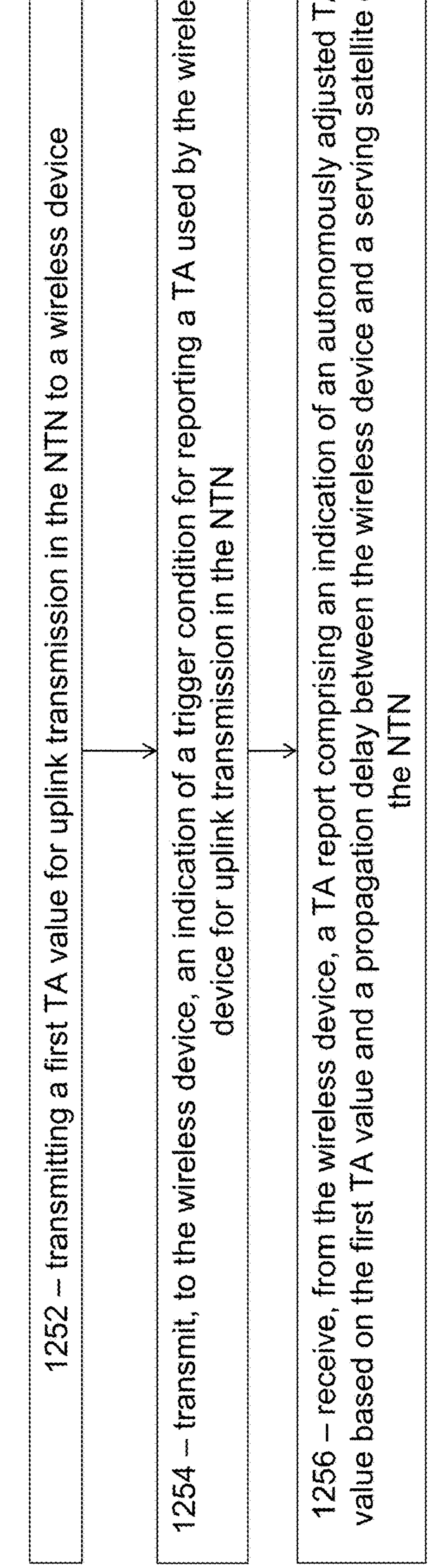
FIG. 12B is a flowchart illustrating an example method performed by a network node, according to particular embodiments.

FIG. 12B is a flowchart illustrating an example method in a network node, according to certain embodiments. In particular embodiments, one or more steps of FIG. 12B may be performed by network node 160 described with respect to FIG. 10. The network node is operating in an NTN.

The method may begin at step 1252, where the network node (e.g., network node 160) transmits a first TA value for uplink transmission in the NTN to a wireless device. For example, the network node may transmit the TA value as part of a random access procedure or via a timing advance command. The wireless device may use the TA value as a reference TA value for autonomously adjusting its TA value.

At step 1254, the network node transmits, to the wireless device, an indication of a trigger condition for reporting a TA used by the wireless device for uplink transmission in the NTN. For example, to prevent the wireless device from under reporting or over reporting TA values, the network may configure the wireless device with a trigger condition for reporting TA values, where the trigger condition may be optimized for particular network conditions.

In particular embodiments, the trigger condition for reporting the TA comprises one or more of a timer value for performing autonomous TA adjustments, a threshold value for an accumulated amount of autonomous TA adjustments, and a location value. The threshold value for an accumulated amount of autonomous TA adjustments may comprise a first threshold value for positive accumulated TA adjustments and a second threshold value for negative accumulated TA adjustments.

In particular embodiments, the trigger condition for reporting the TA comprises one or more of a feeder link switch, a serving satellite switch, a handover, an addition of a secondary cell, and receiving an updated TA value.

In particular embodiments, the trigger condition may comprise any of the trigger conditions described with respect to any of the embodiments and examples described herein. At step 1256, the network node receives, from the wireless device, a TA report comprising an indication of an autonomously adjusted TA value based on the first TA value and a propagation delay between the wireless device and a serving satellite of the NTN.

Modifications, additions, or omissions may be made to method 1240 of FIG. 12B. Additionally, one or more steps in the method of FIG. 12B may be performed in parallel or in any suitable order.

Figure 3:
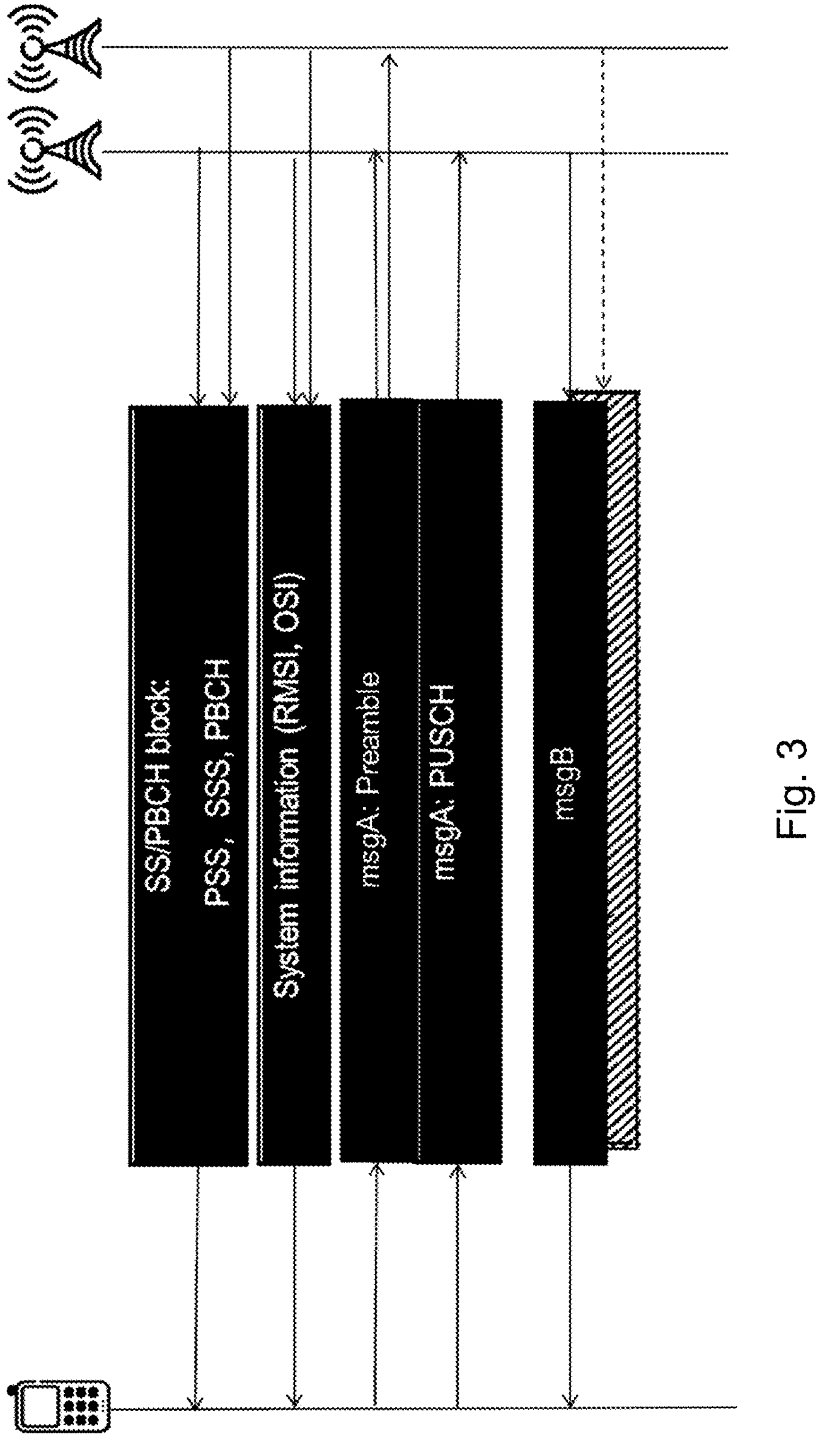
FIG. 3 is a flow diagram illustrating an example two-step initial access procedure.
Figure 5:
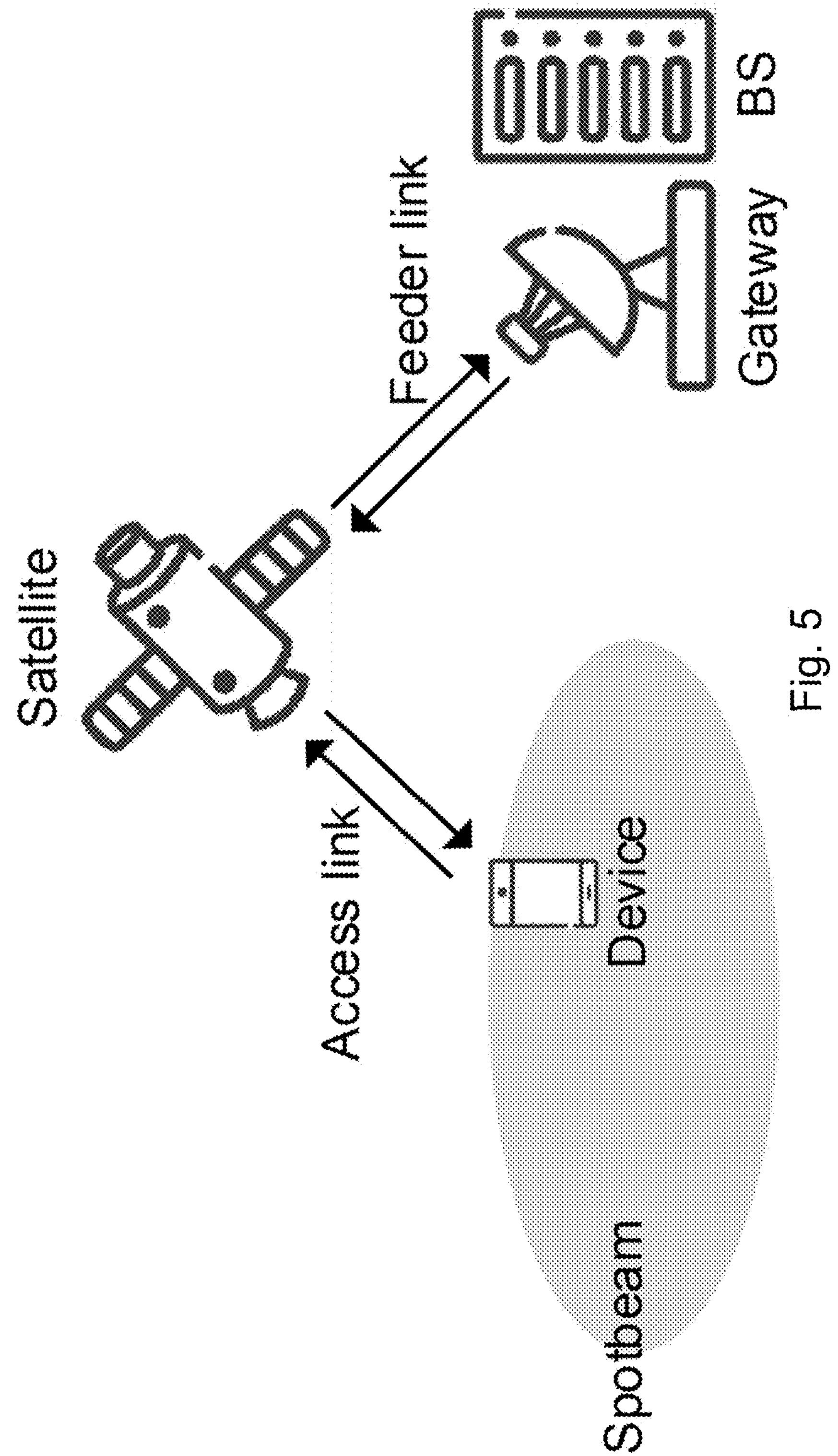
FIG. 5 is an example architecture of a satellite network with bent pipe transponders.
Figure 6:
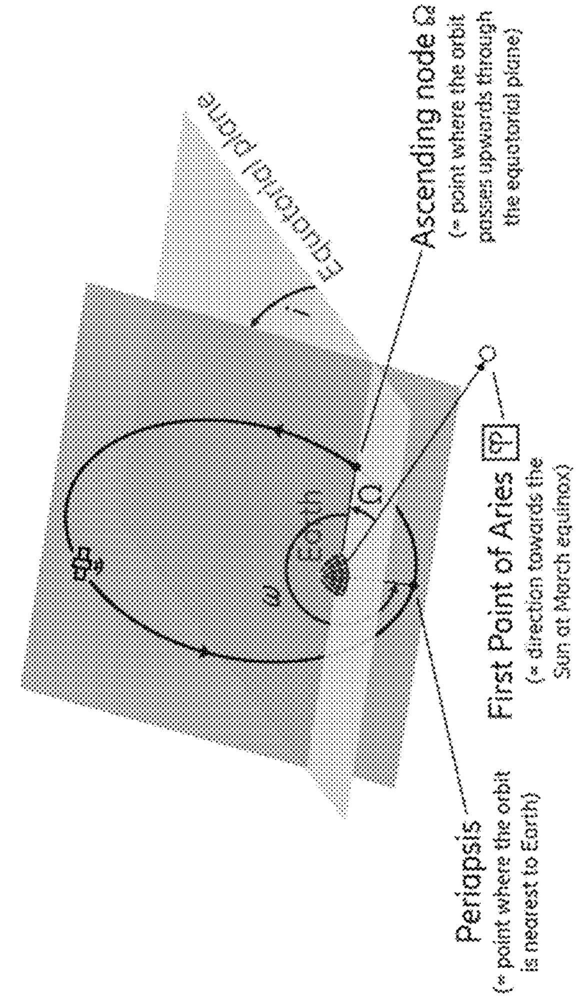
FIG. 6 illustrates orbital elements for describing a satellite orbit.
Figure 6:
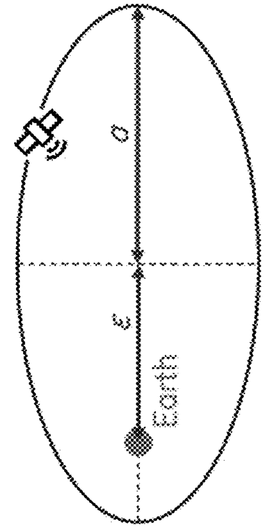
Figure 7:
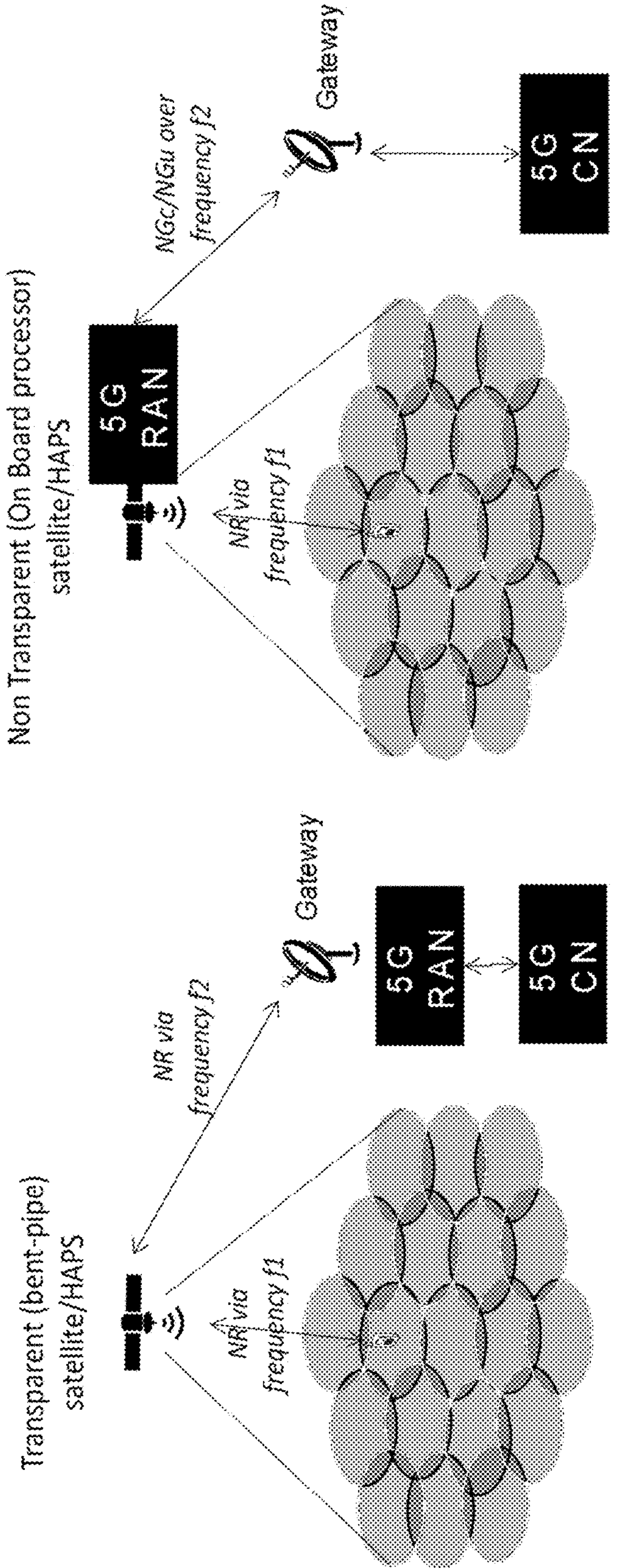
FIG. 7 illustrates typical beam patterns of various NTN access networks.
Figure 13:
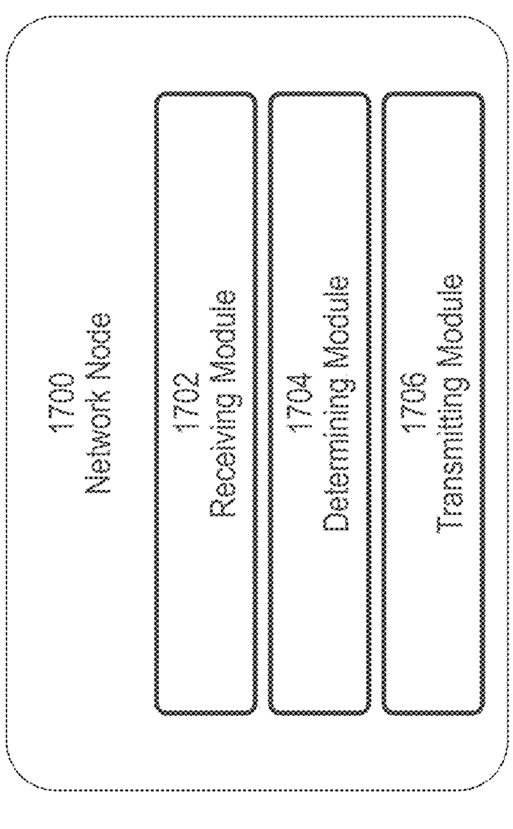
FIG. 13 illustrates a schematic block diagram of a wireless device and network node in a wireless network, according to certain embodiments.
Figure 13:
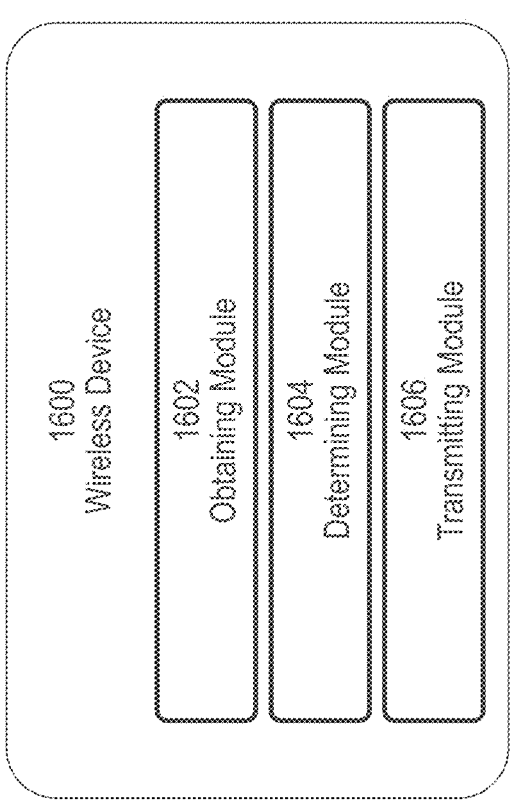

FIG. 13 illustrates a schematic block diagram of two apparatuses in a wireless network (for example, the wireless network illustrated in FIG. 10). The apparatuses include a wireless device and a network node (e.g., wireless device 110 and network node 160 illustrated in FIG. 3). Apparatuses 1600 and 1700 are operable to carry out the example methods described with reference to FIGS. 12A and 12B, respectively, and possibly any other processes or methods disclosed herein. It is also to be understood that the methods of FIGS. 12A and 12B are not necessarily carried out solely by apparatuses 1600 and/or 1700. At least some operations of the methods can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause obtaining module 1602, determining module 1604, transmitting module 1606, and any other suitable units of apparatus 1600 to perform corresponding functions according one or more embodiments of the present disclosure.

In some implementations, the processing circuitry may be used to cause receiving module 1702, determining module 1704, transmitting module 1706, and any other suitable units of apparatus 1600 to perform corresponding functions according one or more embodiments of the present disclosure.

As illustrated in FIG. 13, apparatus 1600 includes obtaining module 1602 configured to obtain/receive TA values and TA report triggers according to any of the embodiments and examples described herein. Apparatus 1600 also includes determining module 1604 configured to determine an adjusted TA value according to any of the embodiments and examples described herein. Transmitting module 1606 is configured to transmit a TA report according to any of the embodiments and examples described herein.

As illustrated in FIG. 13, apparatus 1700 includes receiving module 1702 configured to receive a TA report according to any of the embodiments and examples described herein. Apparatus 1700 also includes determining module 1704 configured to determine TA values and TA report triggers according to any of the embodiments and examples described herein. Transmitting module 1606 is configured to transmit TA values and TA report triggers according to any of the embodiments and examples described herein.

Figure 14:
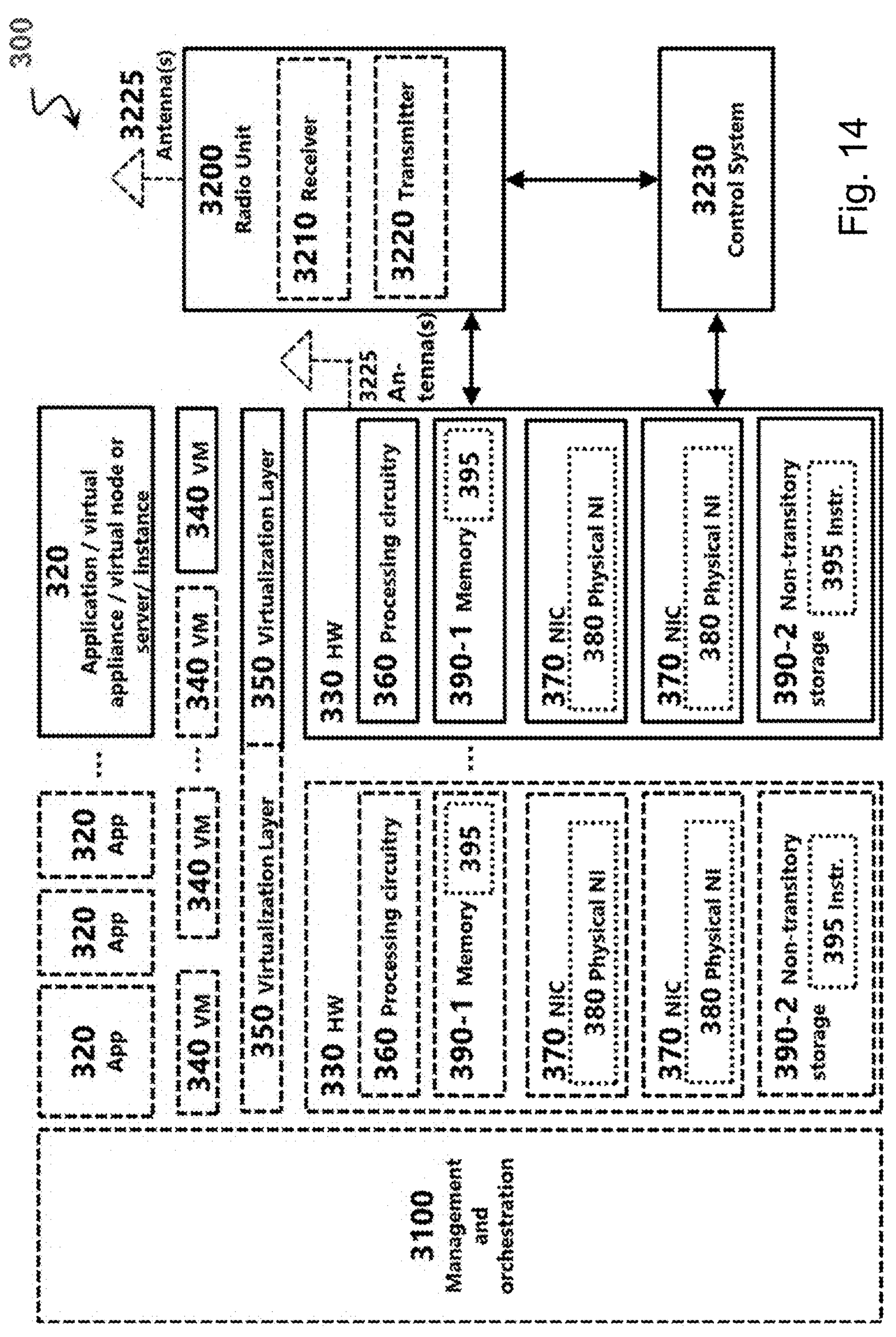
FIG. 14 illustrates an example virtualization environment, according to certain embodiments.

FIG. 14 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 14, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 15:
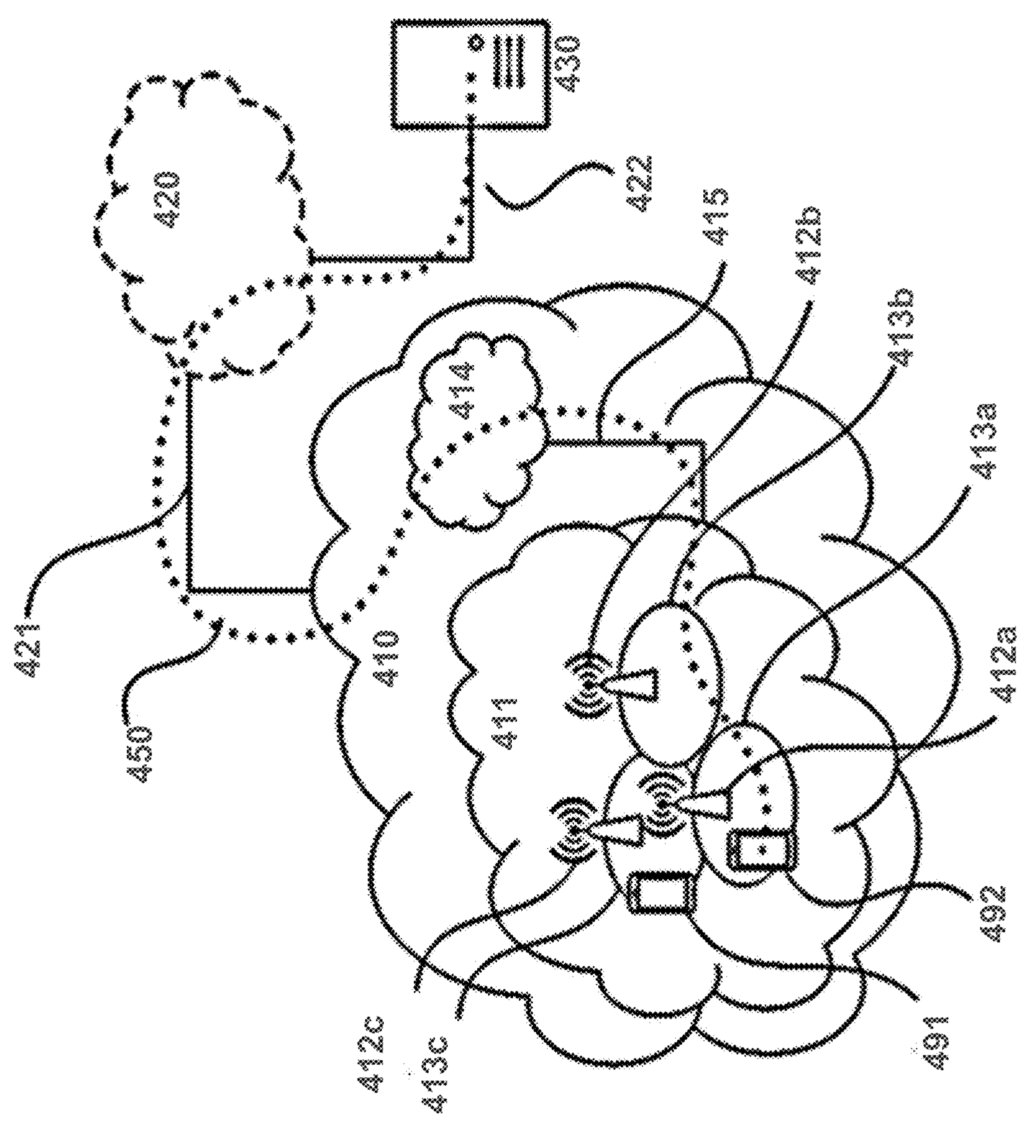
FIG. 15 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 15.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 15, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 15 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station

412 need not be aware of the future routing of an outgoing uplink communication originating from the UE 491 towards the host computer 430.

Figure 16:
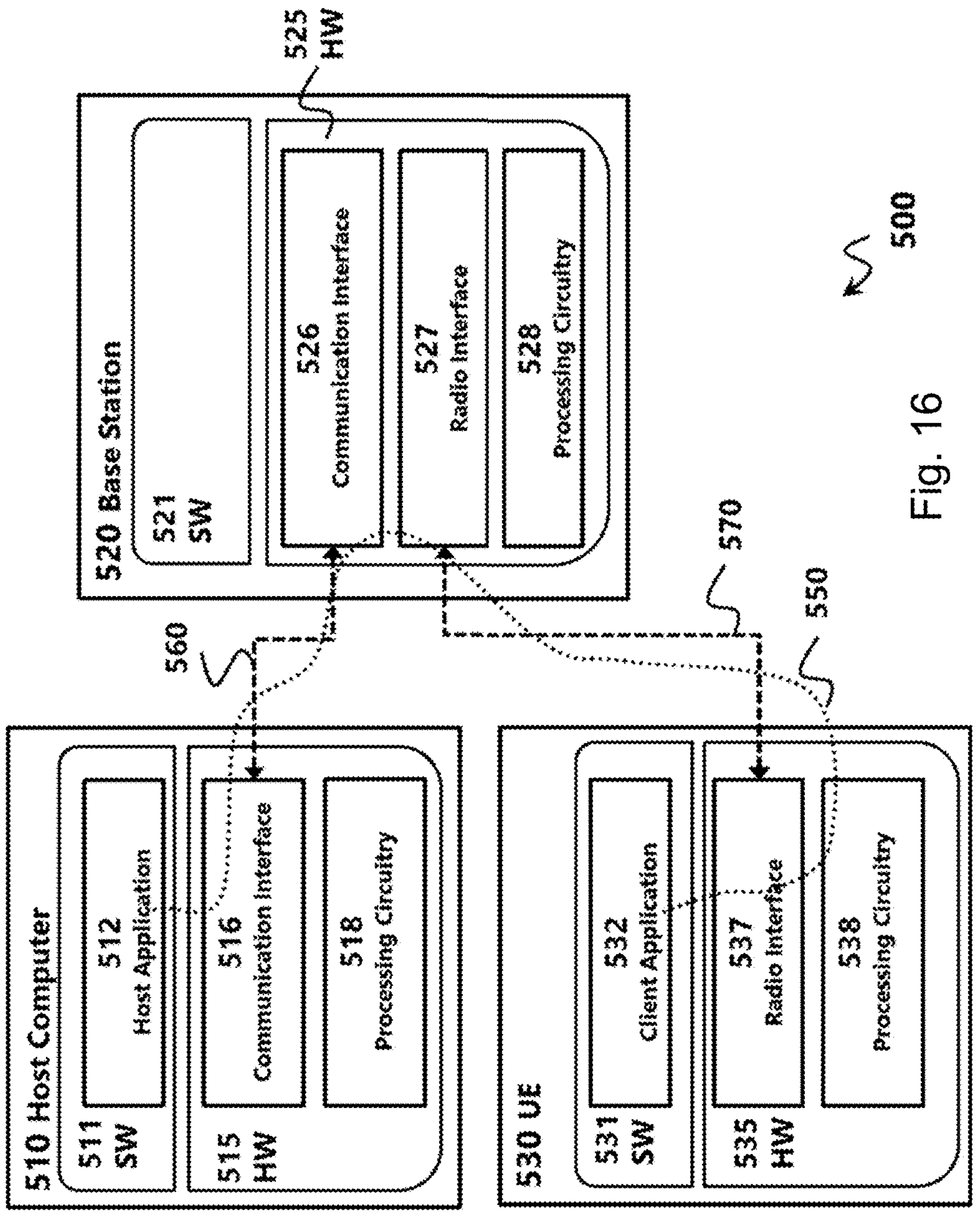
FIG. 16 illustrates an example host computer communicating via a base station with a user equipment over a partially wireless connection, according to certain embodiments.

FIG. 16 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 16) served by base station 520. Communication interface 526 may be configured to facilitate connection 560 to host computer 510. Connection 560 may be direct, or it may pass through a core network (not shown in FIG. 16) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 16 may be similar or identical to host computer 430, one of base stations 412*a*, 412*b*, 412*c* and one of UEs 491, 492 of FIG. 15, respectively. This is to say, the inner workings of these entities may be as shown in FIG. 16 and independently, the surrounding network topology may be that of FIG. 15.

In FIG. 16, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511. 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 17:
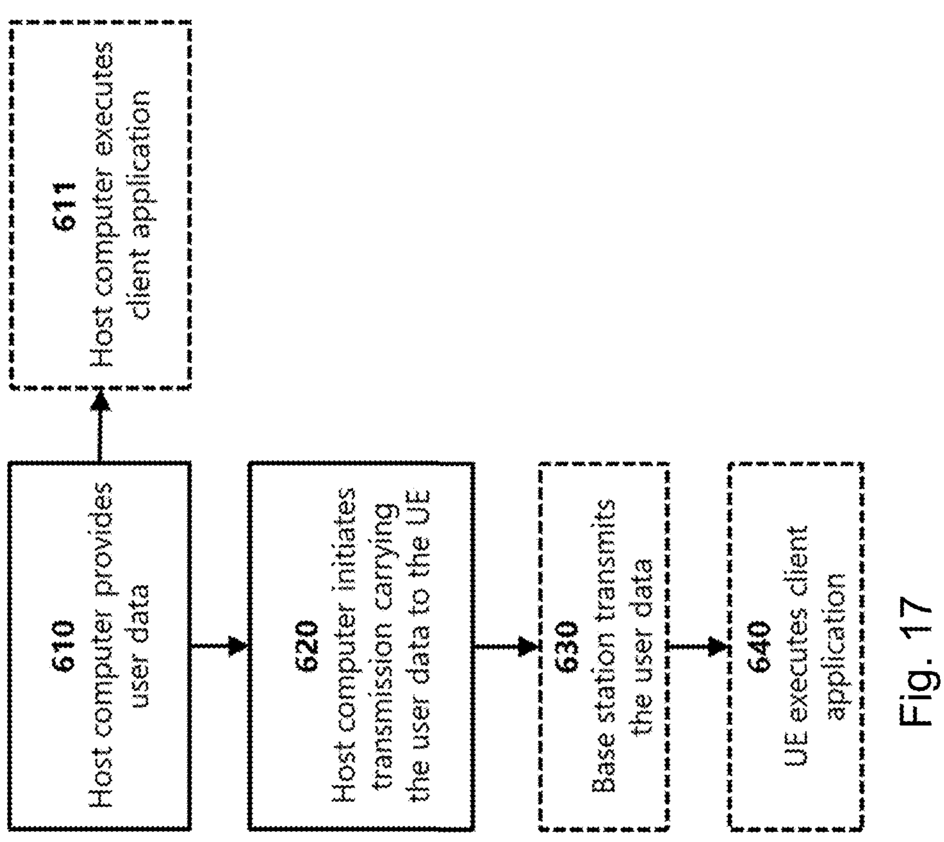
FIG. 17 is a flowchart illustrating a method implemented, according to certain embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 18:
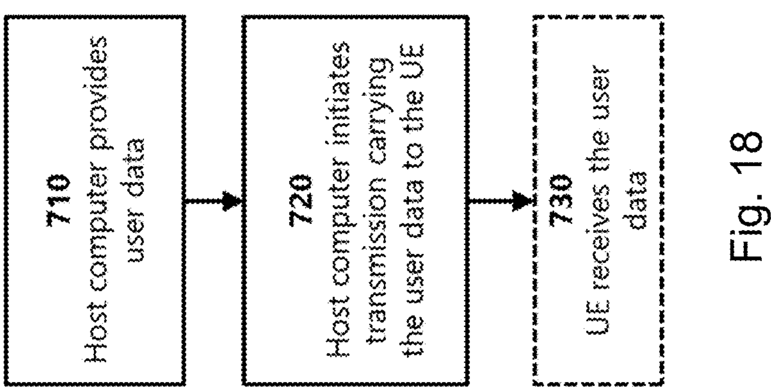
FIG. 18 is a flowchart illustrating a method implemented in a communication system, according to certain embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 19:
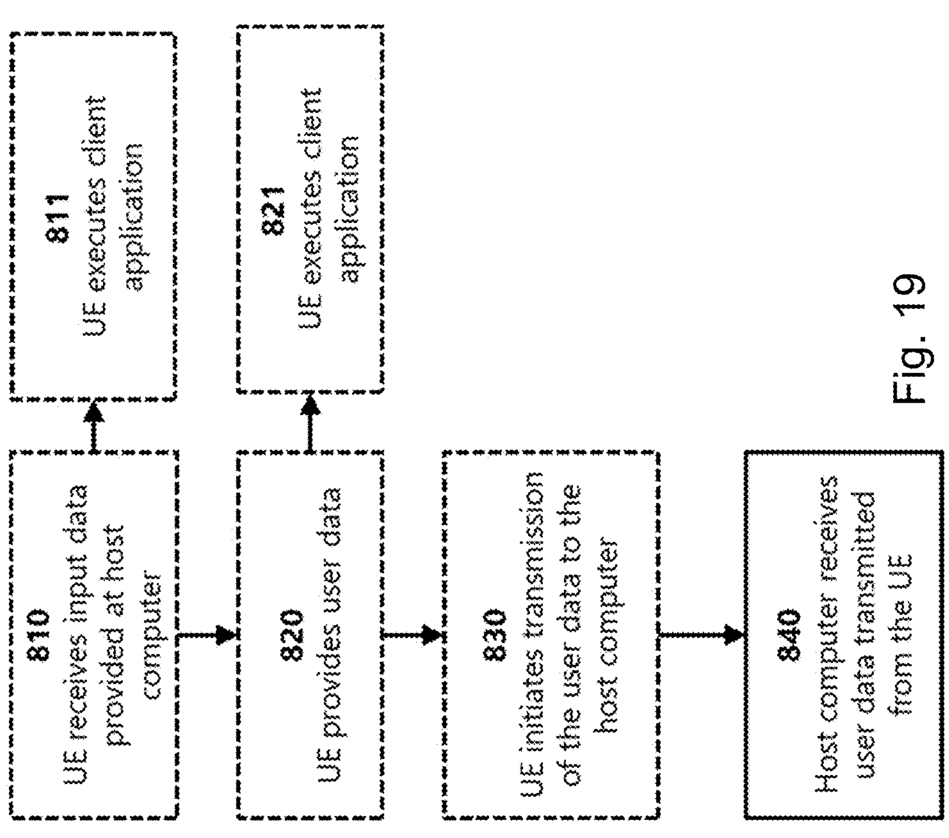
FIG. 19 is a flowchart illustrating a method implemented in a communication system, according to certain embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 20:
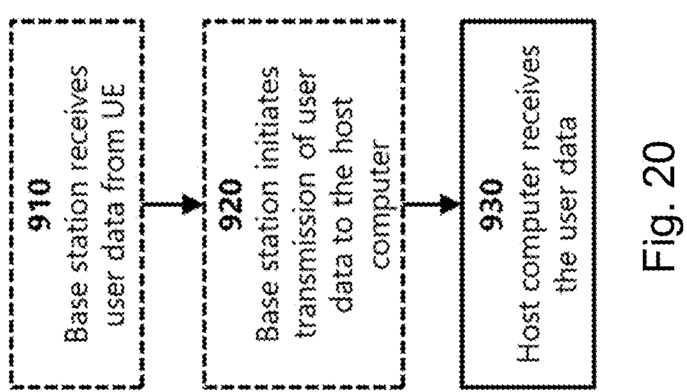
FIG. 20 is a flowchart illustrating a method implemented in a communication system, according to certain embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a wireless device operating in a non-terrestrial network (NTN), the method comprising:

obtaining a trigger condition for reporting a timing advance (TA) used by the wireless device for uplink transmission in the NTN, the trigger condition comprising a threshold value for an accumulated amount of TA adjustments;

obtaining a plurality of TA values for uplink transmission in the NTN, the plurality of TA values comprising a reported TA value, the reported TA value comprising a last TA value successfully reported to a network node;

autonomously obtaining a plurality of adjusted TA values for uplink transmission, the plurality of adjusted TA values are based on a propagation delay between the wireless device and a serving satellite of the NTN;

upon an accumulated amount of TA adjustments associated with a first adjusted TA value not exceeding the threshold value, determining the trigger condition for reporting the TA is not satisfied and refraining from reporting the first adjusted TA value, wherein the accumulated amount of TA adjustments is based on the reported TA value and the first adjusted TA value; and upon an accumulated amount of TA adjustments associated with a second adjusted TA value exceeding the threshold value, determining the trigger condition for reporting the TA is satisfied and reporting the second adjusted TA to a network node, wherein the accumulated amount of TA adjustments is based on the reported TA value and the second adjusted TA value.

2. The method of claim 1, wherein the threshold value for an accumulated amount of autonomous TA adjustments comprises a first threshold value for positive accumulated TA adjustments and a second threshold value for negative accumulated TA adjustments.

3. The method of claim 1, further comprising, upon determining the trigger condition for reporting the TA is satisfied, resetting the trigger condition for reporting TA.

4. The method of claim 1, further comprising, upon determining the trigger condition for reporting the TA is satisfied, refraining from adjusting autonomously the TA value for uplink transmission.

5. A wireless device capable of operating in a non-terrestrial network (NTN), the wireless device comprising processing circuitry operable to:

obtain a trigger condition for reporting a timing advance (TA) used by the wireless device for uplink transmission in the NTN, the trigger condition comprising a threshold value for an accumulated amount of TA adjustments;

obtain a plurality of TA values for uplink transmission in the NTN, the plurality of TA values comprising a reported TA value, the reported TA value comprising a last TA value successfully reported to a network node;

autonomously obtain a plurality of adjusted TA values for uplink transmission, the plurality of adjusted TA values are based on a propagation delay between the wireless device and a serving satellite of the NTN;

upon an accumulated amount of TA adjustments associated with a first adjusted TA value not exceeding the threshold value, determine the trigger condition for reporting the TA is not satisfied and refrain from reporting the first adjusted TA value, wherein the accumulated amount of TA adjustments is based on the reported TA value and the first adjusted TA value; and upon an accumulated amount of TA adjustments associated with a second adjusted TA value exceeding the threshold value, determine the trigger condition for reporting the TA is satisfied, reporting and report the second adjusted TA to a network node, wherein the accumulated amount of TA adjustments is based on the reported TA value and the second adjusted TA value.

6. The wireless device of claim 5, wherein the threshold value for an accumulated amount of autonomous TA adjustments comprises a first threshold value for positive accumulated TA adjustments and a second threshold value for negative accumulated TA adjustments.

7. The wireless device of claim 5, the processing circuitry further operable to, upon determining the trigger condition for reporting the TA is satisfied, reset the trigger condition for reporting TA.

8. The wireless device of claim 5, the processing circuitry further operable to, upon determining the trigger condition for reporting the TA is satisfied, refrain from adjusting autonomously the TA value for uplink transmission.

9. A method performed by a network node operating in a non-terrestrial network (NTN), the method comprising:

transmitting, to the wireless device, an indication of a trigger condition for reporting a timing advance (TA) used by the wireless device for uplink transmission in the NTN, the trigger condition comprising a threshold value for an accumulated amount of TA adjustments; and receiving, from the wireless device, a TA report comprising an indication of an autonomously adjusted TA value, wherein the TA report is received when an accumulated amount of TA adjustment from a last reported TA value exceeds the trigger condition threshold value.

10. A network node capable of operating in a non-terrestrial network (NTN), the network node comprising processing circuitry operable to:

transmit, to the wireless device, an indication of a trigger condition for reporting a timing advance (TA) used by the wireless device for uplink transmission in the NTN, the trigger condition comprising a threshold value for an accumulated amount of TA adjustments; and receive, from the wireless device, a TA report comprising an indication of an autonomously adjusted TA value, wherein the TA report is received when an accumulated amount of TA adjustment from a last reported TA value exceeds the trigger condition threshold value.

11. The network node of claim 10, wherein the threshold value for an accumulated amount of autonomous TA adjustments comprises a first threshold value for positive accumulated TA adjustments and a second threshold value for negative accumulated TA adjustments.

* * * * *